US012516179B2

(12) United States Patent
Rasheed et al.

(10) Patent No.: US 12,516,179 B2
(45) Date of Patent: Jan. 6, 2026

(54) CHITOSAN-BASED NANOCOMPOSITE AS AN ANTIMICROBIAL AGENT AND CORROSION INHIBITOR

(71) Applicant: Qatar Foundation for Education, Science and Community Development, Doha (QA)

(72) Inventors: Abdul P. Rasheed, Doha (QA); Kashif Rasool, Doha (QA); Ravi P. Pandey, Doha (QA); Khaled A. Mahmoud, Doha (QA)

(73) Assignee: HAMAD BIN KHALIFA UNIVERSITY, Doha (QA)

( * ) Notice: Subject to any disclaimer, the term of this patent is extended or adjusted under 35 U.S.C. 154(b) by 682 days.

(21) Appl. No.: 17/423,380

(22) PCT Filed: Jan. 18, 2020

(86) PCT No.: PCT/QA2020/050003
§ 371 (c)(1),
(2) Date: Jul. 15, 2021

(87) PCT Pub. No.: WO2020/149756
PCT Pub. Date: Jul. 23, 2020

(65) Prior Publication Data
US 2022/0127436 A1 Apr. 28, 2022

Related U.S. Application Data

(60) Provisional application No. 62/794,570, filed on Jan. 19, 2019.

(51) Int. Cl.
| | | |
|---|---|---|
| C08L 5/08 | (2006.01) | |
| A01N 25/08 | (2006.01) | |
| A01N 59/16 | (2006.01) | |
| B82Y 30/00 | (2011.01) | |
| C08K 5/07 | (2006.01) | |
| C08L 97/00 | (2006.01) | |

(52) U.S. Cl.
CPC ............... *C08L 5/08* (2013.01); *A01N 25/08* (2013.01); *A01N 59/16* (2013.01); *C08K 5/07* (2013.01); *C08L 97/005* (2013.01); *B82Y 30/00* (2013.01)

(58) Field of Classification Search
CPC ......... C08L 5/08; C08L 97/005; A01N 25/08; A01N 59/16; C08K 5/07; B82Y 30/00
See application file for complete search history.

(56) References Cited

U.S. PATENT DOCUMENTS

| | | | |
|---|---|---|---|
| 2003/0129730 A1* | 7/2003 | Chenite | C08L 5/08 |
| | | | 435/253.6 |
| 2016/0168711 A1* | 6/2016 | Wasserfallen | C23C 16/56 |
| | | | 427/372.2 |
| 2016/0369065 A1* | 12/2016 | Theivendran | C08L 5/08 |
| 2018/0346690 A1* | 12/2018 | Wu | H02N 1/04 |

FOREIGN PATENT DOCUMENTS

| | | | | |
|---|---|---|---|---|
| CN | 102108172 A | * | 6/2011 | |
| WO | WO-2009155417 A1 | * | 12/2009 | C01B 25/08 |
| WO | WO-2015187631 A1 | * | 12/2015 | A61F 13/15203 |

OTHER PUBLICATIONS

Machine translation for CN-102108172A (Year: 2011).*
Machine translation of CN-102108172-A (Year: 2011).*
Kim et al.; Chitosan-lignosulfonates sono-chemically prepared nanoparticles: Characterisation and potential applications; Elsevier; Colloids and Surfaces B: Biointerfaces 103 (2013) 1-8 (Year: 2013).*
Beisl et al.; Lignin from Micro-to Nanosize: Applications; MDPI; Int. J. Mol. Sci. 2017, 18, 2367 (Year: 2017).*
Aldrich Product Specification Sheet for Chitosan from shrimp shells, practical grade (accessed Jun. 2025) (Year: 2025).*
Aldrich Chitiosan (accessed Jun. 2025) (Year: 2021).*
Google Search; calcium lignosulfonates (accessed Jun. 2025) (Year: 2025).*
International Search Report for related International Application No. PCT/QA2020/050003; report dated Nov. 26, 2020; (4 pages).
Written Opinion for related International Application No. PCT/QA2020/050003; report dated Nov. 26, 2020; (6 pages).
El-Mekawy, et al.; "Recent trends in smart and flexible three dimensional cross-linked polymers: synthesis of chitosan—ZnO nanocomposite hydrogels for insulin drug delivery"; Medchemcomm, vol. 8, Feb. 28, 2017 [retrieved on Oct. 27, 2020]. Retrieved from the Internet: <URL: https://www.ncbi.nlm.nih.gov/pmc/articles/PMC6072029/> pp. 897-906.
Kim et al; "Chitosan-lignosulfonates sono-chemically prepared nanoparticles: Characterisation and potential applications, Colloids and Surfaces B"; Biointerfaces, vol. 103, Oct. 30, 2012 [retrieved on Aug. 27, 2020]. Retrieved from the Internet: <URL: https://www.sciencedirect.com/science/article/abs/pii/S0927776512005905?via%3Dihub>. pp. 1-8.

* cited by examiner

*Primary Examiner* — Robert A Wax
*Assistant Examiner* — John W Lippert, III
(74) *Attorney, Agent, or Firm* — K&L Gates LLP

(57) ABSTRACT

Antimicrobial agents and corrosion inhibitors are widely used as biocides in the oil and gas industry to disinfect the water and inhibit excessive biofilm formation and microbial induced corrosion (MIC) caused mainly by sulfate reducing bacteria (SRB). However, traditional biocides may induce bacterial resistance and/or be detrimental to environment by forming harmful disinfection byproducts. A chitosan-based nanocomposite is successfully implemented as a novel green biocide for treatment of water, the inhibition of sulfate reducing bacteria (SRB) and reduction of biocorrosion on SS400 carbon steel.

10 Claims, 42 Drawing Sheets

| Elem. (A) | Line | Mass [%] | 3sigma | Atomic [%] | Intensity [cps/mA] |
|---|---|---|---|---|---|
| 15 P | K | 0.64 | 0.06 | 0.54 | 153.35 |
| 16 S | K | 12.42 | 0.13 | 10.22 | 6933.66 |
| 20 Ca | K | 0.24 | 0.01 | 0.16 | 330.10 |
| 26 Fe | K | 44.31 | 0.32 | 20.93 | 217664.55 |
| O | | 40.34 | 0.37 | 68.49 | |

| Elem. (B) | Line | Mass [%] | 3sigma | Atomic [%] | Intensity [cps/mA] |
|---|---|---|---|---|---|
| 15 P | K | 10.08 | 0.13 | 7.91 | 2268.79 |
| 16 S | K | 9.59 | 0.10 | 7.27 | 4070.38 |
| 20 Ca | K | 12.41 | 0.10 | 7.53 | 12016.18 |
| 26 Fe | K | 22.02 | 0.13 | 9.59 | 74877.14 |
| O | | 43.57 | 0.29 | 66.21 | |

Fig. 13

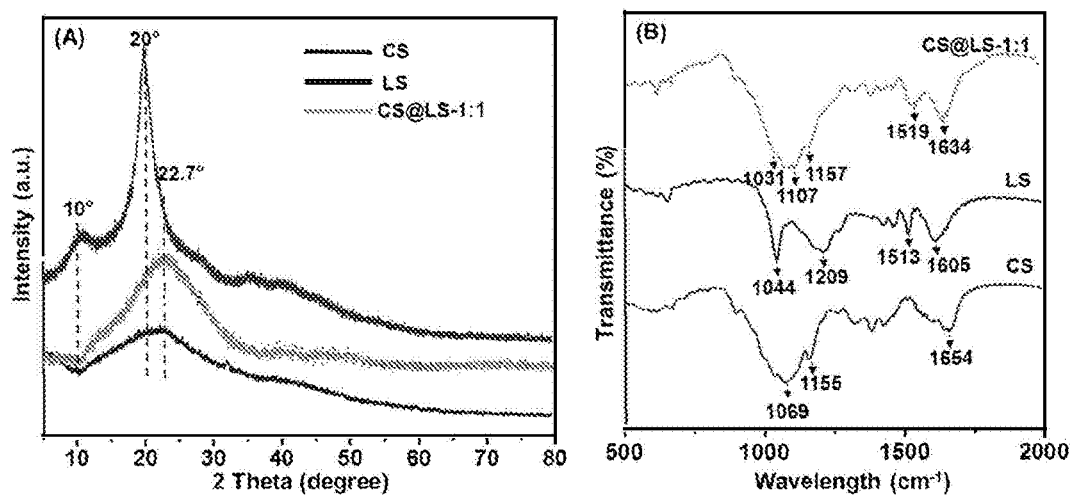
Fig. 19 (Fig. 19(A); Fig. 19(B))
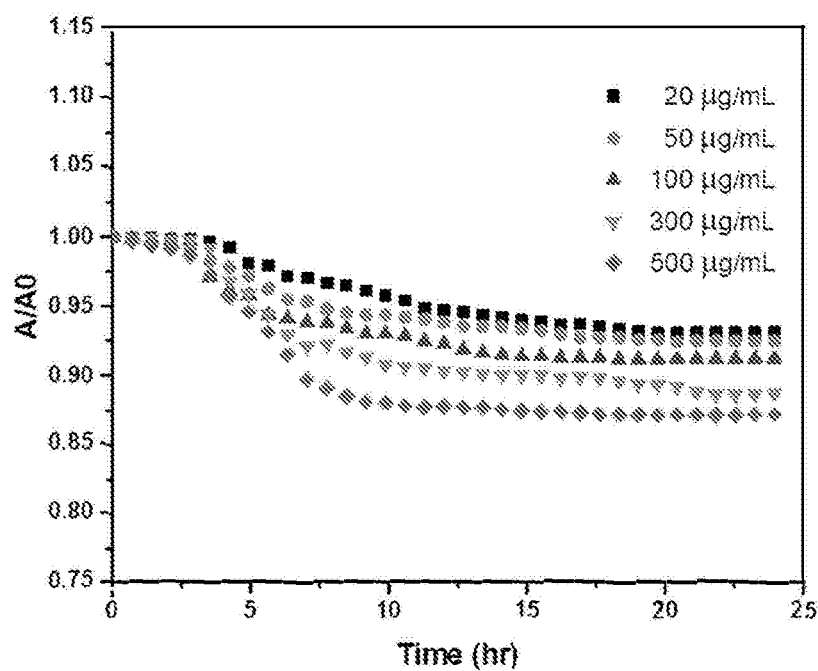
Fig. 20

CHITOSAN-BASED NANOCOMPOSITE AS AN ANTIMICROBIAL AGENT AND CORROSION INHIBITOR

CROSS-REFERENCE TO RELATED APPLICATIONS

This application is the National Stage filing under 35 U.S.C. 371 of International Application No. PCT/QA2020/050003, filed on Jan. 18, 2020, which claims the priority to U.S. Provisional Patent Application No. 62/794,570, filed Jan. 19, 2019, which is hereby incorporated by reference in its entirety for all purposes.

FIELD OF THE INVENTION

The present disclosure relates to a chitosan-based nanocomposite as a biocide, an antimicrobial agent and a corrosion inhibitor. In particular, the present disclosure relates to a formulation of a chitosan-based nanocomposite; a process of preparing the chitosan-based nanocomposite formulation; and a method of using the chitosan-based nanocomposite formulation as a biocide, an antimicrobial agent and a corrosion inhibitor in the treatment of water, the reduction of bio-corrosion of carbon steel and other metal alloys, the treatment of medical devices and the treatment of other substances. The present disclosure further pertains to the inhibition of biofilm formation, including sulfate reducing bacteria.

BACKGROUND

Antimicrobial agents and corrosion inhibitors are used as biocides to disinfect water and inhibit excessive biofilm formation. However, traditional biocides may induce bacterial resistance and may be detrimental to the environment. For example, much of the oil and gas industry uses antimicrobial agents to reduce biofilm formation which is often caused by sulfate reducing bacteria (SRBs). Oil producing companies utilize water injection as a common oil recovery method, especially for offshore fields, where seawater is typically used. Due to the size and complexity of the injection system and the salinity of the water; the process faces many challenges including microbial growth, fouling and corrosion in the pipeline. Biofilms accelerate corrosion in a biologically conditioned metal-solution interface.

Seawater often contains small concentrations of microbes, including sulfate reducing bacteria (SRBs). The SRBs are microorganisms that can anaerobically generate sulfide species during the organisms' respiration process in biofilm causing biocorrosion in the injection networks, promoting microbial influenced corrosion and jeopardizing the oil-recovery process. Moreover, the produced H2S gas can be toxic, corrosive, and responsible for a variety of environmental and economic problems including, for example, reservoir souring, contamination of natural gas and oil, corrosion of metal surfaces, and the plugging of reservoirs due to the precipitation of metal sulfides.

One method for inhibiting biofilm growth is the use of synthetic biocides, which may include oxidizing (chloronation, chloroamination, and ozonation) and non-oxidizing biocides (formaldehyde, glutaraldehyde, and quaternary ammonia compounds etc.). However, release of disinfection byproducts (DBPs), high cost, less efficiency, and environmental toxicity restricts the use of biocides in the oil fields. Treatments which are less expensive, free of DBPs, and environmentally friendly are sought as alternatives for conventional biocides.

Nanoparticles can be effective for the disinfection of waterborne microbes while imparting significant reductions in time, waste management, environmental impacts and labor as compared with the conventional chemical disinfection methods. The prior art has demonstrated antimicrobial activities of nanomaterials against common water born bacteria, SRBs, methanogens, nitrifiers, and denitrifiers. However, prior studies have focused on screening the antibacterial activities of these nanomaterials against individual bacterial strains and the prior art lacks research data regarding the inhibition of real field bacterial consortia from oil & gas or any other sector. Furthermore, traditional biocides may be unstable, inefficient, or may form harmful disinfection byproducts.

Antimicrobial polymers are used for their ability to inhibit the growth of certain microorganisms. Some antimicrobial polymers have been fostered for several applications due to low toxicity, biodegradability, biocompatibility, low cost, and unique antimicrobial properties. There is a need to reduce the cytotoxic effects of traditional biocides through novel formulations of nanometals and antimicrobial polymers in order to help preserve inject water against biofouling, to reduce the risk of piping corrosion and reservoir souring, and to improve surface facilities lifetime, with minimal impact on the environmental and marine life.

The inventors of the presently claimed inventions have synthesized different types of chitosan-based nanocomposites and found that these chitosan-based nanocomposites are efficient as anti-microbial agents and corrosion inhibitors. The inventors further surprisingly found that the chitosan-based nanocomposites synthesized by the addition of an anionic biopolymer having anti-microbial properties leads to highly efficient and environmental friendly anti-microbial agents and corrosion inhibitors.

SUMMARY OF THE INVENTION

The present disclosure presents a new and innovative formulation of nanocomposites for use in water treatment and reduction of microbial induced corrosion (MIC). The formulation may be a "green" formulation used to treat a variety of microorganisms including fungi, algae, sulfate reducing bacteria (SRB) and other bacteria. More particularly, the formulation may be used to inhibit biofilm formation caused by sulfate reducing bacteria. The formulation comprises chitosan, and may further comprise at least one component selected from the group consisting of lignin, lignosulfonate (Ln), lignosulfonic acid (LS), zinc (Zn), oxygen (O), Zinc oxide (ZnO), a crosslinking agent, chitosan nanoparticles (ChNPs), ZnO nanoparticles (ZnONPs), lignin nanoparticles, and combinations thereof. The formulation may further comprise chemically and/or physically crosslinked chitosan-lignosulfonate nanoparticles, chemically and/or physically crosslinked chitosan-lignosulfonic acid nanocomposites, ZnO interlinked chitosan nanoparticles (CZNC), and combinations thereof.

The crosslinking agent is selected from the non-limiting group consisting of formaldehyde, phthalaldehyde, glyoxal, succindialdehyde, glutaraldehyde, acetaldehyde, propionaldehyde, butyraldehyde, and other types of aldehyde and dialdehyde.

In one embodiment, a formulation comprises chitosan; and further comprises at least one component selected from the group consisting of lignin, lignosulfonate (Ln), lignosulfonic acid (LS), milled wood lignin, milled wood enzyme lignin, lignocellulose, brauns' native lignin, chemical lignin, klason lignin, organsolv lignin, pyrolytic lignin, steam explosion lignin, lignophenol, kraft lignin and sodium-lignosulfonate, zinc oxide (ZnO), a crosslinking agent, chitosan nanoparticles (ChNPs), ZnO nanoparticles (ZnONPs), lignin nanoparticles, and combinations thereof, wherein the chitosan is chemically and/or physically crosslinked with the at least one component selected from the group consisting of lignin, lignosulfonate (Ln), lignosulfonic acid (LS), milled wood lignin, milled wood enzyme lignin, lignocellulose, brauns' native lignin, chemical lignin, klason lignin, organsolv lignin, pyrolytic lignin, steam explosion lignin, lignophenol, kraft lignin and sodium-lignosulfonate, zinc oxide (ZnO), a crosslinking agent, and combinations thereof.

In one aspect, the present invention also relates to a chitosan-based nanocomposite. In one embodiment, the chitosan-based nanocomposite comprises chitosan and at least one component selected from the group consisting of chemically and/or physically crosslinked chitosan-lignosulfonate nanoparticles, chemically and/or physically crosslinked chitosan-lignosulfonic acid nanocomposites, chemically and/or physically crosslinked chitosan-milled wood lignin nanoparticles, chemically and/or physically crosslinked chitosan-milled wood enzyme lignin nanoparticles, chemically and/or physically crosslinked chitosan-lignocellulose nanoparticles, chemically and/or physically crosslinked chitosan-brauns' native lignin nanoparticles, chemically and/or physically crosslinked chitosan-chemical lignin nanoparticles, chemically and/or physically crosslinked chitosan-klason lignin nanoparticles, chemically and/or physically crosslinked chitosan-organsolv lignin nanoparticles, chemically and/or physically crosslinked chitosan-pyrolytic lignin nanoparticles, chemically and/or physically crosslinked chitosan-steam explosion lignin nanoparticles, chemically and/or physically crosslinked chitosan-lignophenol nanoparticles, chemically and/or physically crosslinked chitosan-kraft lignin nanoparticles, chemically and/or physically interlinked ZnO-chitosan nanoparticles (CZNC), and combinations thereof.

The present invention also relates to a method for preparing the chitosan-based nanocomposite formulation aforementioned above. The method comprises the steps of: (1) preparing the Chitosan (Ch) and lignosulfonate (Ln) solutions; (2) mixing the solutions of step (1) together under constant stirring at room temperature for 30 min; (3) preparing a cross-linking agent solution by adding sodium sulfate (1.50 g), formaldehyde (0.541 g), and sulfuric acid (1.25 g) in DI water (4.70 mL) under constant stirring at room temperature for 10 min; (4) adding the cross-linking agent solution gradually with the help of a syringe and stirring the resulting solution for an additional 30 min; and (5) washing the resultant solution in step (4) 5 times with DI water, followed by centrifugation at 10,000 rpm to obtain the chitosan-based nanocomposite.

In one embodiment, the method of preparing a chitosan-based nanocomposite comprises steps of: (1) preparing a chitosan (Ch) solution and a lignin-based compound solution; (2) mixed the chitosan (Ch) solution and the lignin-based compound solution of step (1) together under constant stirring for a first duration of time to form a mixed solution; (3) preparing a cross-linking agent solution by adding a metal sulfate, an aldehyde, and an acid in water under constant stirring for a second duration of time; (4) adding a chemically sufficient amount of the cross-linking agent solution gradually with the help of syringe into the mixed solution and stirring the resulting solution for a third duration of time; and (5) washing the resulting solution in step (4) and centrifuging the resulting solution to obtain the chitosan-based nanocomposite.

The chitosan and the lignosulfonate is mixed at a ratio between 2:1 and 1:2, preferably between 1.5:1 and 1:1.5, more preferably between 1.2:1 and 1:1.2, and most preferably at 1:1.

The chitosan-based nanocomposite formulation may be soluble in water, may be insoluble in water, and may form a highly stable aqueous suspension and/or colloids. The chitosan-based nanocomposite formulation may present high efficiency as an antimicrobial agent. The chitosan-based nanocomposite formulation may further be an environmentally friendly antimicrobial agent.

The chitosan-based nanocomposite formulation may be useful as an alternative for seawater disinfection, in preserving injected water against biofouling, in reducing the risks of piping corrosion and reservoir souring, and improving surface facilities lifetime, with minimal impact on the environmental and marine life. The chitosan-based nanocomposite formulation may further be used an anti-microbial agent for medical devices.

The present disclosure further includes the method and resulting data of certain embodiments of the formulation. For instance, the present disclosure evaluates the antimicrobial activity against mixed sulfate reducing bacteria (SRB) culture isolated from real oil field sludge. The method includes, for example, the use of scanning electron microscopy (SEM), transmission electron microscopy (TEM), UV-Vis spectroscopy, X-Ray diffraction, Zetasizer, X-Ray Diffraction (XRD), and Fourier transform infrared spectroscopy (FTIR). In addition, to investigate the environmental impact and potential risks of using the chitosan-based nanocomposites on marine organisms and ecosystems of marine environment, the zebrafish model, a widely accepted model for toxicity assessment, was used to evaluate any potential acute toxicology effect of chitosan-based nanocomposites and thereby propose optimal nanocomposites concentration with highest efficiency and minimal environmental impact on marine lives. As discussed below, the C chitosan-based nanocomposites did not show any significant specific acute toxicity or teratogenic phenotype at any of the concentrations tested.

BRIEF DESCRIPTION OF THE DRAWINGS

FIG. 13. XRF analysis of biofilm after 35 days of incubation. (A) SRB alone and (B) SRB with CS@LS.

FIG. 19 shows (A) XRD pattern of CS, LS, and CS@LS-1:1 composite; and (B) FTIR spectra of CS, LS, and CS@LS-1:1 composite.

FIG. 20 shows sedimentation plots for CNLS-NCs plotted at different initial concentration of nanocomposite suspensions.

FIG. 21(A) shows sulfate reduction profiles during reaction time, and FIG. 21(B) shows relative sulfate reduction and organics oxidation inhibition given as % of the control. Batch reactor without any nanomaterials was used as control. Error bars represent the standard deviation of three independent assays.

FIG. 22A shows sulfate reduction and FIG. 22B shows relative sulfate reduction inhibition as % age of control at different concentrations of CNLS-NCs nanocomposites. Batch reactor without any nanomaterials was used as control. Error bars represent the standard deviation of three independent experiments.

FIG. 26(A) shows organics oxidation as TOC and FIG. 26(B) shows specific organics utilization rate (SOUR) profiles during 190 h reaction time. Batch reactor without any nanomaterials was used as control. Error bars represent the standard deviation of three independent experiments.

FIG. 27(A) shows dot plots of green versus red fluorescence of bacterial culture exposed to (i) 0 μg/mL (ii) 300 μg/mL and (iii) 500 μg/mL of CNLS-NCs. FIG. 27(B) shows green fluorescence histograms of viable and dead cells of bacterial culture exposed to (i) 0 μg/mL (ii) 300 μg/mL and (iii) 500 μg/mL of CNLS-NCs.

FIG. 37(A) for 4 days of incubation, FIG. 37(B) for 7 and 10 days of incubation and FIG. 37(C) 21 and 28 days of incubation.

(FIG. 44A) SRB control and (FIG. 44B) SRB enriched media with CZNC-10.

FIG. 48A shows sulfate reduction profiles during 168 h reaction time. FIG. 48B shows % inhibition of sulfate reduction. Batch reactor without any nanomaterials was used as control. Error bars represent the standard deviation of three independent assays.

FIG. 49A shows sulfate reduction profiles during 168 h reaction time. FIG. 49B shows % inhibition of sulfate reduction. FIG. 49C shows residual TOC profiles after 168 h reaction time. FIG. 49D shows % inhibition of organics oxidation at different concentrations of CZNCs. Batch reactor without any nanomaterials was used as control. Error bars represent the standard deviation of three independent experiments.

FIG. 51A shows that Cells in control biofilm were viable with no observed surface damage or cell death protected by intact cytoplasmic membrane. FIG. 51B shows that in presence of 250 μg/mL CZNCs, SRBs sludge biomass suffered from prevalent cell lysis indicated by a severe membrane disruption and cytoplasm leakage.

(FIG. 52A) Carbohydrate, (FIG. 52B) proteins, (FIG. 52C) humic substances, and (FIG. 52D) lipids concentration and inhibition profiles (%) as compared with the control (in the absence of nanomaterials). Error bars represent the standard deviation.

DETAILED DESCRIPTION OF THE INVENTION

Figure 1:
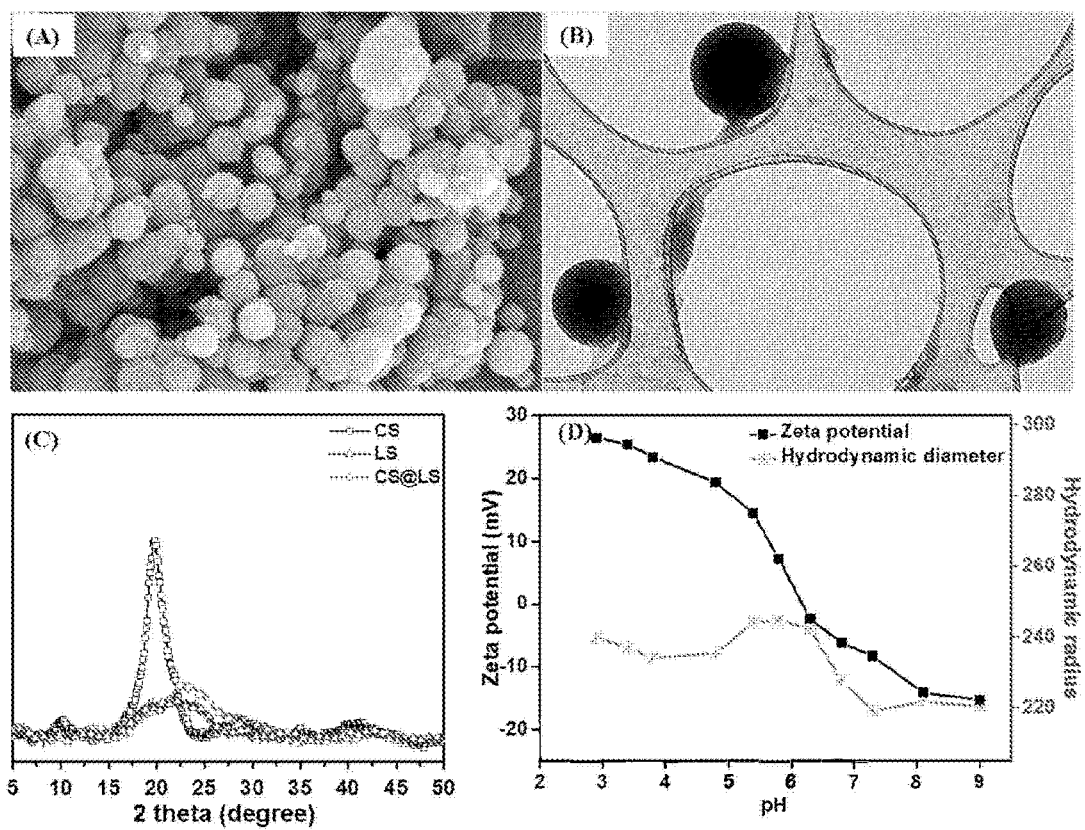
FIG. 1. (A) SEM of CS@LS nanospheres, (B) TEM image of CS@LS (Inset: TEM image of a single nanosphere), (C) X-ray diffraction patterns for CS, LS, and CS@LS and (D) Effect of pH on the size and zeta potential of the CS@LS dispersed in simulated seawater.

Unless defined otherwise, all technical and scientific terms used herein have the same meaning as commonly understood by one of ordinary skill in the art to which this invention belongs. As used herein the following terms have the following meanings.

The term "comprising" or "comprise," as used herein, is intended to mean that the compositions and methods include the recited elements, but not excluding others.

The term "about," when used before a numerical designation, e.g., temperature, time, amount, and concentration, including range, indicates approximations which may vary by (+) or (−) 10%, 5% or 1%.

The term "chitosan," as used herein, refers to a linear polysaccharide composed of randomly distributed 0-(1-4)-linked D-glucosamine (deacetylated unit) and N-acetyl-D-glucosamine (acetylated unit). In one embodiment, chitosan has molecular weight ranging between 50000 Da and 375000 Da. In another embodiment, chitosan has a degree of acetylation between 0 and 99%.

The term "lignin," as used herein, refers to a class of complex organic polymers that form key structural materials in the support tissues of vascular plants and some algae. In one embodiment, lignins refer to cross-linked phenolic polymers.

The term "lignin-based compound," refers to lignin or any derivative of lignin. The non-limiting examples of derivatives of lignin may include lignin, lignosulfonate (Ln), lignosulfonic acid (LS), milled wood lignin, milled wood enzyme lignin, lignocellulose, brauns' native lignin, chemical lignin, klason lignin, organsolv lignin, pyrolytic lignin, steam explosion lignin, lignophenol, kraft lignin, sodium-lignosulfonate, and so on.

The term "crosslink," "crosslinking," or "crosslinked," as used herein, refers to an intermolecular bond joining the individual polymer molecules, or monomer chains, into a more stable structure. In one embodiment, an aldehyde is used as a crosslinking agent.

The term "aldehyde," as used herein, refers to a compound containing a functional group with the structure —CHO, consisting of a carbonyl center (a carbon double-bonded to oxygen) with the carbon atom also bonded to hydrogen and to an R group, which is any generic alkyl or side chain.

In one embodiment, the non-limiting examples of aldehyde may include formaldehyde, phthalaldehyde, glyoxal, succindialdehyde, glutaraldehyde, acetaldehyde, propionaldehyde, butyraldehyde, benzaldehyde (phenylmethanal), cinnamaldehyde, tolualdehyde, furfural, malondialdehyde, dodecyl aldehyde, lauric aldehyde, other types of aldehyde such as dialdehyde, and combinations thereof.

The term "nanocomposite," as used herein, refers to a multiphase solid material where one of the phases has one, two or three dimensions of less than 100 nanometers (nm) or structures having nano-scale repeat distances between the different phases that make up the material. In one embodiment, the application relates to a polymer-based nanocomposite.

In one embodiment, the application relates to a chitosan-based nanocomposite, which is a nanocomposite comprising chitosan as one of its components.

In one embodiment, the application relates to a chitosan-lignin-based nanocomposite, which is a nanocomposite including chitosan and lignin or its derivative as its components. In one embodiment, chitosan and/or lignin or its derivative of a chitosan-lignin-based nanocomposite may be chemically and/or physically crosslinked. In one embodiment, chitosan and/or lignin or its derivative of a chitosan-lignin-based nanocomposite may be chemically crosslinked.

In one embodiment, chitosan and/or lignin or its derivative in a nanocomposite may exist as nanostructures such as nanoparticles.

For example, a chitosan-lignin-based nanocomposite may comprise chitosan nanoparticles and/or lignin or its derivative nanoparticles.

In one embodiment, the application relates to a chitosan-ZnO-based nanocomposite, which is a nanocomposite including chitosan and ZnO as its components.

In one embodiment, chitosan and/or lignin or its derivative of a chitosan-ZnO-based nanocomposite may be chemically and/or physically crosslinked. In one embodiment, chitosan and/or ZnO of a chitosan-lignin-based nanocomposite may be chemically crosslinked.

In one embodiment, chitosan and/or ZnO in a nanocomposite may exist as nanostructures such as nanoparticles.

For example, a chitosan-ZnO-based nanocomposite may comprise chitosan nanoparticles and/or ZnO nanoparticles.

The term "nanoparticle," as used herein, refers to particles having a particle size on the nanometer scale, e.g., less than 1 micrometer. For example, a nanoparticle may have a particle size up to about 500 nm. In another example, the nanoparticle may have a particle size up to about 200 nm. In another example, the nanoparticle may have a particle size up to about 100 nm. In another example, the nanoparticle may have a particle size up to about 50 nm. In another example, the nanoparticle may have a particle size up to about 20 nm. In another example, the nanoparticle may have a particle size up to about 6 nm.

In one embodiment, a nanocomposite may comprise at least one nanoparticle. For example, a chitosan-based nanocomposite may comprise at least one chitosan-based nanoparticle.

In one embodiment, a chitosan-based nanocomposite may comprise at least one chitosan-lignin-based nanoparticle.

A nanocomposite may be chemically and/or physically crosslinked.

In one embodiment, a nanocomposite may be chemically crosslinked.

In one embodiment, a nanocomposite may be physically crosslinked.

In one embodiment, non-limiting examples of a chitosan-lignin-based nanoparticle may include chitosan-lignosulfonate nanoparticles, chitosan-lignosulfonic acid nanoparticles, chitosan-milled wood lignin nanoparticles, chitosan-milled wood enzyme lignin nanoparticles, chitosan-lignocellulose nanoparticles, chitosan-brauns' native lignin nanoparticles, chitosan-chemical lignin nanoparticles, chitosan-klason lignin nanoparticles, chitosan-organsolv lignin nanoparticles, chitosan-pyrolytic lignin nanoparticles, chitosan-steam explosion lignin nanoparticles, chitosan-lignophenol nanoparticles, chitosan-kraft lignin nanoparticles, or combinations thereof.

In one embodiment, the chitosan-lignin-based nanoparticles are chemically and/or physically crosslinked. Non-limiting examples of a chemically and/or physically crosslinked chitosan-lignin-based nanoparticle may include chemically and/or physically crosslinked chitosan-lignosulfonate nanoparticles, chemically and/or physically crosslinked chitosan-lignosulfonic acid nanoparticles, chemically and/or physically crosslinked chitosan-milled wood lignin nanoparticles, chemically and/or physically crosslinked chitosan-milled wood enzyme lignin nanoparticles, chemically and/or physically crosslinked chitosan-lignocellulose nanoparticles, chemically and/or physically crosslinked chitosan-brauns' native lignin nanoparticles, chemically and/or physically crosslinked chitosan-chemical lignin nanoparticles, chemically and/or physically crosslinked chitosan-klason lignin nanoparticles, chemically and/or physically crosslinked chitosan-organsolv lignin nanoparticles, chemically and/or physically crosslinked chitosan-pyrolytic lignin nanoparticles, chemically and/or physically crosslinked chitosan-steam explosion lignin nanoparticles, chemically and/or physically crosslinked chitosan-lignophenol nanoparticles, chemically and/or physically crosslinked chitosan-kraft lignin nanoparticles, or combinations thereof.

In one embodiment, the chitosan-lignin-based nanoparticles are chemically crosslinked. Non-limiting examples of a chemically crosslinked chitosan-lignin-based nanoparticle may include chemically crosslinked chitosan-lignosulfonate nanoparticles, chemically crosslinked chitosan-lignosulfonic acid nanoparticles, chemically crosslinked chitosan-milled wood lignin nanoparticles, chemically crosslinked chitosan-milled wood enzyme lignin nanoparticles, chemically crosslinked chitosan-lignocellulose nanoparticles, chemically crosslinked chitosan-brauns' native lignin nanoparticles, chemically crosslinked chitosan-chemical lignin nanoparticles, chemically crosslinked chitosan-klason lignin nanoparticles, chemically crosslinked chitosan-organsolv lignin nanoparticles, chemically crosslinked chitosan-pyrolytic lignin nanoparticles, chemically crosslinked chitosan-steam explosion lignin nanoparticles, chemically crosslinked chitosan-lignophenol nanoparticles, chemically crosslinked chitosan-kraft lignin nanoparticles, or combinations thereof.

In one embodiment, a chitosan-based nanocomposite may comprise at least one chitosan-ZnO-based nanoparticle. For example, a chitosan-based nanocomposite may comprise at least one chitosan-ZnO-based nanoparticle.

In one embodiment, a chitosan-based nanocomposite may comprise at least one ZnO-chitosan nanoparticles (CZNC).

In one aspect, the present application relates to a chitosan-based nanocomposite as a biocide, an antimicrobial agent and a corrosion inhibitor.

The chitosan-based nanocomposite or a formulation comprising chitosan-based nanocomposite may be used to treat a variety of microorganisms including fungi, algae, sulfate reducing bacteria (SRB) and other bacteria. Thus, the chitosan-based nanocomposite or a formulation comprising chitosan-based nanocomposite may find its use in water treatment and reduction of microbial induced corrosion (MIC). Some non-limiting examples of its use may also include antimicrobial coatings, water disinfection, adsorbent, water pollutant removal, membranes, wastewater treatment, seawater disinfection, food packaging, removal of dyes, Scaffold for tissue engineering, drug delivery, wound dressing, anti-fungal, acid removal, sulfate-reducing bacteria, acid-producing bacteria, iron-reducing bacteria, and others.

In one embodiment, the chitosan-based nanocomposite or a formulation comprising chitosan-based nanocomposite represent effective green biocides with lower toxicity, environmentally benign, and ease of use.

In one embodiment, the chitosan-based nanocomposite or a formulation comprising a chitosan-based nanocomposite may also be eco-friendly and biodegradable with effective inhibition of sulfate-reducing bacteria (SRB) and their induced biocorrosion.

In one embodiment, a formulation comprising:
chitosan; and
further comprising
at least one component selected from the group consisting of lignin, lignosulfonate (Ln), lignosulfonic acid (LS), milled wood lignin, milled wood enzyme lignin, lignocellulose, brauns' native lignin, chemical lignin, klason lignin, organsolv lignin, pyrolytic lignin, steam explosion lignin, lignophenol, kraft lignin and sodium-lignosulfonate, zinc oxide (ZnO), a crosslinking agent, chitosan nanoparticles (ChNPs), ZnO nanoparticles (ZnONPs), lignin nanoparticles, and combinations thereof,
wherein the chitosan is chemically and/or physically crosslinked with the at least one component selected from the group consisting of lignin, lignosulfonate (Ln), lignosulfonic acid (LS), milled wood lignin, milled wood enzyme lignin, lignocellulose, brauns' native lignin, chemical lignin, klason lignin, organsolv lignin, pyrolytic lignin, steam explosion lignin, lignophenol, kraft lignin and sodium-lignosulfonate, zinc oxide (ZnO), a crosslinking agent, and combinations thereof.

In one embodiment, the chitosan is chemically crosslinked with the at least one component selected from the group consisting of lignin, lignosulfonate (Ln), lignosulfonic acid (LS), milled wood lignin, milled wood enzyme lignin, lignocellulose, brauns' native lignin, chemical lignin, klason lignin, organsolv lignin, pyrolytic lignin, steam explosion lignin, lignophenol, kraft lignin and sodium-lignosulfonate, zinc oxide (ZnO), a crosslinking agent, and combinations thereof.

In one embodiment, the formulation comprises a chitosan-based nanocomposite. In one embodiment, the formulation comprises a chitosan-lignin-based nanocomposite. In one embodiment, the formulation comprises a chitosan-ZnO-based nanocomposite.

In one embodiment, the chitosan-lignin-based nanocomposite is chemically and/or physically crosslinked. In one embodiment, the chitosan-lignin-based nanocomposite is chemically crosslinked.

In one embodiment, the chitosan-ZnO-based nanocomposite is chemically and/or physically crosslinked. In one embodiment, the chitosan-ZnO-based nanocomposite is chemically crosslinked.

In one embodiment, non-limiting examples of a crosslinking agent comprises formaldehyde, phthalaldehyde, glyoxal, succindialdehyde, glutaraldehyde, acetaldehyde, propionaldehyde, butyraldehyde, benzaldehyde (phenylmethanal), cinnamaldehyde, tolualdehyde, furfural, malondialdehyde, dodecyl aldehyde, lauric aldehyde, other types of aldehyde such as dialdehyde, or combinations thereof.

In one embodiment, the crosslinking agent is selected from the group consisting of formaldehyde, phthalaldehyde, glyoxal, succindialdehyde, glutaraldehyde, acetaldehyde, propionaldehyde, butyraldehyde, benzaldehyde (phenylmethanal), cinnamaldehyde, tolualdehyde, furfural, malondialdehyde, dodecyl aldehyde, lauric aldehyde, other types of aldehyde such as dialdehyde, and combinations thereof.

In one embodiment, the crosslinking agent is formaldehyde.

In one embodiment, a crosslinking agent is used to chemically and/or physically crosslink components of a chitosan-based nanocomposite, such as a chitosan-lignin-based nanocomposite or a chitosan-ZnO-based nanocomposite.

In one embodiment, a crosslinking agent is used to chemically crosslink components of a chitosan-based nanocomposite, such as a chitosan-lignin-based nanocomposite or a chitosan-ZnO-based nanocomposite.

In one embodiment, a chitosan-based nanocomposite may comprise nanoparticles of any component and/or all components. For example, a chitosan-lignin-based nanocomposite may include chitosan nanoparticles and/or lignin or its derivative nanoparticles, and/or chitosan-lignin nanoparticles.

In one embodiment, a chitosan-ZnO-based nanocomposite may include chitosan nanoparticles and/or ZnO nanoparticles, and/or chitosan-ZnO nanoparticles.

In one embodiment, nanoparticles of a chitosan-based nanocomposite may be in the range of about 1 nm-about 500 nm, about 5 nm-about 300 nm, about 7 nm-about 250 nm, about 10 nm-about 200 nm, about 15 nm-about 100 nm, about 20 nm-about 80 nm, or about 30 nm-about 70 nm.

In one embodiment, nanoparticles of a chitosan-based nanocomposite may be in the range of about 1 nm-about 450 nm, about 2 nm-about 400 nm, about 3 nm-about 300 nm, about 5 nm-about 200 nm, about 10 nm-about 100 nm, about 20 nm-about 90 nm, or about 30 nm-about 80 nm.

In one embodiment, nanoparticles of a chitosan-based nanocomposite may be in the range of about 5 nm-about 500 nm, about 10 nm-about 300 nm, about 20 nm-about 200 nm, about 30 nm-about 150 nm, about 40 nm-about 100 nm, about 50 nm-about 80 nm, or about 60 nm-about 70 nm.

Examples 1-4 show exemplary chitosan-based nanocomposites with nanoparticles.

In one aspect, the present disclosure relates to a chitosan-based nanocomposite

In one embodiment, a chitosan-based nanocomposite comprises chitosan and at least one component selected from the group consisting of chemically and/or physically crosslinked chitosan-lignosulfonate nanoparticles, chemically and/or physically crosslinked chitosan-lignosulfonic acid nanocomposites, chemically and/or physically crosslinked chitosan-milled wood lignin nanoparticles, chemically and/or physically crosslinked chitosan-milled wood enzyme lignin nanoparticles, chemically and/or physically crosslinked chitosan-lignocellulose nanoparticles, chemically and/or physically crosslinked chitosan-brauns' native lignin nanoparticles, chemically and/or physically crosslinked chitosan-chemical lignin nanoparticles, chemically and/or physically crosslinked chitosan-klason lignin nanoparticles, chemically and/or physically crosslinked chitosan-organsolv lignin nanoparticles, chemically and/or physically crosslinked chitosan-pyrolytic lignin nanoparticles, chemically and/or physically crosslinked chitosan-steam explosion lignin nanoparticles, chemically and/or physically crosslinked chitosan-lignophenol nanoparticles, chemically and/or physically crosslinked chitosan-kraft lignin nanoparticles, chemically and/or physically interlinked ZnO-chitosan nanoparticles (CZNC), and combinations thereof.

In one embodiment, the chitosan of the chitosan-based nanocomposite may exist as nanostructures or nanoparticles. For example, chitosan nanoparticles of the chitosan-based nanocomposite may be in the range of about 1 nm-about 500 nm, about 5 nm-about 300 nm, about 7 nm-about 250 nm, about 10 nm-about 200 nm, about 15 nm-about 100 nm, about 20 nm-about 80 nm, or about 30 nm-about 70 nm.

In one embodiment, the at least one component of the chitosan-based nanocomposite may be chemically crosslinked.

For example, the at least one component is selected from the group consisting of chemically crosslinked chitosan-lignosulfonate nanoparticles, chemically crosslinked chitosan-lignosulfonic acid nanocomposites, chemically crosslinked chitosan-milled wood lignin nanoparticles, chemically crosslinked chitosan-milled wood enzyme lignin nanoparticles, chemically crosslinked chitosan-lignocellulose nanoparticles, chemically crosslinked chitosan-brauns' native lignin nanoparticles, chemically crosslinked chitosan-chemical lignin nanoparticles, chemically crosslinked chitosan-klason lignin nanoparticles, chemically crosslinked chitosan-organsolv lignin nanoparticles, chemically crosslinked chitosan-pyrolytic lignin nanoparticles, chemically crosslinked chitosan-steam explosion lignin nanoparticles, chemically crosslinked chitosan-lignophenol nanoparticles, chemically crosslinked chitosan-kraft lignin nanoparticles, chemically interlinked ZnO-chitosan nanoparticles (CZNC), and combinations thereof.

In one embodiment, the at least one component of the chitosan-based nanocomposite may be chemically crosslinked through a crosslinking agent.

In one embodiment, the non-limiting examples of a crosslinking agent comprise formaldehyde, phthalaldehyde, glyoxal, succindialdehyde, glutaraldehyde, acetaldehyde, propionaldehyde, butyraldehyde, benzaldehyde (phenylmethanal), cinnamaldehyde, tolualdehyde, furfural, malondialdehyde, dodecyl aldehyde, lauric aldehyde, other types of aldehyde such as dialdehyde, and combinations thereof.

In one embodiment, the crosslinking agent is selected from the group consisting of formaldehyde, phthalaldehyde, glyoxal, succindialdehyde, glutaraldehyde, acetaldehyde, propionaldehyde, butyraldehyde, benzaldehyde (phenylmethanal), cinnamaldehyde, tolualdehyde, furfural, malondialdehyde, dodecyl aldehyde, lauric aldehyde, other types of aldehyde such as dialdehyde, and combinations thereof.

In one embodiment, the crosslinking agent is formaldehyde.

Examples 1-4 show exemplary chemically crosslinked chitosan-based nanocomposites.

In one aspect, the present disclosure relates to a method of preparing a chitosan-based nanocomposite.

For example, the present disclosure discloses a process of preparing the chitosan-based nanocomposite or its formulation.

In one embodiment, a method of preparing a chitosan-based nanocomposite comprising steps of:
(1) preparing a chitosan (Ch) solution and a lignin-based compound solution;
(2) mixed the chitosan (Ch) solution and the lignin-based compound solution of step (1) together under constant stirring for a first duration of time to form a mixed solution;
(3) preparing a cross-linking agent solution by adding a metal sulfate, an aldehyde, and an acid in water under constant stirring for a second duration of time;

(4) adding a chemically sufficient amount of the cross-linking agent solution gradually with the help of syringe into the mixed solution and stirring the resulting solution for a third duration of time; and (5) washing the resulting solution in step (4) and centrifuging the resulting solution to obtain the chitosan-based nanocomposite.

In one embodiment, the lignin-based compound solution is a lignosulfate solution.

In one embodiment, the lignin-based compound can be any other lignin derivative.

In one embodiment, the first duration of time in step (2) is about 30 minutes.

In one embodiment, the step (2) is conducted under room temperature.

In one embodiment, the metal sulfate is sodium sulfate.

In one embodiment, the metal sulfate can be any other metal sulfate, such as potassium sulfate, Lithium sulfate, and others.

In one embodiment, the aldehyde is formaldehyde.

In another embodiment, the aldehyde is rom the group consisting of formaldehyde, phthalaldehyde, glyoxal, succindialdehyde, glutaraldehyde, acetaldehyde, propionaldehyde, butyraldehyde, benzaldehyde (phenylmethanal), cinnamaldehyde, tolualdehyde, furfural, malondialdehyde, dodecyl aldehyde, lauric aldehyde, other types of aldehyde such as dialdehyde, and combinations thereof.

In one embodiment, the acid is sulfuric acid.

In one embodiment, the water is DI water.

In one embodiment, the second duration of time is about 10 minutes.

In one embodiment, the step (3) is conducted under room temperature.

In one embodiment, the third duration of time is about 30 minutes.

In one embodiment, the resulting solution in step (4) is washed for 5 times with DI water.

In one embodiment, the resulting solution in step (5) is centrifuged at 10,000 rpm.

In one embodiment, the resulting solution in step (5) may be centrifuged at any suitable speed.

In one embodiment, to make the chitosan-based nanocomposite, chitosan and lignin or its derivative or ZnO may be mixed at a ratio between about 100:1 and about 1:100, about 80:1 and about 1:80, about 50:1 and about 1:50, about 30:1 and about 1:30, about 20:1 and about 1:20, about 10:1 and about 1:10, about 5:1 and about 1:5, about 3:1 and about 1:3, about 2:1 and about 1:2, or about 1:1.

For example, the chitosan and the lignosulfonate is mixed at a ratio between 2:1 and 1:2, preferably between 1.5:1 and 1:1.5, more preferably between 1.2:1 and 1:1.2, and most preferably at 1:1.

In one aspect, the present disclosure relates to a method for treating a condition by using the above chitosan-based nanocomposite or its formulation.

In one embodiment, a method for treating a condition selected from the group consisting of antimicrobial coatings, water disinfection, adsorbent, water pollutant removal, membranes, wastewater treatment, seawater disinfection, food packaging, removal of dyes, Scaffold for tissue engineering, drug delivery, wound dressing, anti-fungal, acid removal, sulfate-reducing bacteria, acid-producing bacteria, and iron-reducing bacteria, the method comprising administering a chemically sufficient amount of the formulation comprising the chitosan-based nanocomposite as discussed above.

In one embodiment, a method for treating a condition selected from the group consisting of Antimicrobial coatings, water disinfection, adsorbent, water pollutant removal, membranes, wastewater treatment, seawater disinfection, food packaging, removal of dyes, Scaffold for tissue engineering, drug delivery, wound dressing, anti-fungal, acid removal, sulfate-reducing bacteria, acid-producing bacteria, and iron-reducing bacteria, the method comprising administering a chemically sufficient amount of the chitosan-based nanocomposite as discussed above.

Example 1 shows chitosan/lignosulfonate (CS@LS) nanospheres (one example of the chitosan-based nanocomposite) as green biocides for the inhibition of sulfate-reducing bacteria (SRB) induced biocorrosion on carbon steel.

Example 2 shows eco-friendly and biodegradable lignin reinforced chitosan nanocomposites for efficient inhibition of sulfate reducing bacteria in inject water.

Example 3 shows controlling the biocorrosion of sulfate-reducing bacteria (SRB) on carbon steel using ZnO/chitosan nanocomposite as an eco-friendly biocide.

Example 4 shows "green" ZnO-interlinked chitosan nanoparticles for the efficient inhibition of sulfate-reducing bacteria in inject seawater.

EXAMPLE EMBODIMENTS

Embodiment 1

Materials

Carbon steel (SS400) bars of 8 mm diameter were purchased from local market, Qatar. The chemical composition of carbon steel (SS400) is 99.25 to 100% Fe, 0 to 0.4% Si, 0 to 0.26% C, 0 to 0.05% S and 0 to 0.04% P. PhenoCure compression mounting compound was purchased from Buehler, Illinois Low molecular weight chitosan with 85% degree of deacetylation, Lignosulfonic acid sodium salt, MgSO4, sodium citrate, $CaSO_4$, $NH_4Cl$, NaCl, $Na_2SO_4$, KCl, $SrCl_2$, KBr, $K_2HPO_4$, NaOH, sodium lactate and yeast extract were purchased from Sigma-Aldrich. All chemicals were analytical grades and were used without further purification.

Synthesis of Chitosan-Lignosulfonate Nanocomposite (CNLC)

To prepare the 1:1 ratio CLNC, Ch (30 mL) and Ln (30 mL) solutions were mixed together under constant stirring at room temperature for 30 min. 450 µL of cross-linking solution was added gradually with the help of syringe and resulting solution stirred for additional 30 min. Cross-linking solution was prepared by adding sodium sulfate (1.50 g), formaldehyde (0.541 g), and sulfuric acid (1.25 g) in DI water (4.70 mL) under constant stirring at room temperature for 10 min. The resultant solution was washed five times with DI water, followed by centrifugation at 10,000 rpm to obtain CLNCs. In Similar way, different weight ratio of Ch and Ln (2:1 and 1:2) were used to prepare CLNC 2:1 and CLNC 1:2 cross-linked nanocomposites Coupons Preparation The working coupons were cut from a steel bar in 8 mm diameter and 10 mm height and were hot mounted using (SimpliMet 3000 Automatic Mounting Press, Buehler, Illinois). Coupons were polished using a manual polishing machine (EcoMet 2500 Grinder Polisher, Buehler, Illinois, USA). First, the coupons were ground sequentially from 240 to 1200 grit silicon carbide paper to obtain a smooth surface. Finally, the coupons were polished to a mirror finish with 6, 3 and 1 µm diamond suspensions. Prior to testing, coupons were cleaned with acetone followed by sterilization in absolute ethanol and then dried. The coupons were desiccated when not in use. The surface smoothness of the polished coupons were analyzed by SEM and profilometry since the surface roughness affects the bacterial attachment.

SRB Culture

SRB culture was enriched from sludge biomass (obtained from Al-Shaheen offshore oil filed, Qatar) using Postage's C medium (Postgate, 1984) in simulated inject seawater as described earlier. The pH of the medium was adjusted to 7.5 with 1 N NaOH solution and was heat-sterilized at 15 psi and 120° C. for 20 min. The SRB inoculation was performed at anaerobic chamber having 95% nitrogen and 5% hydrogen. The bacterial culture incubation was carried out in 1 L bottles at 35° C. on a rotary shaker at 110 rpm and was further sub-cultured every week under anaerobic conditions. After 6 months of incubation, a high concentration of an active mixed culture of SRB was obtained and used for further biocorrosion inhibition studies. The concentration of SRB biomass in the culture media was measured in terms of volatile suspended solids (VSS).

Coupons Incubations with SRB Culture

The carbon steel coupons were incubated in liquid medium containing enriched SRB biomass (250 mg·VSS/L) along with modified Postage's C medium in simulated inject seawater. Table Si in the supporting information shows the composition of the inject seawater. 200 ml plastic bottles were used for the incubation experiments. The coupons were incubated without CLNC to evaluate the SRB induced corrosion on carbon steel. In next stage, the optimum conditions of the nanocomposite have been verified by using different ratio nanocomposites as well as optimum concentration has been tested by using different concentrations of optimum ratio CLNC. Then the optimum concentration of CLNC were added in the incubating mixture to evaluate the corrosion inhibition imparted by the nanocomposite at different time intervals. The abiotic conditions were made by incubating coupons in same manner without any SRB and nanocomposite to differentiate the SRB induced corrosion from chemical corrosion. All incubation experiments were performed in anaerobic chamber to maintain the anaerobic condition throughout the experiments. After this, the bottles containing incubation mixtures were keeping in a shaking incubator at 37° C. for different time intervals. Coupons were drawn from the incubation media after definite time intervals and gently washed with DI water prior to each electrochemical and/or spectroscopic analysis.

Characterization

The synthesized CLNCs were characterized by FEI Quanta 650 FEG SEM, after sputtering the samples with gold (3 nm). For SEM and XPS analysis of SRB biofilm, the recovered coupons from the incubation bottles were fixed with 2% glutaraldehyde solution for 2 hours. Then the coupons were washed with DI water, followed by dehydration with 25, 50, 75, 90, and 100% ethanol (vol %) successively for 10 min each. The coupons were then kept dried under nitrogen prior to the analysis. The SEM and EDS analysis were carried out using FEI Quanta 650 FEG SEM, after sputtering the samples with gold (3 nm). XPS analysis of the samples was performed with ESCALAB 250X (Thermo Fisher Scientific) using Al K$\alpha$ excitation radiation (25 W, hv=1486.5 eV) and 1 eV energy resolution. The X-Ray Fluorescence (XRF) analysis of biofilm and corrosion products were carried out using XGT-7200V X-ray Analytical Microscope (Horiba). The bias source is operated at 50 kV in voltage and 0.8 mA in current intensity, and generates an X-ray beam from Rh anode that was collimated in order to produce a spot of 1.2 mm in diameter. In order to study the post corrosion morphology of carbon steel coupons, the biofilm and corrosion products were removed by sonicating the coupon in ethanol three times (10 s each) followed by sonication in a solution containing 5 mL·L$^{-1}$ HCl (37%) and 3.5 g·L$^{-1}$ hexamethylene tetramine for 5 min and finally washing with DI water. SEM and profilometry analysis were performed to study the post corrosion surface features. The coupons after 35 days of incubation with and without CLNC was taken for the analysis after removing the biofilm and corrosion products. In addition, the bare coupon was also imaged for comparison purposes. The SEM analysis was carried out using FEI Quanta 650 FEG SEM, after sputtering the samples with gold (3 nm). Surface profile images were obtained using KLA-Tencor P17 stylus profilometer. Seven measurements were performed from different locations on each coupon. The instrument has a lateral resolution of 2 µm and vertical resolution of about 1 nm. For each location measured, a total area of 400×400 µm was scanned. The data was then processed using Apex3d-7 software to create a surface profile and calculated the average surface roughness ($S_a$) for each sample.

Electrochemical Studies

EIS analysis was carried out using Gamry potentiostat (Gamry 600+, FA, USA) using the SRB treated carbon steel coupon as a working electrode, calomel and graphite disk electrodes as reference and counter electrodes, respectively. After different exposure times, the SS400 hot mounted coupons were removed from the immersion solutions, and mounted into Gamry flow cell for the electrochemical measurements. The electrolyte used for the analysis was simulated inject seawater. The EIS measurements were recorded at an open circuit potential with a 10 mV sinusoidal signal over the frequency range of 0.01-10$^5$ Hz Before the EIS measurements, steady state conditions were achieved by keeping the whole setup at open circuit potential (OCP) for 30 min. Potentiodynamic polarization curves were measured by scanning the potential from −250 mV to +250 mV vs OCP at a sweep rate of 0.167 mV/s. The experimental results were analyzed by Gamry Echem Analyst software version 7.05.

Results and Discussion

Coupon Surface Characterization

The attachment of bacterial cell on a substrate is usually affected by the surface roughness of the substrate material. SEM and profilometry was used to evaluate the smoothness of the polished bare carbon steel coupon. The smooth surface is visible in the SEM micrograph of the polished bare coupon. The 2D and 3D profilometry images of the polished bare coupon. The average surface roughness of the bare coupon surface was calculated from the profilometry images of 7 different locations using Apex3d-7 software. The average surface roughness of bare carbon steel coupon was is 16.8±2.2 nm and this value is appropriate for bacterial attachment.

SRB Induced Corrosion on Carbon Steel

Figure 2:
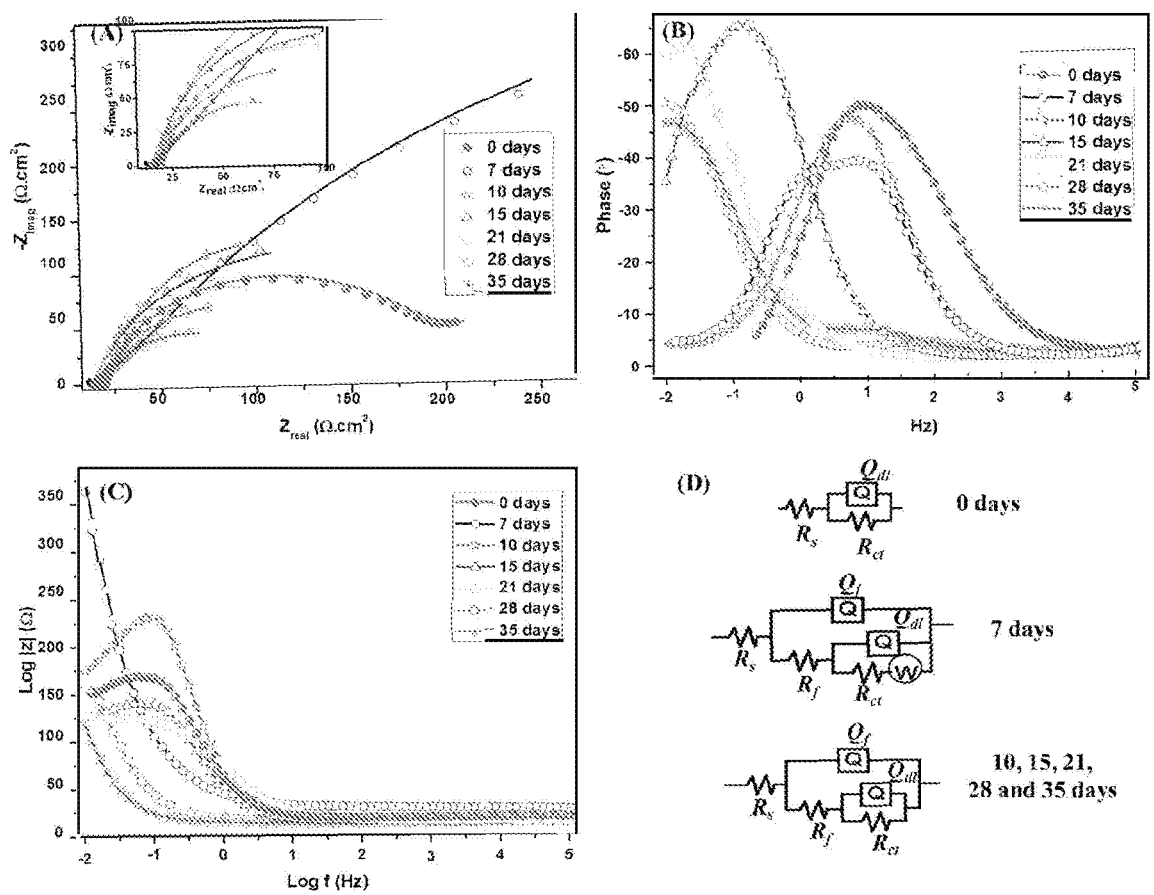
FIG. 2. Nyquist (A), Bode (B and C) plots at SRB enriched media. The inset of (A) is a magnification of the low impedance region. The EIS were obtained at OCP with a 10 mV sinusoidal signal within 0.01-105 Hz. (D) Equivalent circuits used to fit the experimental results.

Electrochemical impedance spectroscopy (EIS) is one of the most reliable methods to evaluate the interfacial phenomena of the biofilm formation and corrosion process development by characterizing electrochemical reactions at the metal/biofilm interface. The SRB induced corrosion on carbon steel has been investigated by incubating the carbon steel coupon in liquid medium containing enriched SRB biomass (250 mg·VSS/L) along with modified Postage's C medium in simulated inject seawater. The incubated coupons drawn from the reaction mixture at different time intervals and analyzed by EIS after 7, 10, 15, 21, 28 and 35 days. The Nyquist and bode plots of the experiment is shown in FIG. 1. These results were further analyzed by fitting with an appropriate equivalent electrical circuit. FIG. 2 shows the equivalent circuits proposed to model the respective EIS data of the SS400 coupons exposed to the SRB inoculated media. In the equivalent circuits, $R_S$ represent the resistance of the electrolyte solution, $Q_f$ represent the constant phase element (CPE) of passive film, $R_f$ represent the resistance of the passive film, $Q_{d1}$ represent CPE of the electrical double layer, $R_{ct}$ represent the charge transfer resistance of electrical double layer, and W represent Warburg impedance due to electrochemical process controlled by diffusion. Since the SRB biofilm provides more prominent effect during initial days of incubation, an additional term W is used in the equivalent circuit. The term W corresponds to electrochemical process controlled by diffusion alone due to the biofilm influence. For longer incubation times, the influence of biofilm compared to corrosion product film is less as seen in Bode phase angle plots and hence, the term W is removed from the circuit.

As observed in FIG. 2, the diameter of Nyquist semicircles after 7 days is high compared to other incubation times and it can be attributed to the complete biofilm formation by SRB, which reaches its maximum at 7 days. After 7 days, the diameter of Nyquist semicircles shows a gradual decrease with time, which is associated with the gradual breakdown in the biofilm protection, which leads to faster corrosion rates. The diameters of the semicircles continue to decrease as time goes on which indicates increase in corrosion rates due to the further breakdown of the biofilm. A capacitive semicircle loop appeared at high frequencies only for 7 days of incubation mainly due to the precipitation of the corrosion product along with biofilm results in a porous and less adherent outer layer. This high frequency semicircle is disappeared for longer incubation times and the Nyquist plot behavior is also different for 7 days of incubation compared to longer incubation times. However, when steady state is reached after biofilm formation, mass transfer limitations dominate over the interfacial activation, which changes the behavior of Nyquist plot from semicircle to a straight line at very lower frequencies. A constant phase element ($Q_f$) is associated with the behavior of this film as shown in the equivalent circuits. The corresponding Bode plots are given in FIGS. 2(B) and 2(C). The phase angle θ vs. log frequency plots shows that the phase peak shifts to the low frequency side with increasing incubation times. This frequency shift confirm the formation of a porous, conductive iron sulfide layer on carbon steel coupon with high electrical capacitance value as result of SRB activity. In the absence of SRB, the semicircle's behavior is different at 7 and 10 days of incubation compared to the longer incubation intervals. The passivity of the carbon steel obviously increases by the presence of phosphates/chlorides in the control medium which can inhibit corrosion by forming inhibitive film. The straight-line behavior at lower frequency region corresponds to formation of a stable film was formed during 7 days of incubation. The Nyquist plot diameter decreases progressively and the phase peak was shifted to a low frequency upon increasing the incubation time, with much lower corrosion rate as compared with the presence of SRB.

Table 1 gives the $R_{ct}$ as well as $R_f$ values after EIS fitting and table Si shows the complete EIS fitting data. The $R_{ct}$ values are high for 7 days of incubation compared to other incubation times that can be attributed to maximum biofilm formation occurred at 7 days. The $R_{ct}$ values is maximum at 7 days of incubation and keep on decreasing as the incubation time increases. The decrease in $R_{ct}$ value results in an increase of the dissolution kinetics of the metallic surface due to the fast corrosion rates induced by the breakdown of the biofilm. Similarly, the $R_f$ values are highest at 7 days of incubation and the values are decreasing slowly with increase in incubation times. The decrease in $R_f$ value indicates decrease in protective effect of the biofilm and corrosion product films on the coupon surface, resulting in enhanced corrosion.

Figure 3:
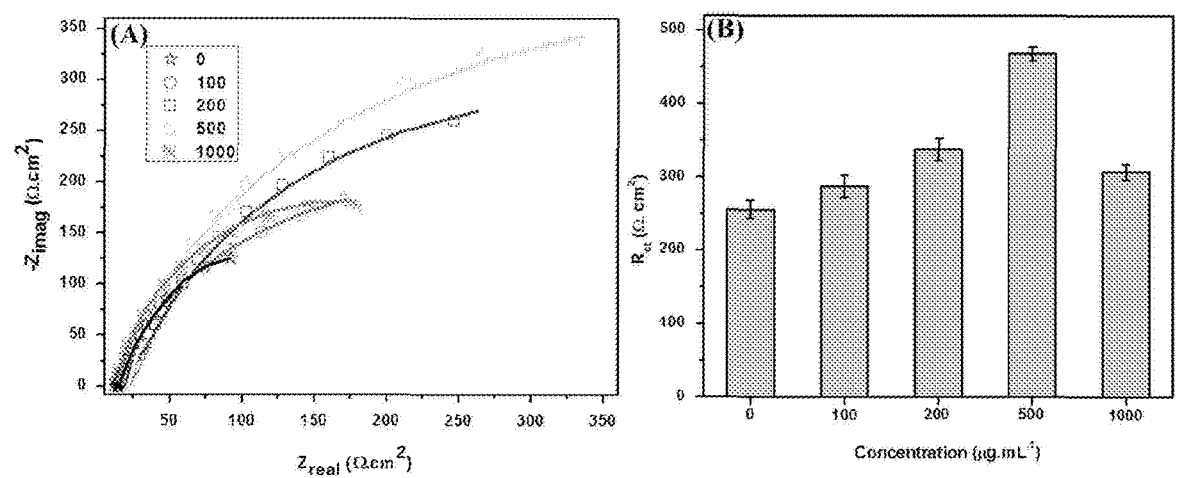
FIG. 3. (A) The Nyquist plot of the coupon incubated with SRB with CS@LS with different concentrations from 0 to 1000 μg·mL-1. The impedance analysis was performed after 10 days of incubation. (B) The Rct vs concentration of CS@LS after 10 days of incubation. The standard deviation is from three repetitive measurements.

Effect of Chitosan to Lignosulfonate Ratio of Nanocomposite Towards Corrosion Inhibition The effect of Ch to Ln ratio of nanocomposite towards corrosion inhibition was performed by using different ratio CLNCs such as 1:1, 1:2 and 2:1. The concentration used was 500 μg·mL$^{-1}$ and impedance analysis was performed after 15 days of incubation by keeping all other conditions remains unchanged. From our previous studies, it was found that the SRB induced corrosion starts progressing after 10 days of incubation. The Nyquist and bode plots of the experiment is shown in FIG. 3. The equivalent circuit shown in FIG. 2(D) was used for fitting the impedance plot. It is found that 1:1 ratio of Ch:Lig nanocomposite having highest corrosion inhibition compared to other ratio nanocomposites. The $R_{ct}$ values of the 1:1, 1:2 and 2:1 ratio nanocomposites are 296, 202, 217Ω respectively. Hence, the 1:1 ratio CLNC was used for further experiments. SEM analysis of the all nanocomposites was carried out to validate the possible reason behind the highest corrosion inhibition of 1:1 nanocomposites. It was found that only 1:1 CLNC displayed well dispersed spherical particles of 50-100 nm sizes. The morphology of the 1:2 CLNC displayed aggregated spherical particles of 40-80 nm sizes and the morphology of the 2:1 CLNC displayed film layer structures with embedded nanoparticles. From SEM images, it was observed that the spherical well dispersed nanoparticles are formed with 1:1 ratio of the reactants and this was considered as the optimum ratio for nanocomposite with spherical well dispersed nanoparticles. The highest corrosion inhibition of 1:1 CLNC can be attributed to the high antimicrobial activity of these well dispersed nanoparticles against SRB.

Effect of CLNC Concentration Towards Corrosion Inhibition

In order to evaluate the effect of CLNC concentration towards corrosion inhibition, different concentrations of 1:1 ratio CLNC from 100 to 1000 μg·mL$^{-1}$ have been added to the incubation mixture. The impedance analysis was performed after 10 days of incubation. The Nyquist plots of the experiment is shown in FIG. 3. The equivalent circuit shown in FIG. 2(D) was used for fitting the impedance plot. The plot between $R_{ct}$ values and concentration of CLNC is given in FIG. 4(B). It was found that 500 μg·mL$^{-1}$ concentration showing maximum corrosion inhibition compared to other concentrations. The higher concentration of 1000 μg·mL$^{-1}$ makes precipitation with media solution immediately after adding the nanocomposite and this precipitation not occurred with other concentrations. The precipitate settle downs in bottom of the incubation mixture so that it is not completely active against SRB induced corrosion. Hence, 500 μg·mL$^{-1}$ was selected as the optimum concentrations of nanocomposite for further experiments.

Figure 4:
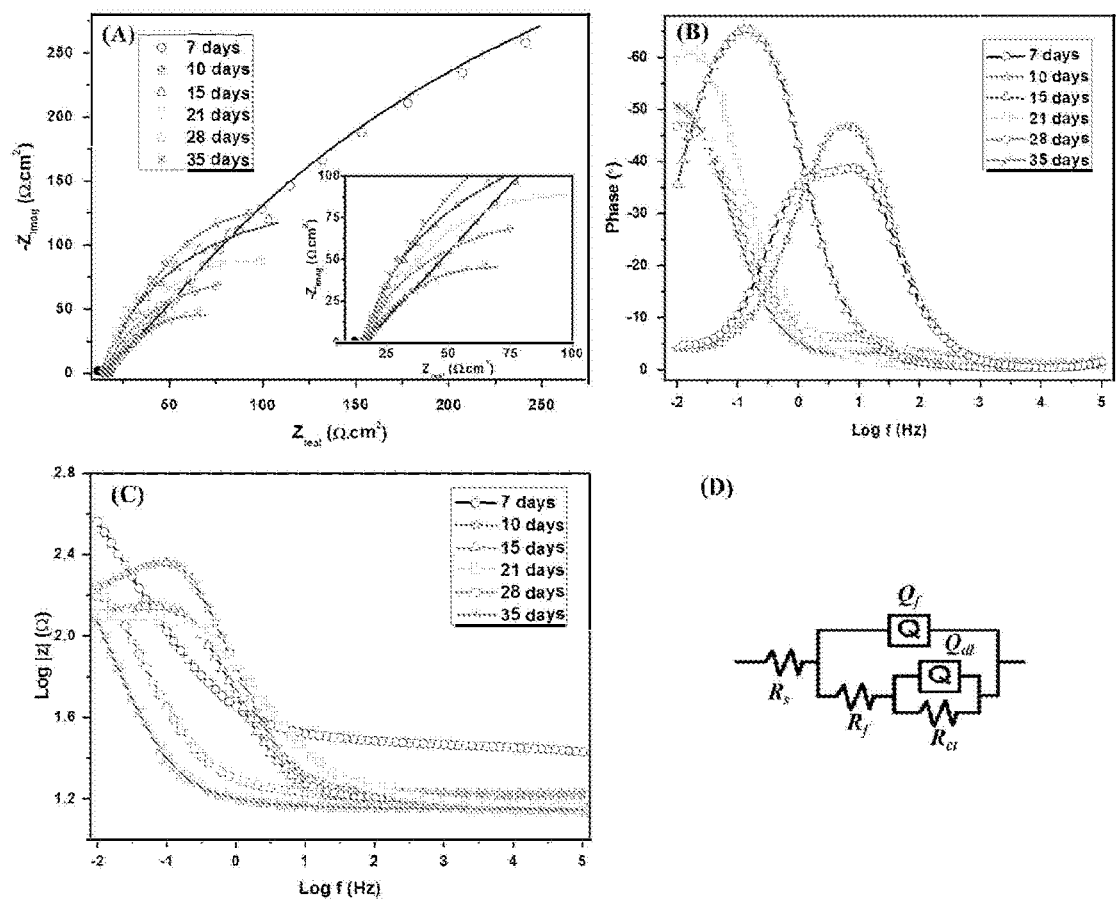
FIG. 4. Nyquist (A), Bode (Band C) plots of SRB with CS@LS. The inset is a zoom of the low impedance region. The EIS were recorded at OCP with a 10 mV sinusoidal signal at a range of 0.01-105 Hz. (D) Equivalent circuit used to fit experimental results.

Detailed Investigation of the Inhibition Effect CLNC Against SRB Induced Corrosion The inhibition effect of CLNC on SRB activity and biofilm formation as well as corrosion products formation on carbon steel coupons was investigated by incubating the carbon steel coupon in liquid medium containing enriched SRB biomass (250 mg·VSS/L) along with 500 μg·mL$^{-1}$ CLNC. The incubated coupons drawn from the reaction mixture at different time intervals and analyzed by EIS after 7, 10, 15, 21, 28 and 35 days. The Nyquist and bode plots of the experiment is shown in FIG. 4. The same equivalent circuits shown in FIG. 4(D) were used for this analysis. The Nyquist plot showed the same trend as the SRB corrosion experiments but the diameter is high irrespective of the incubation times. The increase in diameter of the Nyquist plot showed the corrosion inhibition due to the presence of nanocomposites. However, the Nyquist plot behavior is different for 7 days of incubation compared to longer incubation times and there is no high frequency capacitive loop for 7 days of incubation in presence of nanocomposite. The disappearance of high frequency capacitive loop correspond to formation of a strong nanocomposite layer on the surface along with the SRB biofilm. This formation of nanocomposite layer on the metal surface was also confirmed by the increase in $R_f$ values. At longer incubation times, steady state may be achieved and mass transfer limitations dominate over the interfacial activation, which results in the Nyquist plot behavior from semicircle to a straight line at lower frequencies.

The phase angle θ vs. log frequency plots shows that the phase peak shifts to the low frequency side with increasing incubation times similar to the SRB corrosion experiments. However, the intensity of the frequency shift towards the low frequency region is less compared to the SRB corrosion experiments, which give further confirmation of corrosion inhibition of the CLNCs.

The $R_{ct}$ value is maximum at 7 days of incubation and the values are decreasing with increasing the incubation times (Table 1). However, the $R_{ct}$ values are approximately 1.75-1.85 times higher than the SRB corrosion experiments irrespective of incubation interval and this enhancement in the $R_{ct}$ value is due be due to the corrosion inhibition effect of nanocomposites. The nanocomposite may form a layer on the carbon steel surface along with the biofilm formation and this can be verified by comparing the $R_f$ values during the initial incubation times. The $R_f$ values of the experiments with nanocomposites are 3-3.7 times higher than the SRB corrosion experiments for 7-15 days of incubation confirmed the formation of nanocomposite film on the surface. The biofilm breakdown has been occurred with the passage of time which is confirmed by the decrease in the $R_f$ values with longer incubation times.

The relative increase in the corrosion inhibition efficiency (IE) is calculated by using the equation $$IE=(R_{ct}'-R_{ct})/R_{ct}' \quad (1)$$

where $R_{ct}$ is the charge transfer resistance of the coupon incubated in SRB with CLNC and $R_{ct}$ is the corresponding charge transfer resistance in presence of SRB alone. The % IE for each incubation times is given in Table 1. The IE is calculated as 68%, 82%, 80%, 85%, 80 and 78% for 7, 10, 15, 21, 28 and 35 days of incubation, respectively.

TABLE 1

$R_{ct}$, $R_f$ and IE values after EIS fitting.

| Coupon incubated in | Incubation time (day) | $R_f$ (Ω·cm²) | $R_{ct}$ (Ω·cm²) | IE (%) |
|---|---|---|---|---|
| SRB alone | 7 | 79.71 | 363.6 | — |
| | 10 | 75.67 | 256.1 | — |
| | 15 | 69.4 | 173.8 | — |
| | 21 | 45.4 | 137.2 | — |
| | 28 | 38.64 | 107.9 | — |
| | 35 | 23.61 | 88.4 | — |
| SRB with CLNC (500 µg·mL⁻¹) | 7 | 292.7 | 609 | 68 |
| | 10 | 249.2 | 468 | 82 |
| | 15 | 209 | 312.8 | 80 |
| | 21 | 129.7 | 254.6 | 85 |
| | 28 | 90.65 | 193.2 | 80 |
| | 35 | 71.2 | 157.3 | 78 |

The corresponding electrochemical parameters were listed in Table 2. It can be seen that the corrosion current densities $I_{corr}$ is lower in presence of nanocomposite suggesting the corrosion inhibition of nanocomposite. The inhibition efficiency was calculated from $I_{corr}$ values using the equation, $$\text{Inhibition efficiency}=(I_{corr}-I_{corr}(\text{with CLNC})/I_{corr})\times 100 \quad (2)$$

and it was found that the inhibition efficiency was approximately 75%. The corrosion potential is higher for SRB alone also confirms the higher corrosion rate induced by SRB in absence of nanocomposite. The corrosion rate is reduced by 52% in presence of CLNC in comparison with SRB alone. The results of potentiodynamiic polarization curve measurements are in complement with EIS data.

TABLE 2

Electrochemical parameters fitted from the potentiodynamic polarization under different corrosion conditions after 21-day incubation.

| Coupon incubated in | $\beta_a$ (V dec⁻¹) | $\beta_c$ (V dec⁻¹) | $E_{corr}$ (V vs. SCE) | $I_{corr}$ (µA cm⁻²) | Corrosion rate (mpy) |
|---|---|---|---|---|---|
| SRB alone | 0.120 | 0.210 | −0.753 | 11.95 | 10.10 |
| SRB with CLNC | 0.077 | 0.0933 | −0.697 | 3.050 | 4.831 |

Coupon Surface Characterization by SEM and XPS

The effect of CLNC on SRB activity and biofilm formation as well as corrosion products formation on carbon steel coupons was investigated by SEM, EDS, and XPS. 500 µg·mL⁻¹ CLNC is used to evaluate effect of nanocomposite on SRB biofilm formation as it is found to be the optimum concentration for maximum corrosion inhibition. The structural characteristics of biofilm formation and corrosion product formation on the coupons are analyzed by SEM after 4, 7, 21 and 35 days of incubation in the absence and presence of CLNC.

Figure 11:
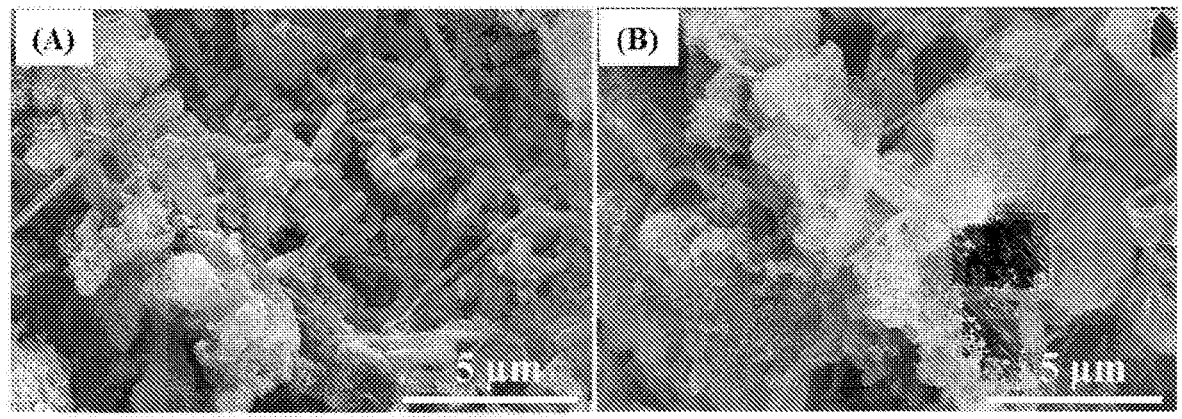
FIG. 11. SEM micrographs of the biofilm incubated in SRB enriched media after 4 days incubation in the absence (A) and presence (B) of 500 $\mu g \cdot mL^{-1}$ of the CS@LS.

Generally, carbon steel is vulnerable to bacterial adhesion and biofilm formation, when it contact with SRB. During initial phase of biofilm formation, bacterial cells start to metabolize and produce a high proportion of exopolysaccharides (EPS) which can easily adhere to the metal surface to form a biofilm. Therefore, many active bacteria can be adhered onto coupon surface along with EPS results in the formation of biofilm. The presence of EPS is visible on the surface after 4 days of incubation along with SRB cell (FIG. 11). However, in presence of CLNC inhibitor, different morphology of EPS is visible due to possible complex formation with nanocomposite. Few SRB cells are present on the surface but without proper cell morphology (FIG. 11). After 7 days of incubation, the adhesion of numerous active SRBs can be visible in the SEM images of coupon surface (FIG. 5(A)). However, in presence of CLNC, the number of attached SRB cell is significantly reduced with obvious damage on the surface of the individual cell (FIG. 5(B)). The nanocomposite may form layer on the surface that prevents the bacterial attachment to the surface which is confirmed by the less number of bacteria on the surface. The antibacterial effect of nanocomposite results in the damage of bacterial cell mainly in cell wall as seen in the SEM image. Similar observations of cell wall damage were reported as the effect of other nanomaterials on different bacterial communities. By lengthening the exposure time to 21 days, a uneven deposits of corrosion products along with complex porous structure of biofilm along with SRB cells are visible on the coupon surface exposed to SRB alone (FIG. 5(C)). In contrast, with the presence of CLNC, SEM micrographs show dissimilar morphology of corrosion product and biofilm with very few damaged bacteria on the surface (FIG. 5(D)). This is attributed to the biocidal effect of CLNC that inhibits the growth of SRB, which significantly affects the corrosion processes. After 35 days of exposure, corrosion products are dominant on the surface along with limited biofilm structure in the case of coupon exposed to SRB alone (FIGS. 5(E) and 5(F)). In presence of CLNC, the similar observation is present but with different morphology of corrosion product. No bacteria are visible on the surface in both the cases, however Bacteria may present inside the corrosion product layer. The different morphology of the corrosion product is an implication of difference in corrosion products on the surface in presence of nanocomposite. Further quantitative analysis is required to differentiate the corrosion products in the presence and absence of CLNC.

Figure 12:
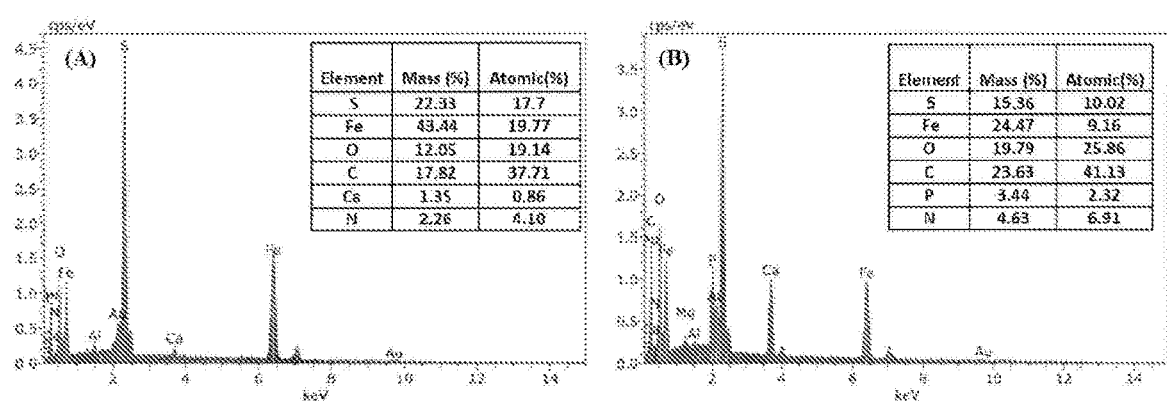
FIG. 12. EDS analysis of biofilm after 35 days of incubation. (A) SRB alone and (B) SRB with CS@LS.

Sulfur and iron content in the biofilm are strong evidence of SRB activities of sulfate reduction since it results in the formation of iron sulfides. EDS and XRF analysis are performed to quantify the sulfur and iron content on the film. According to the semi-quantitative EDS analysis of the biofilm after 35 days incubation, a reduction in the concentration of Fe and S content by 43% and 31% respectively was observed in the presence of CLNC inhibitor. (FIG. 12). The XRF analysis also showed the reduction in Fe and S content by 56% and 29% respectively in the presence of nanocomposite inhibitor (FIG. 13). The reduction in Fe and S content confirmed the inhibition in the SRB activity by the CLNC. The reduction in Fe and S content was further confirmed by XPS analysis (see next session).

Figure 14:
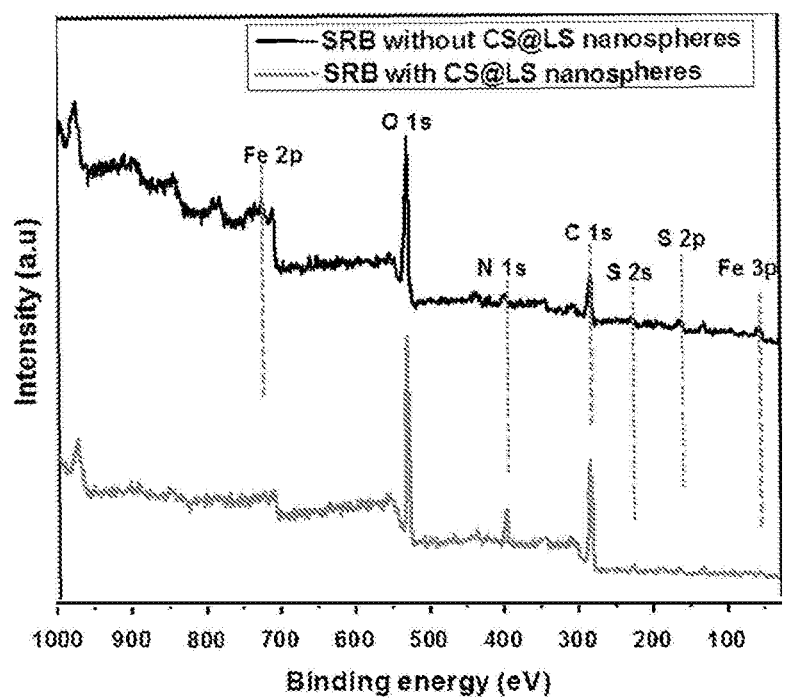
FIG. 14. Wide XPS spectra for surface of carbon steel coupon incubated in SRB-enriched media alone and with 500 μg·mL-1 of CS@LS after 35 days of incubation.

XPS analysis is used to differentiate between the corrosion products on the carbon steel coupons exposed to SRB culture with and without nanocomposite. FIG. 14 shows wide XPS survey scan of corrosion products on the treated coupons after 35 days of incubation in SRB-enriched media in the presence and absence of 500 $\mu g \cdot mL^{-1}$ of CLNC. The peaks for Fe 3p, Fe 2p, C 1s, O s, S 2p and S 2s are observed in all samples spectra, which can be attributed to biofilm and corrosion products on the carbon steel coupons. The peaks for S 2p and S 2s are confirmed the presence of sulfide and organic sulfur as a result of the SRB activity. However, the lesser peak intensities of Fe 2p, S 2s and S 2p in the coupon incubated in presence of nanocomposite revealed the inhibition effect of the nanocomposite towards SRB growth. In addition, the high-resolution XPS spectra of Fe 2p and S 2p are examined to confirm the reduction in the intensity of XPS peak as well as to evaluate the corrosion products.

FIG. 6(A) and FIG. 6(B) show the high-resolution spectra and curve fitted Fe 2p peaks obtained from 35 days incubation in the absence and presence of nanocomposite respectively. Two sharp peaks at 709.6 eV which corresponds to FeO and at 707.6 eV (Fe $2p_{3/2}$) corresponds to mackinawite (Fe1+xS) as well as pyrite (FeS$_2$) present in the spectra of both the coupons. In addition, a peak at around 712.4 eV, corresponds to Fe3+ originated from Fe$_2$O$_3$ is present in both the coupons. A sharp peaks at around 710.4 eV (Fe $2p_{3/2}$) correspond to FeS is present in the coupon exposed to SRB alone. A peak at 713.8 eV (Fe $2p_{3/2}$), corresponding to Fe(III)O originated from Fe$_2$O$_3$, is present in coupon incubated with CLNC. From the XPS analysis, it was found that the corrosion products are mainly FeO, FeS, FeS$_2$ and Fe$_2$O$_3$. However, FeS peak is prominent only in the coupon exposed to SRB alone which confirmed the SRB activity as well as reduction in SRB activity in presence of CLNC.

The curve fitted S 2p spectrum after 35 days (FIG. 6(C) and FIG. 6(D)) shows a monosulfide ($S^{2-}$) peak at 161.4 eV (S $2p_{3/2}$), disulfide ($S_2^{2-}$) peak at 162.3 eV and polysulphide ($S_n^{2-}$) species peak at 163.8 eV in both coupons. Additionally, a peak at 167.4 eV corresponds to sulphite ($SO_3^{2-}$) is also present in both coupons. The ($S^{2-}$) and ($S_2^{2-}$) peaks could originate from the Fe—S bond and the $S_n^{2-}$ peak may be originates from S—S bonds. However, additional peaks at 166 eV corresponds to sulphite ($SO_3^{2-}$), at 165 eV corresponds to S $2p_{1/2}$ component of S type sulfur and at 168.8 corresponds to $SO_4^{2-}$ (S $2P_{3/2}$) were present in the coupon incubated with CLNC. The reduction in the intensity of monosulfide, disulfide and polysulphide species peaks in presence of CLNC reveals the significant inhibition of SRB activity.

Post Corrosion Morphology

Figure 8:
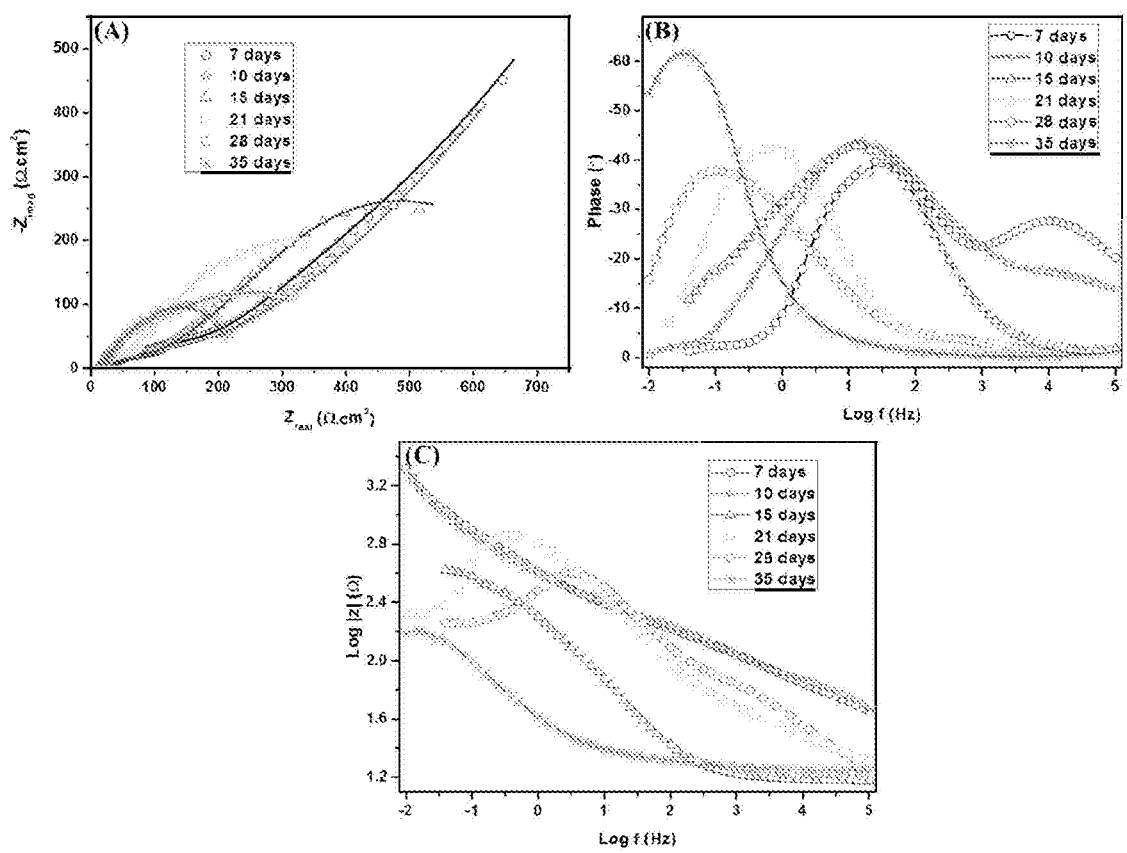
FIG. 8. The Nyquist (A) and Bode (B and C) plots of the coupon incubated in abiotic media.

SEM and surface profilometry are used to examine the surface of the coupon after cleaning it from biofilms and corrosion products. The biofilm is removed by sonication in ethanol and the corrosion products are removed by sonication in hydrochloric acid-hexamethylene tetramine mixture as described in the experimental section. The well-known mechanism of SRB-mediated biocorrosion involves the formation of H25 results in the precipitation of iron sulfides and the formation of elemental sulfur. It is known that the presence of sulfides can induce pitting on steel in solutions with or without chloride-ions. FIG. 8 shows the SEM images of pits observed on the coupon surface after removing the corrosion products. Pits size was greater in the coupon incubated in SRB alone than the coupon incubated in SRB with nanocomposite. The largest pit was observed in the coupon incubated SRB alone is around 8.2 μm while the largest pit was observed in the coupon incubated SRB with nanocomposite is only 4 μm. These results were correlated with EIS and XPS data.

Figure 16:
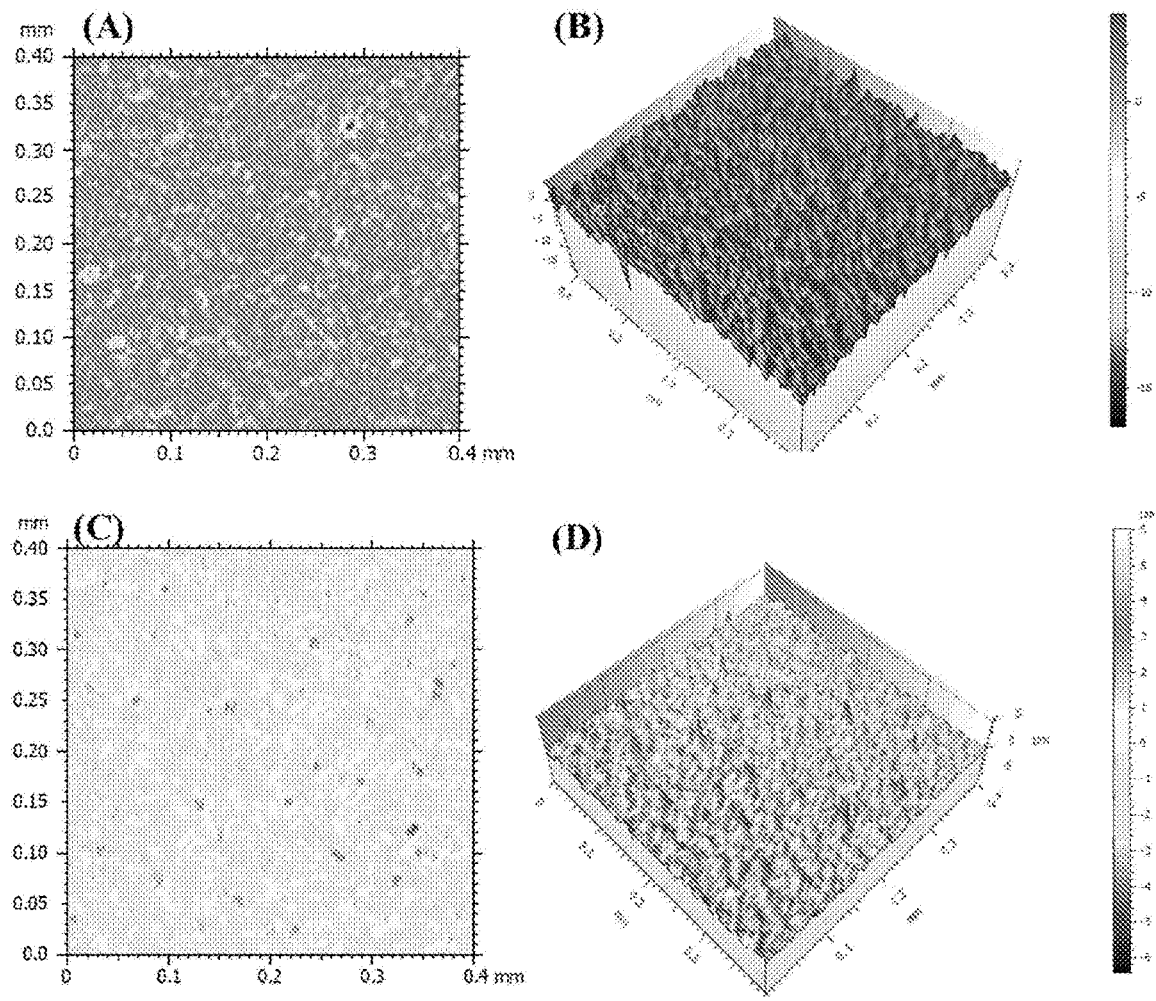
FIG. 16. 2D and 3D Profilometry images of the cleaned carbon steel coupon surface after 35 days of incubation in SRB (A and B) and SRB with CS@LS (C and D) respectively.
Figure 17:
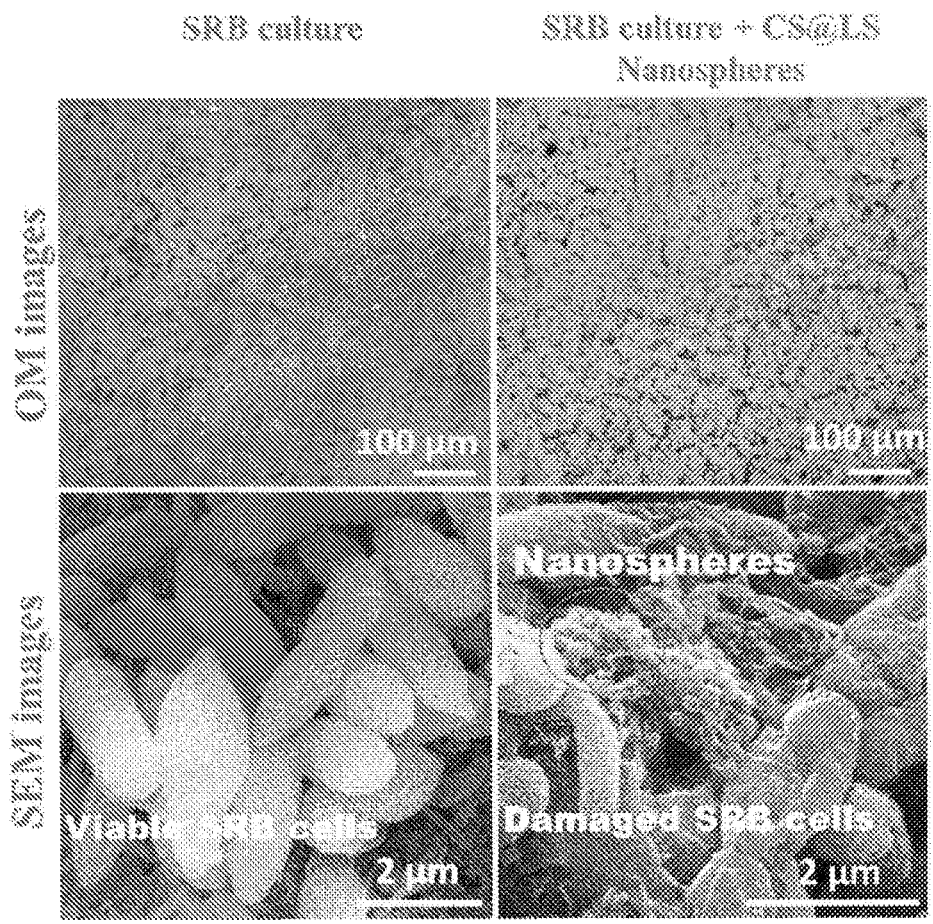
FIG. 17 shows that covalently cross-linked chitosan/lignosulfonate (CS@LS) nanospheres with average diameters of 150-200 nm have been successfully used for the inhibition of mixed sulfate-reducing bacteria (SRB) biomass and thereby controlling microbiologically influenced corrosion (MIC) on carbon steel. CS@LS nanospheres at 500 μg·mL-1 have been used efficiently for the inhibition of SRBs induced corrosion up to a maximum of 85% with about two folds increase of charge transfer resistance (Rct) on carbon steel (SS400) coupons.

FIG. 16 shows high resolution profiles of the coupon surface after removing the corrosion products from the surface from coupon incubated in SRB alone and in SRB with nanocomposite. The biofilm is removed by ethanol and the corrosion products are removed by hydrochloric acid-hexamethylene tetramine mixture as described in the experimental section. Seven measurements were performed from different locations on each coupon. After 35 days of incubation (FIGS. 16A and 16B) the average roughness of the coupons is 780.3±19.5 nm in absence of CLNC inhibitor. While in presence of CLNC inhibitor, the average surface roughness is 457.6±16.1 nm. The surface is smoother in presence of nanocomposite in comparison with the surface without nanocomposite. The surface roughness of the coupon was reduced to approx. 40% in presence of the nanocomposite. The reduction in the surface roughness is due to the corrosion inhibition provided by the CLNC the coupon surface.

Corrosion Comparison at Different Conditions

Figure 10:
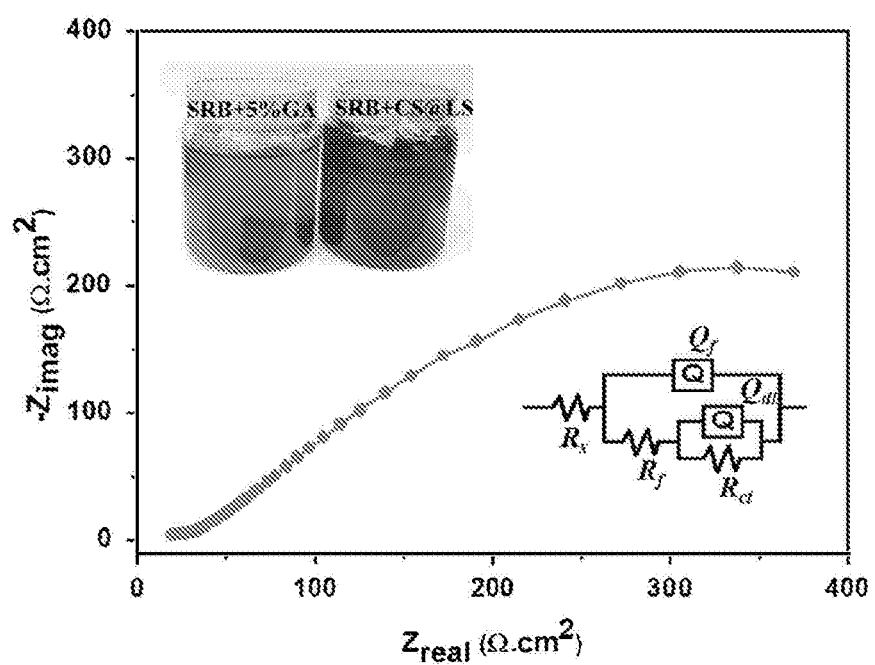
FIG. 10. The Nyquist plot of the coupon incubated in SRB media with 5% GA after 15 days of incubation. Inset shows the equivalent circuit used for fitting and the photographs of the incubation mixtures after 15 days of incubation.

In order to compare the SRB corrosion at different conditions, four different conditions such as abiotic conditions (without SRB), biotic conditions with SRB, SRB with CLNC inhibitor and SRB with commercial biocide, 5% glutaraldehyde (GA) were investigated by electrochemical impedance spectroscopy and SEM analysis. FIG. 10 shows the Nyquist plots of the coupons incubated in different corrosion conditions after 15 days of incubation. The equivalent circuit shown in FIG. 10 was used for fitting the EIS data. In abiotic conditions, a small high frequency semicircle loop appeared due to the formation of porous and poorly-adherent outer layer as a result of precipitation of the corrosion product mixture of chlorides, phosphates and carbon-based compounds. After reaching the steady state, mass transfer limitations dominate over the interfacial activation, which results in change of semicircle behavior from semicircle to straight line at medium and low frequencies. The behavior of Nyquist plot of abiotic condition is entirely different from other conditions. The diameter of Nyquist plot is low for SRB cultures in comparison with abiotic conditions suggesting that high corrosion occurred in presence of SRB. The diameter of Nyquist plot is high for SRB with CLNC compared to SRB only and SRB with GA, which can be attributed to the corrosion inhibition induced by the CLNC. In the case of SRB with 5% GA, complete bacterial growth can be inhibited; however, the chemical reaction between the SRB media and GA may lead to a chemical corrosion which is evidenced from the color change of media solution to pink from light black color. The light black coulor of the solutions is due to the presence of SRB and the color is become dark as time goes on. Therefore, it is confirmed that the CLNC inhibits SRB induced corrosion in an efficient manner than GA. In abiotic condition, the coupon surface is covered with a layered structure along with some deposited corrosion products as a result of chemical corrosion. In presence of SRB, several bacteria along with biofilm and corrosion product are visible on the coupon surface. The presence of CLNC nanocomposite inhibits the bacterial growth as well corrosion which was evidenced by the reduction in the number of bacteria as well as structural damage on the SRB on the coupon surface. Few damaged bacteria are present on the surface along with corrosion products and film like structure made of possibly by biofilm and/or nanocomposite. In presence of GA, no bacteria are visible and different morphology was observed in comparison with abiotic condition suggesting that a chemical reaction occurred between GA and SRB media solution.

Chitosan-lignosulfonate nanocomposite (CLNC) has been successfully evaluated as a new novel green biocide for the inhibition of SRB and combating SRB induced biocorrosion. It was found that 1:1 ratio CLNC at 500 $\mu g \cdot mL^{-1}$ as the optimal inhibitory concentration for SRB. From the electrochemical analysis, it is found that the corrosion inhibition is maximum at 7 days of incubation due to the biofilm formation by SRB. From SEM and XPS analysis, it was found that nanocomposite significantly reduced biocorrosion by inhibiting bacterial growth and co-forming of a more protective film to prevent the bacterial attack. The EDS and XRF analysis showed that iron and sulfur content in the biofilm is significantly reduced in presence of nanocomposite. The XPS analysis suggested that the corrosion products, mainly iron oxides and iron sulfides, and are significantly reduced in presence of nanocomposite due to inhibitory action of nanocomposite against SRB. The profilometry analysis showed less corrosion damages on the coupon surface incubated with CZNC-10. In short, the CLNC can be used an effective eco-friendly corrosion inhibition system against SRB towards the mitigation of MIC especially on carbon steels.

Embodiment 2

Materials

Low molecular weight (LMW) Chitosan with 85% degree of deacetylation was purchased from Sigma Aldrich Co., Ltd (USA). Zinc nitrate (hexahydrate), trypolyphosphate (TPP), sodium hydroxide were obtained from Fisher Scientific. SRBs culture was enriched from biofilm sludge obtained from MAERSK Oil Research Center (MORTC), Qatar. Deionized (DI) water was used to prepare all solutions. All other chemicals were analytical grade and used without further purification.

Synthesis of Chitosan-Lignosulfonic Acid Nanocomposites (CNLS-NCs)

CNLS-NCs was prepared by crosslinking of chitosan with a cross liker solution as describes. Chitosan (10 mg/mL) was dissolved in an aqueous solution of 1% (w/w) acetic acid and stirred overnight at room temperature using a magnet stirrer. Obtained solution was filtered (pore size 0.45 m, Millipore, USA) to remove residues of insoluble particles and diluted with DI water to various concentrations: 1.0, 2.0, 3.0 mg/mL. The pH of these solutions was adjusted to 5.0 using 10 N aqueous NaOH. Sodium lignosulfonic acid (LS) was dissolved in DI water at various concentrations similar to that of CN. A cross linker solution was prepared by adding $Na_2SO_4$ (1.5 g), Formaldehyde (0.54 g) and $H_2SO_4$ (1.25 mL) into 4.7 mL of DI water. CNLS-NCs nanocomposite were initially synthesized by adding CN (1 mg/mL) and LS (1 mg/mL) at mass ratios of 2:1, 1:2 and 1:1, respectively, at room temperature under magnetic stirring. Cross linking solution was added drop wise to the solution mixture. The reaction was carried out for 20 min and the resulting suspension was washed three times with DI water to remove any unused cross linker. After finding the appropriate mass ratios of CN and LS, effect of CH and LS concentration on size of CNLS-NCs was studied.

CLSA nanocomposite characterization, aggregation and stability studies

Chitosan, lignosulfonic acid (LSA), and synthesized chitosan/lignin nanocomposite (CLSA) were characterized by different techniques X-ray diffractometer (XRD), Fourier transform infrared spectroscopy (FTIR), scanning electron microscopy (SEM), transmission electron microscopy (TEM), Zetasizer and backscattering studies. A Zeta phase analysis light-scattering (ZetaPALS) analyzer (Malvern Instruments, Zetasizer Nano ZS) was used to measure the zeta potentials. The hydrodynamic diameter of the composite was measured using dynamic light scattering (DLS) and the ZetaPALS analyzer (Malvern Instruments, Zetasizer Nano ZS). Stability of the CLSA nanocomposite were investigated by exposing it to a concentration range of salts and humic acid. The hydrodynamic diameters were measured without moving the cell at specific intervals over 40 min to achieve early stage aggregation kinetics. Wide angle XRD (WXRDs) was recorded using a Bruker D8 Advance (Bruker AXS, Germany). XRD with Cu-Ka radiation ($\lambda$=1.54056 A) at a voltage of 40 kV and a current of 15 mA with a step scan of 0.02° per step and a scanning speed of 1°/min. Scanning electron microscopy (SEM) was measured using a FEI Quanta 650 FEG SEM, after gold sputter coatings on samples. (TEM) images were recorded using a FEI Tabs F200X TEM. The samples were dispersed in ethanol and mounted on a lacey carbon Formvar coated Cu grid.

Then stability of CNLS-NCs in injects water and effect of organics on the aggregation and settlement was evaluated using backscattering assays. One milliliter of 20, 50, 100, 200, and 500 mg/L of CNLS-NCs were suspended in injects water and transferred to quartz colorimetric cuvette. In a second assay, the effect of organics on the aggregation and settlement of NPs was evaluated by adding 100, 200, and 500 µg/mL of humic acid, whereas, CNLS-NCs was kept constant at 50 µg/mL. With the passage of time, the change in backscattering signal was used to indirectly characterize the aggregation of CNLS-NCs. The backscattering (B) was determined after different time intervals and the aggregation of nanocomposite was calculated using Eq. (1).

$$\% \text{ Aggregation}(A_t) = \frac{B_o - B_t}{B_o} \times 100 \quad (1)$$

Enrichment of Sulfate-Reducing Bacteria (SRBs) Biofilm and Biofilm Inhibition Studies The mixed culture of SRBs used in this study was enriched from biofilm samples collected from Alshaheen oil filed in Qatar as described earlier. Postage's C medium was used to prepare the active SRBs cultures (Postgate, 1984) in simulated inject sea water. The pH of the medium was initially adjusted to approximately 7.5 with a 1 N NaOH solution and was heat-sterilized at 15 psi and 120° C. for 20 nun. A high purity nitrogen gas was purged through the medium to maintain anaerobic conditions before inoculation. The culture was maintained in 1 L bottles at 35° C. on a rotary shaker at 110 rpm. The developed culture was further sub-cultured every week under anaerobic conditions for several months. Sulfate reduction and sulfide production were indicated through blackening of the media.

Batch assays were performed in glass vessels of 250 mL capacity containing 150 mL of Postgate C media prepared in synthetic seawater. Sodium sulfate and sodium lactate were used as the sulfate and carbon sources, respectively. The reactors were seeded with enriched mixed SRBs biofilm to make volatile suspended solids (VSS) concentration of 500 mg/L. In order to investigate the effect of synthesized nanomaterials on the activity of SRBs, the inhibition effect of synthesized nanomaterials (Ch, LSA, and CLSAs on the sulfate reduction, organics compound oxidation and sulfide production. To examine the effect of CLSAs on SRBs biomass, the batch assays were subjected to 10, 20, 50, 100, and 250 µg/mL CLSA concentrations with sulfate and TOC concentrations at 1000 and 650 mg/L, respectively. A high purity nitrogen gas was purged through the medium to maintain anaerobic conditions before inoculation. The reactors were exposed to continuous shaking at 110 rpm and constant mesophilic temperature of 35° C. Aliquots of the samples were withdrawn at specific time intervals. Abiotic controls consisted of the sterile seawater and CLSA suspension medium without the inoculum. All experiments were performed in triplicate and average values were reported.

Cell Staining and Flow Cytometer Analysis

Cell suspensions after reaction were collected and stained with SYTO 9 and PI simultaneously using LIVE/DEAD® BacLight™ Bacterial Viability and Counting Kit (L34856). Briefly, 1 mL of the bacterial suspension was washed with PBS buffer by centrifugation at 10,000×g for 3 minutes and resuspended in PBS buffer. A staining solution was prepared by adding 987 µL of PBS buffer, 1.5 µL SYTO 9 (3.34 mM) nucleic acid stain and 1.5 µL propidium iodide (30 mM) into a flow cytometry analysis tube. 10 µL of a SRB cell suspension prepared earlier was added into the staining solution. Mixture was thoroughly mixed and incubated for 20 minutes in dark at room temperature. Stained samples were analyzed with a The BD Accuri™ C6 flow cytometer (BD Biosciences, CA).

SEM imaging, LDH release assay and analysis of EPS from biofilm

Effect of CNLS-NCs on SRB biomass structure was investigated by field emission-scanning electron microscopy (FE-SEM). SEM imaging of the samples was done using the method as described earlier. Images were taken by using a FEI Quanta 650 FEG SEM.

LDH release assay was used to determine the cell membrane activity of SRBs biofilm exposed to CLSA in inject water using LDH kit (Roche Applied Science). The standard protocol assay was performed according to the manufacturer's instructions. Briefly, SRBs biomass suspension treated with 250 µg/mL of CLSA was transferred into sterile 1 mL centrifuge tubes. Then, 50 µL substrate mixtures were added and tubes were incubated at room temperature in the dark for 1 hr. The reaction was quenched by the addition of 50 µL of stop solution. LDH release was quantified by measuring absorbance at 490 nm.

In order to study the effects of concentration of nanomaterials on sulfidogenic biofilm, EPS were extracted as described earlier. At the end of batch experiments, 10 mL of mixed liquor was taken from all the reactors and centrifuged at 12,000 rpm for 5 min. Supernatant was wasted and pellets obtained were resuspended in distilled water. A quantity of 0.06 mL formaldehyde (36.5%) was added to the suspension, with this then incubated at 4° C. After 1 h, 4 mL of 1 N NaOH were introduced for 3 h at 4° C. The incubated samples were centrifuged at 10,000 rpm for 10 min and the supernatant obtained was collected as EPS extracts and stored at −20° C. before further characterization. Concentrations of proteins, humic substances, carbohydrates, and lipids within the EPS extract were analyzed as described elsewhere.

Analytical Methods

Liquid samples from all the assays were collected at different time intervals and centrifuged at 10,000 rpm for 20 min. Supernatant obtained was used for further analysis. TOC was analyzed using TOC analyzer. Before TOC analysis, samples were acidified with 1 M HCl and $N_2$ gas was purged to remove dissolved sulfide. Volatile suspended solids (VSS) were analyzed following the standard methods (APHA, 1998). Dissolved sulfide was analyzed immediately after sample collection by titrimetric method (APHA, 1998). Concentration of sulfate and sulfite was analyzed by a DX ICS-5000 ion chromatography (IC) unit (Dionex, USA).

Results and Discussions

Nanomaterials Characterization

Lignosulfononate crossed linked chitosan nanocomposite (CNLS-NCs) were synthesized using lignosulfonic acid (LS) compound as the counter ion polymer to react with protonated polycationic chitosan (CN) polymer. In presence of crosslinking reagent in aqueous media, the positively charged chitosan and negatively charged ligno-sulfate polymers strongly bonded by electrostatic interactions. CNLS-NCs was prepared by the addition of LS solution into CN solution at room temperature under magnetic agitation at selected CN to LS weight ratios of 1:1, 2:1, and 1:2 with fixed chitosan concentration of 2 mg/mL. The size of the synthesized CNLS-NCs was measured by investigating hydrodynamic diameter by Zetasizer.

Figure 18:
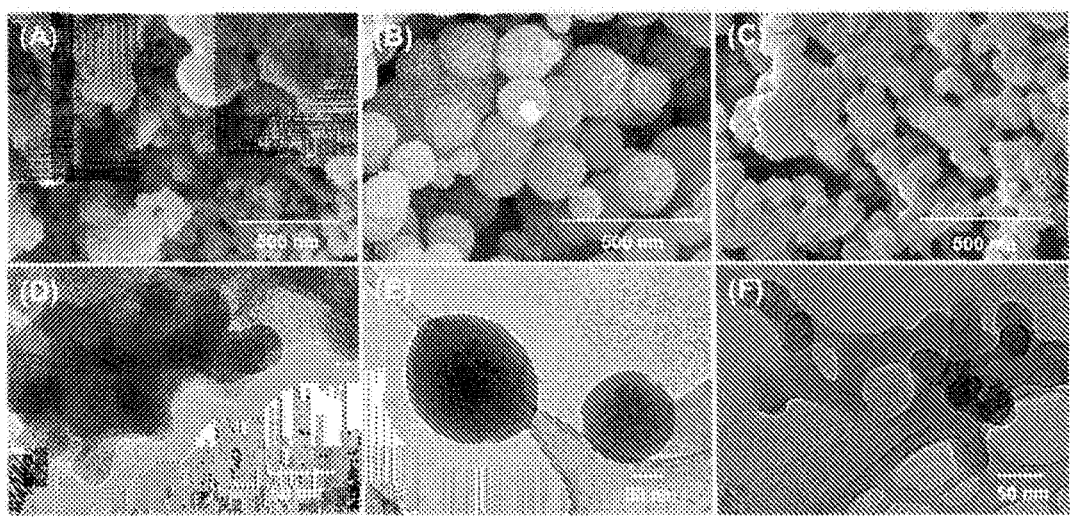
FIG. 18 shows SEM images (A) CS@LS-2:1 (B) CS@LS-1:1 and (C) CS@LS-1:2; TEM images (D) CS@LS-2:1 (E) CS@LS-1:1 and (F) CS@LS-1:2.

FIG. 18 depicts the SEM images of the synthesized nanocomposites. The nanocomposites at 2:1 (FIG. 18A) and 1:2 mass ratios (FIG. 18B) of chitosan and lignin showed irregular shaped aggregates, whereas, 1:1 mass ratio of CN and LS showed very uniform spherical shape particles with average diameter of 40 nm. FIG. 18D shows the effect of CN to LS weight ratio on nanocomposite size. Hydrodynamic diameter CN to LS weight ratio was observed within the tested CN to LS ratio range. CN and LS mass ratios showed prominent effect on synthesized nanocomposite size. The hydrodynamic diameter of nanocomposite at CN and LS ratios of 2:1 and 1:2 was about 351 nm and 374 nm, respectively, whereas it was 148 nm for mass ratio of 1:1. The smaller hydrodynamic diameter of CNLS-NCs at 1:1 mass ratio of CH:LN can be attributed to the uniform spherical size of the nanocomposites as confirmed by SEM analysis. Based on the above mentioned results, CNLS-NCs synthesis was found optimum at initial CN concentration of 1 mg/mL with CN and LS mass ratio of 1:1 and was used for the further characterization and SRBs inhibition experiments.

FIG. 19A describes the XRD patterns of chitosan, lignin and CNLS-NCs. It was observed that the diffractogram of chitosan consisted of two major peaks at ca. 10.0° and 20.1°, which are typical fingerprints of crystal chitosan. Lignin salt has a broad (002) graphite-peak centered near 20-22.5. The characteristic chitosan peak at 20.1° is present in the composite and an additional peak at 18.3° was found which can be due to the presence of lignin. In the composite, the peak at 10.0° disappeared, while the peak intensity at around 20.1° decreased indicated a more amorphous phase of the composite.

The FTIR spectra of chitosan, lignosulfonate and CNLS-NCs are given in FIG. 19B. The FTIR spectrum of chitosan shows large and broad bands at 3426 $cm^1$ attributed to the hydrogen-bonded O—H stretches overlapped with several N—H stretching bands. The characteristic absorption bands at 1654, 1381 and 1069 $cm^{-1}$ are assigned to the C=O stretching (amide I), $CH_3$ symmetrical deformation, and the C—O stretching vibrations (C—O—C) of chitosan, respectively. The FTIR spectrum of sodium lignosulfonate shows characteristics absorption bands at 3432, 2940, 1609, 1209, and 1044 $cm^{-1}$ corresponding to the O—H, C—H ($CH_3$, $CH_2$ and CH aliphatic groups), C=C stretch of phenyl, C—O stretch of —$OCH_3$, and S=O stretch of —$SO_3Na$, respectively. The FT-ATR spectrum of CNLS-NCs showed absorption band at ~1158 (sym. $SO_2$ stretch), and at ~1634 (—$NH_2$ bending vibration) and confirmed presence of sulphonic acid groups and amine groups. Absorption band at ~3438 $cm^{-1}$ attributed to the hydrogen-bonded O—H stretches overlapped with several N—H stretching bands in composite. The cross-linked structure of the CNLS-NCs was also confirmed by diether (—C—O—C—) absorption band at 1031 $cm^{-1}$. Furthermore, strong absorption band at ~1101 $cm^{-1}$ attributed to the C—O stretch of chitosan and —$OCH_3$ groups.

UV-visible absorption spectroscopy was used to analyze the interaction of lignin with chitosan. FIG. 11 (C) shows the UV-vis spectra of lignin, chitosan, and the synthesized nanocomposite. Two peaks were observed at ~280 nm, and 255 corresponding to the characteristic absorption peak for lignin [34]. Chitosan exhibited a characteristic absorption band at ~256 nm. The composite exhibited the absorption band at ~255.5 and ~280 nm, which confirmed the presence of lignin and chitosan in the composites. The chitosan showed an absorption peak at 256 nm whereas lignin show two characteristics absorption peaks at 255 and 280 nm. In the composite, lignin peaks at 280 nm and at 256 nm are present which confirms the stable.

The antibacterial activity of nanoparticles largely depends on the surface charge of the nanoparticles due to their interaction with proteins and enzymes in bacterial membrane. Zeta potential of CNLS-NCs was about +34.25 mV. CN and LS formed compact nano complexes after adding cross linker with an overall positive surface charge as measured by zeta potential.

Nanoparticles can transform due to number of processes, including aggregation/agglomeration, redox reactions, exchange of surface moieties, and reactions with bio-macromolecules e.g. natural organic matter (NOM) and extracellular polymeric substances (EPS) in the biofilm. These active transformations in turn affect the transport, and bactericidal characteristics of nanoparticles in the biofilm sludge. So it is critical to comprehend and characterize the stability of nanocomposites in the reaction media. So the trends of CNLS-NCs aggregation was investigated by modeling the aggregation of CNLS-NCs in inject water at different initial CNLS-NCS concentrations. FIG. 20 shows the CNLS-NCs precipitation rates for the suspensions at different CNLS-NCs concentrations. The $A/A_0$ ratio (where $A_0$ and A shows the initial and at any time t absorbance, respectively) showed that the suspensions with lower concentrations of CNLS-NCs were relatively more stable because the faster $A/A_0$ changes, the less stable will be the suspension. The precipitation rate gradually increased with the time for initial 5 hours with increasing CNLS-NCs concentration of the suspension to 500 mg/L. After 5 hr of reaction time, there was no further sedimentation and suspensions become stable.

Influence of Synthesized Nanocomposite on SRBs Activity

Figure 21:
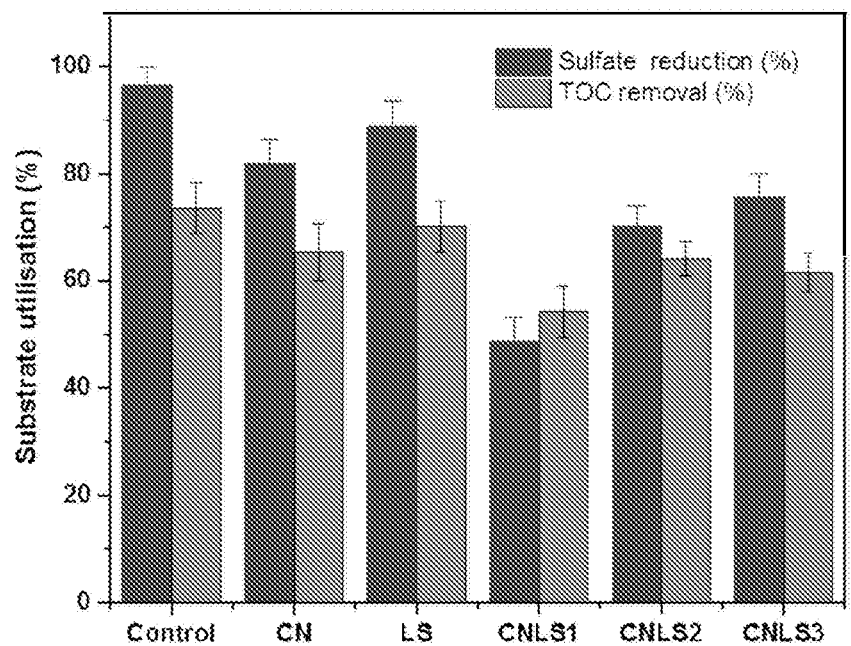
FIG. 21 shows SRBs activity measurements of biomass treated with CN, LN and CNLS-NCs nanocomposite in inject water. SRBs Biofilm (200 mg·VSS/L) were incubated with 100 μg/mL of each nanomaterial at 35° C. at 150 rpm shaking speed.

In this study, we synthesized the CNLS-NCs at different mass ratios of CN and LN and investigated the antibacterial activity of nanocomposites against enriched anaerobic SRBs consortia. The inhibitory activity was initially studied by exposing the bacterial consortia to CN, LN, and CNLS-NCs at different CN and LS mass ratios of 1:1, 1:2 and 2:1 named as CNLS-NCS 1, CNLS-NCS2 and CNLS-NCS3, respectively. In order to find out the impact of different materials on activity of SRBs consortia, co-substrate oxidation and sulfate reduction was assessed by analyzing TOC and residual sulfate concentrations. FIG. 21 depicts the sulfate reduction and organics oxidation profiles (TOC) for the SRBs consortia exposed to three materials. In control assay, the sulfate concentration was reduced form initial 1000 mg/L to 35 mg/L after 85 h of reaction time with more than 96% of sulfate reduction efficiency. The concentration of TOC decreased from 700 mg/L to 180.5 mg/L with an organic oxidation efficiency of 73.6%. The sulfate reduction efficiency was 82.0, 88.78, 53.8, 65.26 and 76.81% in presence of 100 mg/L of CN, LS, CNLS-S1, CNLS-S2 and CNLS-S3, respectively. It can be observed that CNLS-S1 showed the highest decrease in sulfate reduction (FIG. 21). Similarly, TOC removal efficiency profiles also showed the similar trends and CNLS-S2 showed the highest residual organics concentration with a co-substrate utilization efficiency of 54.26%.

Activity of SRBs can be investigated in terms of sulfate reduction and co-substrate oxidation as sulfate reduction is oxidation reduction reaction, in which sulfate act as electron acceptor, accordingly, a suitable and sufficient electron donors is required for the SRBs activities. CN and LS had a small inhibitory effect on the SRBs activity in terms of sulfate reduction (15.5% and 8.46%, respectively) and TOC utilization (14.3% and 6.3%, respectively). The inhibitory effects of all three nanocomposites were higher than the inhibition caused by CN and LN. Further it was found that the nanocomposite CNLS-S1 (CN:LN=1:1) showed the highest inhibition of 44.53% and 32.34% for sulfate reduction and co-substrate oxidation, respectively, as compare to the other nanocomposites synthesized at different mass ratios. Tus, different inhibitory affects could be due to the different characteristics of the three nanocomposites related to their size, shape and stability. As reported in the earlier section, CNLS-S1 has the smallest hydrodynamic diameter in aqueous suspension as compare to other two nanocomposites. Moreover, the nanocomposite shape is regular, uniform and stable in presence of high salt concentration. So, CNLS-S1 showed the highest inhibition of SRBs activity as compared to CN, LS, CNLS-S2 and CNLS-S3 and was considered as the optimal one for further studies.

Impact of Different CNLS-NCs Concentrations on the SRBs Activity

As concentration of 100 μg/mL of CNLS-NCs was inhibitory to both anaerobic organics oxidation and sulphate reduction, it was considered important to investigate whether lower and higher concentrations of synthesized nanocomposite have any effect on microbial metabolism. Batch assays were performed to investigate the effects of CNLS-NCs concentrations from 0 to 500 mg/L. FIG. 22A describes the sulfate reduction profiles in presence of different CNLS-NCs concentrations. The residual sulfate concentration in absence of any NMs decreased form 200 mg/L to 4.52 mg/L with a sulfate reduction efficiency of about 98%. Residual sulfate concentration in presence of 20 mg/L CNLS-NCs was pretty stable and similar to those in the absence of CNLS-NCs in control assay. These results indicated that lower concentration of 20 mg/L of synthesized nanocomposite had no significant inhibitory effects on SRBs activity. Nevertheless, when SRBs consortia was exposed to higher concentration of 50-500 μg/mL CNLS-NCs, the residual sulfate concentrations significantly increased from 4.52 mg/L in control to approximately 174.0 mg/L with increasing CNLS-NCs concentrations to 500 μg/mL. The sulfate reduction efficiency of assays exposed to 150 μg/mL of CNLS-NCs was about 36.0% and in presence of 300 μg/mL was about 14%, which was remarkably lower than that in the control (97.4%). Though, further increase in CNLS-NCs concentration to 500 μg/mL showed almost same sulfate reduction profile as that in presence of 300 μg/mL of CNLS-NCs suggesting that it was the optimal concentration for SRBs inhibition in our experimental set up. FIG. 22B shows the specific sulfate reduction rates (SSRR) at different CNLS-NCs concentrations. A decrease in SSRR was found with increasing CNLS-NCs concentration, as the nanocomposite concentration was increased from 50 to 500 μg/mL, the SSRR decreased from 0.278 to 0.036 g-sulfate/g-VSS*day showing a relative sulfate reduction inhibition of 86.64% as compared to that of control.

The sulfate transport takes place because of the concentration gradient of sodium ions and/or protons, and electrical potential across the cell membrane [27]. Dissimilatory sulfate reduction by anaerobic sulfate-reducing bacteria occurs in three steps. Firstly, intracellular sulfate is activated to adenosine phosphosulfate (APS) by the enzyme ATP sulfurylase. The APS-sulfite redox couple has a favorable redox potential ($E0^1$) of −60 mV, which allows APS to reduce to sulfite with the enzyme APS reductase. Finally, sulfite is reduced to sulfide with the enzyme dissimilatory sulfite reductase (DSR) [28]. The influences of CNLS-NCs on the bio-transformations of sulfate to sulfide under the anaerobic sulfidogenic environment were further investigated by analyzing intermediate sulfite and biogenic sulfide production in presence of different concentrations of CNLS-NCs. The results obtained at the end of batch assays are presented in FIG. 23. Sulfite was detected as the intermediates of sulfate reduction. The concentration of sulfite was 1.2 mg/L in control assay, whereas, sulfite concentration gradually increased with increasing CNLS-NCs concentrations and was 10.41 mg/L in presence of highest CNLS-NCs concentration of 500 mg/L. The accumulation of sulfite in presence of higher CNLS-NCs concentrations might be attributed to sulfidogenic oxidation inhibition. In this study, increase in sulfite accumulation which is an intermediate product in sulfate reduction indicated that CNLS-NCs could significantly inhibit sulfite reduction to sulfide.

Figure 24:
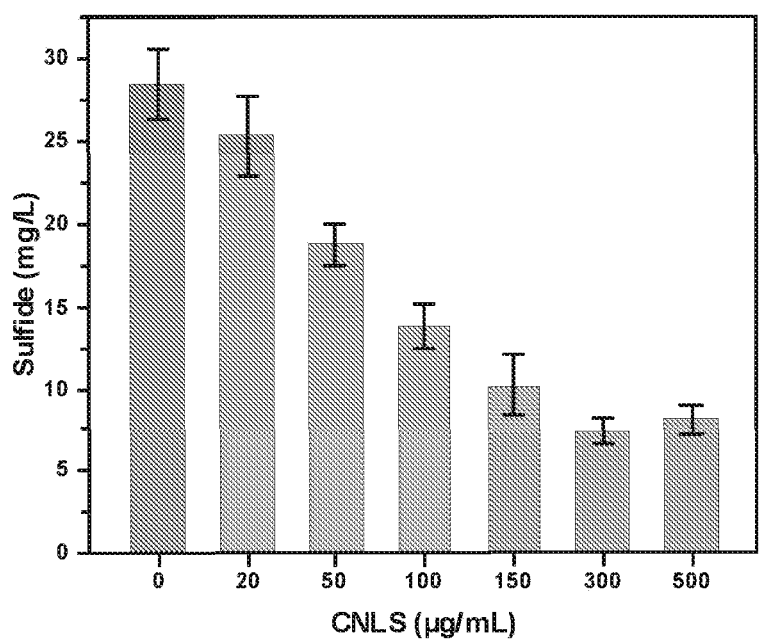
FIG. 24 shows sulfide production form SRBs mixed consortia treated with different concentrations of CNLS-NCs (0-500 μg/mL) in inject sea water at 35° C. Batch reactor without any nanomaterials was used as control. Error bars represent the standard deviation of three independent experiments.

Moreover, it was observed that sulfide production was significantly different to that of control assays where no nanoparticles were presented (FIG. 24). The concentrations of dissolved sulfide also decreased in presence of CNLS-NCs and showed concentration dependent behavior. Total dissolved sulfide concentration was 28.48 mg/L in absence of any CNLS-NCs, and decreased to 8.12 mg/L in presence of 500 mg/L of CNLS-NCs causing a strong inhibition to biogenic sulfide production at higher concentrations of the inhibitor.

Figure 25:
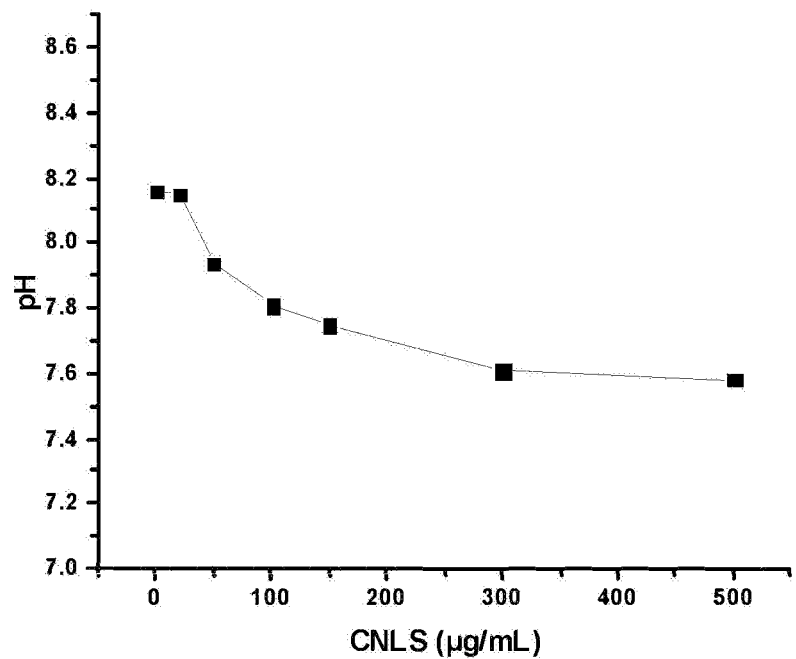
FIG. 25 depicts the effects of CNLS-NCs concentration on the pH of the batch assays. The initial pH of the assays was adjusted to 7.5 before spiking CNLS-NCs into the SRBs consortia. pH of the control assay was found to be 8.16 as expected for the biological sulfate-reduction reaction due to production of alkalinity. However, the pH decreased to 7.41 in presence of 500 μg/mL CNLS-NCs. The decrease in the pH values and dissolved sulfide concentrations in presence of NCs indicated that the sulfate-reduction reaction inhibition and eventually lower alkalinity production.

FIG. 25 depicts the effects of CNLS-NCs concentration on the pH of the batch assays. The initial pH of the assays was adjusted to 7.5 before spiking CNLS-NCs into the SRBs consortia. pH of the control assay was found to be 8.16 as expected for the biological sulfate-reduction reaction due to production of alkalinity. However, the pH decreased to 7.41 in presence of 500 μg/mL CNLS-NCs. The decrease in the pH values and dissolved sulfide concentrations in presence of NCs indicated that the sulfate-reduction reaction inhibition and eventually lower alkalinity production.

Decrease in sulfide production could be attributed to the accumulation of sulfite during the sulfate reduction process. It is imperative to indicate that no data on application of chitosan/lignin base nanomaterials for SRBs inhibition have been found in the literature to compare with our results obtained in this study.

The presence of appropriate and adequate co-substrate (electron donor) is required for the efficient reduction of sulfate to sulfide. In this study, lactate was used as co-substrate and influence of CNLS-NCs on lactate oxidation was assessed by analyzing TOC. FIG. 26A shows the organics oxidation profiles in presence of different CNLS-NCs concentrations. The initial average TOC concentration of 150 mg/L was reduced to 18.41 mg/L after 192 h of reaction time in the absence of any inhibitor (NCs) as the control assay. The average residual TOC concentrations increased from 23.5 to 87.25 mg/L with increasing CNLS-NCs concentrations from 20 to 500 μg/mL. So, CNLS-NCs showed significant effect on co-substrate oxidation, where, it decreased from 87.72% to 41.83% with increasing CNLS-NCs concentration from 0 to 500 mg/L.

We also investigated the effect of CNLS-NCs on the specific organics utilization rate (SOUR). FIG. 26B shows the SOUR of SRBs consortia in presence of different concentrations of CNLS-NCs. When the NCs concentration was increased from 20 to 500 μg/mL, the SOUR decreased from 0.082 to 0.039 0.036 g-TOC/g-VSS*day giving a relative co-substrate oxidation inhibition of 52.19% as compared to that of control.

It is well-known that anaerobic oxidation of organic compounds with mixed microbial consortia can be achieved by a sequence of biochemical reactions. Lactate could be oxidized to intermediate propionic acid, ethanol, acetic acid, and finally to $CO_2$. However, accumulation of propionic acid in biological sulfate reduction process was reported earlier in presence of ZnO-NPs and profiles of co-substrate and its intermediate products in showed that ZnO-NPs could significantly affect co-substrate utilization. Inhibition of intermediate propionic acid was attributed to sulfidogenic oxidation inhibition. So, inhibition of co-substrate utilization in this study could be assigned to the accumulation of intermediate organics compound formed after lactate oxidation. The CNLS-NCs are in suspension and are not expected to contribute in the biochemical reaction. So, it was assumed that the CNLS-NCs may have inhibited the bacteria through physical interaction and/or due to oxidative stress caused by the production of reactive oxygen species. The CNLS-NCs could act as an obstruction that could stop the interaction of the electron donor-acceptor couple to the active bacterial site and/or can inhibit the enzyme activities causing the sulfate reduction.

Influence of CNLS-NCs on SRBs Viability and General Physiology

To further evaluate the inhibitory properties of CNLS-NCs on SRBs biomass, multiple probable number (MPN) tests were carried out after 190 h of reaction time for the assays in absence and presence CNLS-NCs to determine the count of viable bacterial cells in the batch assays. The MPN experiments showed that the estimated SRBs counts in the control assay (in absence of NCs) were $2.1 \times 10^8$ per mL. In spite of differences in co-substrate oxidation and sulfate reduction rates, the batch assays exposed to 20, 50, 100 and 150 µg/mL CNLS-NCs had almost similar bacterial growth counts as compared to that of control. However, the assays spiked with higher concentration of 300 and 500 µg/mL CNLS-NCs showed reduction in cell viability, in which, SRBs counts decreased to $1.8 \times 10^7$ and $1.5 \times 10^6$ per mL. This showed that the SRBs consortia exposed up to 150 µg/mL of NCs were not dead but simply deactivated and lost the ability to reduce sulfate. Yet, higher concentrations of NCs resulted in significant viability loss of SRBs consortia. The SRBs-NCs contact in the well-mixed reactors could be responsible for the deactivation of SRBs bacteria as discussed earlier. The results found in this study are in agreement with previously reported data, where metal sulfides and iron nanoparticles showed the similar behavior against SRBs bacteria at lower concentrations.

Figure 27:
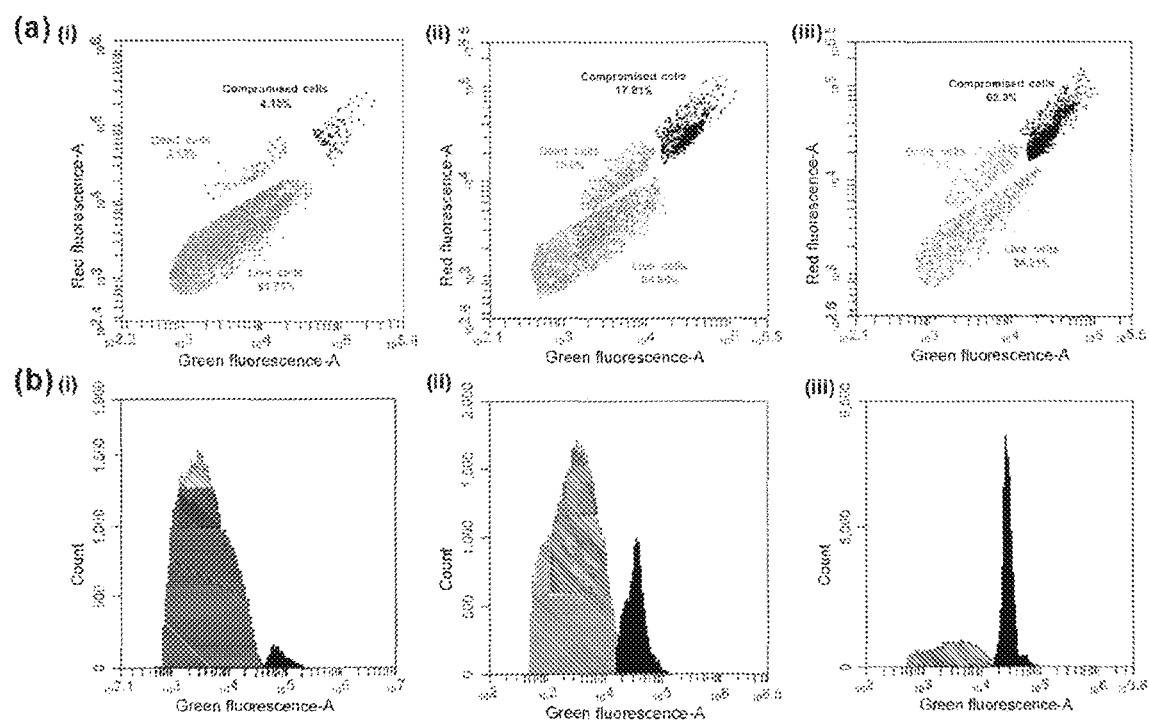
FIG. 27 shows red and green fluorescence and forward light scattering distributions of SRB culture before and after exposure to CNLS-NCs.

Cell viability measurement using cultivation-based methods is not an adequate approach as most of the bacteria could be viable-but-not-culturable and therefore a bimolecular method is advantageous for the better understanding of microorganism's cell viability. The direct estimate of SRB culture viability was further investigated utilizing flow cytometry measurements (FCM). Because the mixed culture of SRB used in this study is very diverse, and heterogeneous, the use of flow cytometry offers a promising technique for the analysis of cell viability after exposure to antibacterial materials. In FCM, the term cell viability indicates the cells with intact membranes which are detected using nucleic acids staining dyes retention or exclusion such as propidium iodide (PI) and SYTO 9. The SYTO 9 is a dye capable of staining all cells, whether living or dead, whereas, the PI is capable of staining only dead or damaged/compromised cells. FIG. 27 shows the cytograms of flow cytometric analysis, in which each cell is represented as a function of green fluorescence and red fluorescence on the horizontal and vertical axis, respectively. Due to activation of energy transfer phenomenon in presence of SYTO 9 and PI in dead cells, the PI fluorescent emission spectrum absorbs the spectrum of SYTO 9 and thus only PI spectrum is visible. Consequently, viable cells with green fluorescence can be clearly distinguished from dead ones with red fluorescence (FIG. 27(*a*)). In compromised cells, both green and red fluorescence are emitted and a third region can be distinguished in the flow cytometry plots (labeled as black color). In the analysis of the experimental data, both cells in red and compromised regions were considered as inactive and inhibited cells which were not able to grow after exposure to synthesized nanocomposites. FIG. 27(*a*)(*i*) and 27(*b*)(*i*)) show the dot plots and histogram of control SRB culture which shows initial culture was composed of about 92% of viable cells and 3% of dead cells, whereas 4% of the cells were of compromised status. For the assay exposed to highest concentration of 500 µg/mL CNLS-NCs, cells viability decreased to 24%. This decrease in viability did not correspond to an equivalent increase in dead cells, which reached only to 12.7%. The decrease in cell viability was balanced by the increase in compromised and/or damaged cells to 62%. These results indicated that most of the cells were not dead but severely damaged and lost their ability to reduce sulfate and utilize organic substrate as discussed earlier.

Scanning electron microscopy (SEM) analysis was used to find the impact of CNLS-NCs on SRB cells morphology before and after exposure to CNLS-NCs. SRB cells were intact, smooth and viable in absence of nanocomposites (control assay, FIG. 28(A)), whereas, in presence of CNLS-NCs large numbers of cells were aggregated and suffered from a prevalent surface damage (FIG. 28(B)). Some bacterial cells still maintained the membrane integrity, but they were deformed.

To confirm this SEM analysis, LDH release assay was performed (which is an indicator of cell membrane damage) to determine the SRB cells surface integrity. LDH assay showed that no measurable cytoplasmic leakage occurred after exposure to CNLS-NCs concentration up to 100 µg/mL (FIG. 29) confirming that the surface of SRBs consortia was intact. Nonetheless, higher CNL-NCs concentrations resulted in significant cytoplasmic leakage and the results are in line with the SRBs viability studies by MPN method. The toxicity of several nanoparticles has been assigned to ROS dependent or independent oxidative stress induced by NPs. Another possible explanation of nanomaterials toxicity in addition to oxidative stress is cell membrane damage. In this study, the exposure of SRBs consortia to 500 µg/mL CNLS-NCs considerably increased the extracellular LDH to 265.5% as compared to that of control which indicates a substantial cytoplasmic leakage outside the cells.

Formation of biofilm by SRBs may act as a survival strategy in a toxic and nutritionally deficit environment. Extracellular polymeric substances (EPS) are typically reported to keep microorganisms together in biofilm complex structure. In this study, we investigated the impact of CNLS-NCs on the different constituents of EPS secreted by SRBs consortia and results are given in Table 3. The protein contents of the SRBs consortia after exposure to 500 µg/mL CNLS-NCs was decreased from 3.37 to 1.93 mg/g-VSS, whereas the amount of carbohydrates after exposure to CNLS-NCs did not show significant differences as compared to that of control. Exposure of CNLS-NCs also affected the concentrations of humic substances and lipids which was 2.12 mg/g-VSS and 0.256 mg/g-VSS, respectively, in absence of NCs. However, in presence of 500 µg/mL CNLS-NCs, the contents of both constituents decreased to 1.12 mg/g-VSS and 0.189 mg/g-VSS, respectively. In biofilm formation, proteins are carbon and energy source, whereas, polysaccharides are capable of both adhesion and cohesion interactions. The impact of different nanoparticles on different constituents of EPS of diverse bacterial communities has been investigated (Ref). Nevertheless, to date, only a few studies have provided actual information on impact of nanoparticles on SRBs biofilm formation, EPS production, and cell growth inhibition. Additionally, there is no data available on the use of chitosan/lignin nanocomposite as a biocide to inhibit SRBs activity and impact of NCs on EPS contents. Higher inhibitory effects of CNLS-NCs can be attributed to the nano size together with the presence of large number of amino groups which make the NCs hydrophilic and bio-adhesive binding readily to negatively charge bacterial cell surfaces leading to membrane disruption and cell death.

According to the above investigations, CNLS-NCs caused the significant inhibition to biological sulfate reduction and organics oxidation and inhibitory affects were dependent on concentration of the NCs. The inhibition of SRBs activity occurred due to the accumulation of sulfite during sulfate reduction and serious inhibition of co-substrate utilization. The SRBs inhibitory effect was because of the decrease in cell viability, serious cytoplasmic leakage and loss of cell integrity and EPS contents.

TABLE 3

Measurements of extracellular polymeric substances (EPS) extracted form SRBs biofilm treated with different concentrations of CNLS-NCs (0-500 µg/mL) in inject sea water at 35° C. after 168 hr of reaction time.

| CNLS-NCS (µg/mL) | Carbohydrates (mg/g) | Proteins (mg/g) | Humic substances (mg/g) | Lipids (mg/g) |
| --- | --- | --- | --- | --- |
| 0 | 53.8 | 3.37 | 2.12 | 0.256 |
| 20 | 53.21 | 3.36 | 2.12 | 0.251 |
| 50 | 50.26 | 3.25 | 1.95 | 0.234 |
| 100 | 47.37 | 2.62 | 1.54 | 0.218 |
| 150 | 45.94 | 2.21 | 1.378 | 0.207 |
| 300 | 44.38 | 1.94 | 1.12 | 0.197 |
| 500 | 43.32 | 1.93 | 1.07 | 0.189 |

We have developed an eco-friendly and biodegradable chitosan/lignin (CNLS-NCs) based nanocomposite by an innovative, simple and one step synthesis method. Chitosan and lignin formed compact nano complexes after adding cross linker with an overall positive surface charge of 34 mV as measured by zeta potential. Spherical CNLS-NCs were synthesized with an average size of 40 nm and applied to inhibit the SRBs induced biofilm growth in inject sea water. CNLS-NCs showed stable behavior in inject water at higher concentrations and depicted excellent inhibitory affects to sulfate reduction and organics oxidation. This work demonstrated that synthesized nanocomposite with significant antibacterial efficacy is a potential biocide for the inhibition of biofilm growth.

Example 1

Chitosan/lignosulfonate (CS@LS) nanospheres as green biocides for the inhibition of sulfate-reducing bacteria (SRB) induced biocorrosion on carbon steel
Abstract In this work, covalently cross-linked chitosan/lignosulfonate (CS@LS) nanospheres with average diameters of 150-200 nm have been successfully used for the inhibition of mixed sulfate-reducing bacteria (SRB) biomass and thereby controlling microbiologically influenced corrosion (MIC) on carbon steel. CS@LS nanospheres at 500 µg·mL$^{-1}$ have been used efficiently for the inhibition of SRBs induced corrosion up to a maximum of 85% with about two folds increase of charge transfer resistance ($R_{ct}$) on carbon steel (SS400) coupons. This study enforces the development of "green" metal-free nano biocides to combat MIC on carbon steel.

1. Introduction

Microbiologically influenced corrosion (MIC) of carbon steel is one of the main contributors to corrosion concerns, and a major cause of pipeline failure in the Oil & Gas industry. It was estimated that the MIC account for about 20% of the total corrosion damage in the oil and gas sector. Even though corrosion management has improved over the past several decades, MIC remains a high-priority issue for the oil/gas industry, where there is exposure of metals to bacteria found in water. Several types of microorganisms are responsible for MIC; which include sulfate-reducing bacteria (SRB), slime-forming bacteria, iron-oxidizing bacteria (IOB), and iron-reducing bacteria (IRB). Among these types of bacteria, SRB are the main microorganisms responsible for MIC by generating sulfide species anaerobically, which causes progressive biocorrosion in the water transport systems. The SRB strains produces corrosive agents such as hydrogen sulfides ($H_2S$), metal sulfides and sulfates as a result of its biogenic oxidation/reduction reactions. In particular, the production of $H_2S$ at elevated concentrations creates intrinsic heterogeneity, which accelerates the corrosion process by favoring electrochemical reactions.

Biocorrosion control methods are mainly based on either inhibiting the metabolic/growth activities or altering the corrosive conditions to reduce the adaptation of microorganisms. The different types of approaches such as cathodic protection, protective coatings, corrosion inhibitors and biocides have been used to control/minimize biocorrosion. Oil/gas industries usually need high concentrations of biocides for water disinfection and controlling biofilm formation caused mainly by SRB. However, the use of conventional biocides may cause harmful impact to the environment since it produces the disinfection byproducts inn addition, to the low efficiency against biofilms, and high operational cost. Different nanomaterials demonstrate strong antimicrobial activities rendering them potential alternatives for conventional biocides. Nanomaterials such as AgNPs, ZnONPs, TiO$_2$NPs, FeNPs, graphene, CuONPs and metal-nanocomposites have been used for inhibiting the biofilm formation and biocorrosion induced by SRB. However, the environmental impact of nanomaterials due to its biological toxicity restricted their use in practical applications. The use of green biocides with lower toxicity, environmentally benign, and ease of use can overcome these issues.

Chitosan (CS) is a biodegradable polymer abundant in nature with high hydrophilicity, nontoxicity, antimicrobial properties, and low cost. Antimicrobial activity of CS has been widely established against many microorganisms and it shows a high inhibition rate against both Gram-positive and Gram-negative bacteria. Chitosan also displays anti-biofilm activities with high ability to damage biofilms formed by microbes. Due to its cationic nature, chitosan has been able to penetrate biofilms by disrupting negatively charged cell membranes through electrostatic interaction when microbes settle on the surface. Recently, our research group used ZnO-interlinked chitosan nanoparticles (CZNCs) as stable biocide formulations for the inhibition of mixed SRBs biomass that was cultured from industrial waste sludge. It was found that the inhibition of SRBs is concentration-dependent and sulfate reduction was inhibited more than 73% at 250 μg·mL⁻¹ of CZNC-10 (with 10% ZnO loading). The biocorrosion inhibition of CZNC-10 was also investigated in presence of SRB mixed culture on carbon steel and it was found that CZNC-10 achieve a maximum corrosion inhibition efficiency of 74%. However, in order to develop more "green" and efficient chitosan-based biocide, the metal or metal oxide nanoparticles need to be replaced with more environmentally benign alternatives.

Lignin is the second most abundant natural resource after cellulose, mainly produced as a by-product of the pulping paper industry. Lignin has been widely used as a potential source for fuel and chemical production. Lignin can be incorporated into different polymeric systems such as automotive brakes, wood panel products, dispersants, bioadhesives, biosurfactants, polyurethane foams, and epoxy resins, etc, depending on its solubility and reactivity characteristics. Lignosulfonate (LS) is a sulfonic acid groups-containing derivative of lignin which exhibits excellent water-solubility and anionic characters. LS also exhibits antioxidant and antimicrobial properties that extend its potential applications to different fields. Both CS and LS are abundant biopolymers that demonstrate good antimicrobial properties, therefore it is expected that CS/LS complexes can be used as highly efficient and environmental friendly chitosan-based biocides against SRB induced biocorrosion.

The synthesis of CS/LS polyelectrolyte complexes is mainly based on ionic interaction or ultrasonic homogenization. Yan et al. reported the synthesis of CS cross-linked graphene oxide (GO)/LS composite aerogel by "one-pot" method through mixing of GO suspension, LS and CS solutions. The surface morphological analysis of the aerogel clearly demonstrated an interconnected three dimensional porous network structure. These CS/LS hybrids showed non-uniform sizes/shapes and they are unstable above pH 4.5, which restricts their practical applications. To solve these issues, we have introduced a new crosslinking strategy towards the synthesis of stable cross-linked CS@LS nanospheres. The optimum composite structure was formed at 1:1 ratio of CS:LS, with an average diameter of 150-200 nm. These nanospheres demonstrated the highest thermal, mechanical, and bactericidal properties against aerobic Gram negative (*E. coli*) and Gram positive (*B. subtilis*) bacteria as well as anaerobic SRB. It was found that 100 mg/L of CS@LS-1:1 was able to inhibit the growth of SRB as demonstrated by 48.8% sulfate reduction; and low TOC (total organic carbon) removal with a co-substrate utilization efficiency of 54.26%.

The aim of the present study is to investigate the capability of CS@LS at the optimal 1:1 ratio of CS:LS to combat SRB induced MIC of SS400 carbon steel from real oil filed sludge. The nature, and kinetics of the SRB induced MIC, as well as corrosion inhibition induced by the CS@LS are thoroughly studied with the electrochemical impedance spectroscopy (EIS), X-ray photoelectron spectroscopy (XPS), X-ray fluorescence, profilometry, scanning electron microscopy (SEM) and energy-dispersive X-ray spectroscopy (EDS).

2. Materials and Methods 2.1. Materials

Low Mw chitosan at 85% deacetylation (CS), Lignosulfonic acid sodium salt (LS), $MgSO_4$, sodium citrate, $CaSO_4$, $NH_4Cl$, NaCl, $Na_2SO_4$, KCl, $SrCl_2$, KBr, $K_2HPO_4$, HCl, NaOH, hexamethylenetetramine, sodium lactate and yeast extract were purchased from Sigma-Aldrich. All chemicals were analytical grades and were used without further purification. Carbon steel (SS400) rods of 10 mm diameter were obtained locally. The chemical composition of SS400 is 99.25-100% Fe, 0-0.4% Si, 0 to 0.26% C, 0 to 0.05% S and 0 to 0.04% P. PhenoCure™ (phenolic resin) was procured from Buehler, Illinois 2.2. Synthesis and Characterization of Cross-Linked CS@LS Nanospheres CS@LS nanospheres (1:1 CS:LS ratio) were prepared according to our previous work. Briefly, CS and LS solutions (30 mL each) were mixed together under constant stirring at room temperature for 30 min. Then, 450 μL of the cross-linking solution were added gradually, and the resulting solution was stirred for an additional 30 min. The cross-linking agent is composed of formaldehyde and sulfuric acid ($HCHO/H_2SO_4$, 40/60 w/w). The resulting solution was purified by centrifuging at 10,000 rpm followed by washing five times with DI water to obtain CS@LS. The size and morphology of the CS@LS were characterized by FEI Quanta 650 FEG SEM after gold sputtering and FEI Talos F200X TEM. Wide-angle X-ray diffractograms (WAXRDs) of CS@LS were recorded using a Bruker D8 Advance (Bruker AXS, Germany) X-ray diffractometer. The X-ray diffractometer is equipped with Cu-Kα radiation (λ=1.54056 Å) at 40 kV, 15 mA with a step scan of 0.02° per step and scanning speed of 1° min⁻¹. The hydrodynamic radius and Zeta potential were measured using a Malvern Zetasizer Ultra.

2.3. Fabrication of Coupons and SRB Culture

The coupons were fabricated by cutting the 8 mm diameter steel bar into several pieces with 10 mm height and were hot-mounted with PhenoCure™ using SimpliMet 3000 automatic mounting press (Buehler, Illinois, USA). Then the coupons were manually polished using a manual polishing machine (EcoMet 2500 Grinder Polisher, Buehler, Illinois, USA) in a sequence from 240 to 1200 grit silicon carbide paper followed by 6, 3 and 1 μm diamond suspensions to get a mirror-like finish. The coupons were cleaned with acetone followed by sterilization in absolute ethanol and stored in a desiccated environment after drying until further use. The surface roughness of the polished coupons was analyzed by using KLA P17 stylus profiler and SEM was used the image the surface morphology.

The mixed SRB culture was enriched from sludge biomass obtained from an offshore oil filed in Qatar. The SRB was further cultured in Postage's C medium (Postgate, 1984) in simulated inject seawater as described elsewhere. The composition of the inject seawater is given in the Table 2. The concentration of SRB biomass was represented in terms of volatile suspended solids (VSS) available in the culture media. The carbon steel coupons were incubated in 200 ml bottles containing 250 mg·VSS/L SRB biomass along with modified Postage's C medium in simulated inject seawater in a shaking incubator with 120 rpm at 37° C. Control experiment was considered as the coupons incubated in a media containing SRB biomass (250 mg·VSS/L) in the absence of CS@LS. The optimum concentration of CS@LS was evaluated in the range of 0-1000 μg·mL⁻¹ CS@LS and EIS analysis was performed after 10 days of incubation. Next, corrosion inhibition of optimum CS@LS concentration was evaluated at different time intervals (0, 7, 10, 15, 21, 28 and 35 days). The abiotic conditions were made by incubating coupons in the SRB-free media and in absence of CS@LS to differentiate the chemical corrosion. 5% glutaraldehyde (GA) was used as a conventional biocide for comparison. All experiments were performed in an anaerobic chamber to maintain the anaerobic conditions throughout the experiments. After this, the sealed reaction bottles were kept in a shaking incubator for different time intervals at 37° C. After particular time intervals, coupons were drawn from the incubation mixture and gently washed with DI water before analysis.

TABLE 2

Composition of simulated seawater

| Chemical ion | Concentration (mg/L) | Part of salinity (%) |
|---|---|---|
| Chloride $Cl^-$ | 19345 | 55.03 |
| Sodium $Na^+$ | 10752 | 30.59 |
| Sulfate $SO_4^{-2}$ | 2701 | 7.68 |
| Magnesium $Mg^{+2}$ | 1295 | 3.68 |
| Calcium $Ca^{+2}$ | 416 | 1.18 |
| Potassium $K^{+1}$ | 390 | 1.11 |
| Bicarbonate $HCO_3^{-1}$ | 145 | 0.41 |
| Bromide $Br^-$ | 66 | 0.19 |
| Borate $BO_3^-$ | 27 | 0.08 |
| Strontium $Sr^{+2}$ | 13 | 0.04 |
| Fluoride $F^-$ | 1 | 0.003 |

2.4. Electrochemical Measurements

All electrochemical measurements were carried out with Gamry potentiostat (Gamry Ref 600+, PA, USA) using the incubated carbon steel coupon as a working electrode, a saturated calomel electrode (SCE) and a graphite disk electrode as a reference and counter electrode, respectively. The SS400 hot-mounted coupons were removed from the SRB incubation solutions and then mounted into a Gamry Para-Cell™ Electrochemical Cell Kit (Part No. 992-80) for electrochemical analysis. Simulated inject seawater was used as the electrolyte for all electrochemical experiments. The EIS measurements were recorded over the frequency range of $0.01$-$10^1$ Hz with 10 mV sinusoidal signal. The EIS measurements were performed after achieving the steady-state condition by keeping the setup for 30 min. at open circuit potential (OCP). Gamy Echem Analyst software (version 7.05) was used to analyze the experimental data.

2.5. Biofilm and Corrosion Products Surface Characterization

For SEM and XPS analysis of SRB biofilm, the incubated coupons were fixed with 2% glutaraldehyde solution for 2 hours. After washing the coupons with DI water, dehydration was performed with 25, 40, 60, 80, and 100% ethanol (vol %) serially for 10 min. each followed by washing with DI water. The coupons were stored under dry nitrogen before each analysis. The SEM and EDS analyses were performed with FEI Quanta 650 FEG SEM after gold (3 nm) coating. XPS analysis was carried out with ESCALAB 250X (Thermo Fisher Scientific) with AlKα excitation (25 W, hv=1486.5 eV) and 1 eV resolution. The x-ray fluorescence (XRF) analysis of biofilm and corrosion products was carried out using XGT-7200V X-ray Analytical Microscope (Horiba). The X-ray source was operated at 50 kV and 0.8 mA, and generates an X-ray beam from Rh anode that is focused to a spot size of 1.2 mm. To study the post corrosion morphology of carbon steel coupons, the removal of biofilm and corrosion products from coupone surface was performed by repeated sonication in ethanol (10 s each) and one time in (5 mL·$L^{-1}$ HCl (37%) and 3.5 g·$L^{-1}$ hexamethylene tetramine) for 5 min followed by washing and drying with nitrogen flow. The post corrosion morphology of the coupons after 35 days of incubation with and without CS@LS nanospheres were analyzed by SEM and profilometry. In addition, the bare coupon was analyzed for comparison. KLA-Tencor P17 stylus profilometer (at 2 μm resolution and vertical resolution of about 1 nm, with a loading force of 2 mg) was used to capture surface profile images of the coupons. Seven measurements were done at each position on each coupon with a scan size of 400 μm×400 μm for each frame Ape x3d-7 software was used to process the data and calculate the average surface roughness ($S_a$).

3. Results and Discussion 3.1. Characterization of Cross-Linked CS@LS Nanospheres The CS@LS were characterized by SEM, TEM and XRD. As shown in the SEM image (FIG. 1 (A)), well-dispersed spherical nanostructures were formed. TEM image of CS@LS confirmed the spherical shape with a diameter in the range of 150-200 nm (FIG. 1 (B)). The XRD pattern of CS, LS and CS@LS are given in FIG. 1 (C). Pure CS has two characteristic peaks at 10° and 20° while LS having a broad peak at 22.60. The formation of CS@LS is confirmed by the disappearance of the peak at 10°, a reduction in the peak intensity, and broadening of the peak at ~20°. The detailed characterization of this material has been described elsewhere. The size distribution of CS@LS in aqueous suspension was stable between temperature 20 to 60° C. and a pH between 3-8. The stability of CS@LS in simulated seawater was evaluated by measuring the hydrodynamic radius and Zeta potential at varying pH from 3-9. The average size of the particles remained within the range of 230-250 nm at acidic media until pH 6. After this pH, the nanospheres have slightly shrinked and remained almost unchanged at pH above 7. This can be attributed to the collapse and deformation of CS@LS at alkaline pH values. As shown in FIG. 1(D), the Zeta potential shifted from positive to the negative value with point of zero charge at pH 5.8 indicating that the CS@LS nanospheres are negatively charged at neutral pH conditions.

FIG. 1(A) shows SEM of CS@LS nanospheres; FIG. 1(B) shows TEM image of CS@LS (Inset: TEM image of a single nanosphere); FIG. 1(C) shows X-ray diffraction patterns for CS, LS, and CS@LS; and FIG. 1(D) shows effect of pH on the size and zeta potential of the CS@LS dispersed in simulated seawater.

3.2. Investigation of SRB-Induced Corrosion on Carbon Steel

The SRB induced MIC has been investigated by incubating the SS400 carbon steel coupons in a solution containing enriched SRB biomass (250 mg·VSS/L) in Postage's C containing simulated seawater. The coupons were analyzed by EIS after 7, 10, 15, 21, 28, and 35 days of incubation times. The Nyquist and bode plots of the experiment are shown in FIG. 2.

As observed in FIG. 2(A), the $R_{ct}$ values of Nyquist semicircle after 7 days is higher compared to the ones at longer incubation times. A complete SRB biofilm formation is expected to reach the highest protection capacity at 7 days. After 7 days, the diameters of the semicircles diameter gradually decrease with time, as a result of the gradual breakdown in the corrosion protection by the biofilm, i.e. faster corrosion rates take place. A small capacitive semicircle loop appeared at high frequencies, only for 7 days of incubation, mainly due to the precipitation of the corrosion product along with biofilm results in a porous and more adherent outer layer. This high frequency semicircle started to diminish at longer incubation times, and the Nyquist plot behavior is also different for 7 days of incubation compared to the longer incubation times. However, when steady state is reached at around 7 days, mass transfer limitations dominate over the interfacial activation, which changes the behavior of Nyquist plot from semicircle to a straight line in the low frequency regime.

The phase angle, 0, vs. log frequency plot (FIG. 2(B)) present the phase angle peak shifts to lower frequency with the increasing incubation times. The frequency shift confirms the increase in mass or thickness of the corrosion product layer with high electrical capacitance as a result of SRB activity onto carbon steel coupon. However, the increase in the capacitance is due to the increase in mass, thickness of the porous layer, and consequently the surface area. From the impedance modulus |Z| vs. log frequency plot (FIG. 2(C)), the |Z| values at low frequencies are maximum at 7 days of incubation and it decreases with increasing the incubation time. The higher values of |Z| at low frequencies indicate lower rates of corrosion. These results were analyzed further by fitting with appropriate equivalent electrical circuits.

FIG. 2(D) shows the equivalent circuits used for fitting the EIS data. Equivalent circuits, $R_s$ represents the resistance of electrolyte, $Q_f$ represents the constant phase element (CPE) at the film solution interface, $R_f$ represent the pore resistance of the film, $Q_{dl}$ is the CPE of carbon steel/solution interface, $R_{ct}$ represents the charge transfer resistance at the steel/solution interface, and W represent Warburg impedance elements. Both circuits have constant phase elements ($Q_f$) instead of the ideal electrical double layer capacitors. This was attribute to the surface roughness, inhomogeneous reaction rates distribution, non-uniform thickness, non-uniform composition of the double layer and/or non-uniform current distribution. Since the SRB biofilm provides more prominent effect during initial days of incubation, an additional element W is used in the equivalent circuit, corresponding to the diffusion controlled electrochemical process as a result of the complete biofilm formation. As the incubation time increases, the biofilm starts to degrade so the mass transfer is not the controlling factor anymore, so W is removed from the equivalent circuit.

The EIS analysis of the coupons in the abiotic media in the absence CS@LS is shown in FIG. 8. The equivalent circuits shown in FIG. 2(D) were used for fitting the results. In the absence of SRB, the semicircle's behavior is different at 7 and 10 days of incubation compared to the longer incubation intervals. The precipitation of iron phosphide corrosion products on the carbon steel surface can be detected from the change of medium frequency capacitive loops at 15 and 21 days of incubations. Iron phosphide can be homogeneously distributed after precipitating with the ferrous ion produced by the steel dissolution under abiotic conditions. A gradual decreases of the Nyquist plot diameter and the phase peak shift to lower frequency was observed with increasing the incubation time, confirmed the low corrosion rate as compared with the SRB induced corrosion (FIG. 2).

Table 1 gives the $R_{ct}$, as well as $R_f$ values of the carbon steel coupons incubated in the presence of SRB after EIS fitting and Table 3, shows the complete EIS fitting data. The $R_{ct}$ value is highest at 7 days compared to other incubation times that can be attributed to maximum protection after the complete biofilm formation. Afterward, the $R_{ct}$ values keep decreasing as the incubation time increases. The decrease in $R_{ct}$ value results in an increase in the dissolution kinetics of the metallic surface due to the fast corrosion rates induced by the breakdown of the biofilm Similarly, the $R_f$ values are highest at 7 days of incubation and the values are decreasing slowly with increase in incubation times. The decrease in $R_f$ value indicates an increase in the porosity of the biofilm on the coupon surface, resulting in the observed accelerated corrosion.

TABLE 3

EIS fitting data

| Coupon incubated in | Incubation time (day) | $R_s$ ($\Omega \cdot cm^2$) | $R_f$ ($\Omega \cdot cm^2$) | $R_{ct}$ ($\Omega \cdot cm^2$) | $Y_f$ (mS · Sec$^n$/cm$^2$) | $n_f$ | $Y_{dl}$ (mS · Sec$^n$/cm$^2$) | $n_{ct}$ | $C_{dl}$ ($\mu F \cdot cm^{-2}$) | $C_f$ ($\mu F \cdot cm^{-2}$) |
|---|---|---|---|---|---|---|---|---|---|---|
| SRB alone | 7 | 16.89 | 79.71 | 363.6 | 0.0143 | 0.65 | 0.0885 | 0.61 | 21335.44 | 20013.93 |
| | 10 | 14.75 | 75.67 | 256.1 | 0.0526 | 0.99 | 0.0399 | 0.73 | 9290.29 | 21143.24 |
| | 15 | 16.88 | 69.4 | 173.8 | 0.0116 | 0.99 | 0.0251 | 0.94 | 9801.80 | 13052.12 |
| | 21 | 17.55 | 45.4 | 137.2 | 0.0475 | 0.89 | 0.0474 | 0.86 | 14401.77 | 32100.10 |
| | 28 | 18.85 | 38.64 | 107.9 | 0.0274 | 0.99 | 0.0393 | 0.89 | 16228.08 | 26521.42 |
| | 35 | 17.32 | 23.61 | 88.4 | 0.0060 | 0.99 | 0.0297 | 0.71 | 20674.88 | 6406.06 |
| SRB with CS@LS nanospheres | 7 | 20.99 | 292.7 | 609 | 0.00576 | 0.78 | 0.00658 | 0.95 | 2718.34 | 5155.09 |
| | 10 | 21.61 | 249.2 | 468 | 0.01529 | 0.76 | 0.01779 | 0.89 | 4367.55 | 7611.33 |
| | 15 | 23.95 | 209 | 312.8 | 0.00421 | 0.94 | 0.0270 | 0.88 | 6595.25 | 4824.20 |
| | 21 | 25.71 | 129.7 | 254.6 | 0.011 | 0.83 | 0.0172 | 0.76 | 7687.26 | 10479.19 |
| | 28 | 26.8 | 90.65 | 193.2 | 0.0706 | 0.99 | 0.0689 | 0.82 | 12131.15 | 19924.68 |
| | 35 | 25.3 | 71.2 | 157.3 | 0.0621 | 0.99 | 0.0313 | 0.85 | 11880.12 | 23111.96 |

FIG. 2 shows Nyquist (A), Bode (B and C) plots at SRB enriched media. The inset of FIG. 2(A) is a magnification of the low impedance region. The EIS were obtained at OCP with a 10 mV sinusoidal signal within 0.01-10$^5$ Hz. FIG. 2(D) shows equivalent circuits used to fit the experimental results.

3.3. Investigation of CS LS Nanospheres Inhibitory Effect on SRB Induced Corrosion The first step was to identify the optimum concentration of CS@LS that gives maximum corrosion inhibition and this was evaluated with concentration range from 100 to 1000 μg·mL$^{-1}$. It was found previously that the SRB induced corrosion starts progressing after 10 days of incubation, hence, the impedance analysis was performed after 10 days of incubation. The Nyquist plots of the experiment are shown in FIG. 3(A) and the equivalent circuit shown in FIG. 2(D) was used for fitting the impedance plots. The relation between $R_{ct}$ values and concentration of CS@LS are given in FIG. 3(B). The $R_{ct}$ values at different concentrations of CS@LS are 256, 287, 337, 468 and 307 Ω·cm$^2$ for 0, 100, 200, 500 and 1000 μg·mL$^{-1}$ respectively. From the $R_{ct}$ values, it is found that 500 μg·mL$^{-1}$ resulted in the maximum corrosion inhibition compared to lower concentrations. At 1000 μg·mL$^{-1}$ of CS@LS, immediate precipitation of the reaction medium was observed so that it is not completely active against SRB. Hence, 500 μg·mL$^{-1}$ has been selected as the optimum concentrations of CS@LS for further experiments.

FIG. 3(A) shows the Nyquist plot of the coupon incubated with SRB with CS@LS with different concentrations from 0 to 1000 µg·mL$^{-1}$. The impedance analysis was performed after 10 days of incubation. FIG. 3(B) shows the R$_{ct}$ vs concentration of CS@LS after 10 days of incubation. The standard deviation is from three repetitive measurements.

Effect of the incubation time on carbon steel coupons was investigated by EIS after 7, 10, 15, 21, 28 and 35 days in the media containing enriched SRB biomass at 500 µg·mL$^{-1}$ CS@LS. The Nyquist plot (FIG. 4(A)) showed the same trend as in the presence of SRB but the diameter is higher at the corresponding incubation times. The equivalent circuit used is shown in FIG. 4(D). The increase in the diameter of the Nyquist plot indicates corrosion inhibition in the presence of CS@LS. The R$_{ct}$ values are 609 and 363.6 Ω·cm$^2$ respectively (Table 1) for the coupon incubated with and without CS@LS respectively after 7 days of incubation. However, the Nyquist plot behavior is different for 7 days of incubation compared to the longer incubation periods, and there is no high-frequency capacitive loop for 7 days of incubation or even at higher incubation times in presence of CS@LS. This is attributed to the formation of CS@LS layer on the metal surface was also confirmed by the increase in R$_f$ values.

From the phase angle θ vs. log frequency plot (FIG. 4(B)), the phase peak has shifted to low frequency with higher incubation times similar to the SRB corrosion experiments. However, the intensity of the frequency shift towards the low frequency region is less compared to the presence of SRB. Similarly, from the impedance modulus |Z| vs. log frequency plot (FIG. 4(C)), the |Z| value at low frequencies is high for 7 days of incubation and it decreases with increasing incubation time.

FIG. 4 shows Nyquist (A), Bode (Band C) plots of SRB with CS@LS. The inset is a zoom of the low impedance region. The EIS were recorded at OCP with a 10 mV sinusoidal signal at a range of 0.01-10$^1$ Hz. FIG. 4(D) shows equivalent circuit used to fit experimental results.

Figure 9:
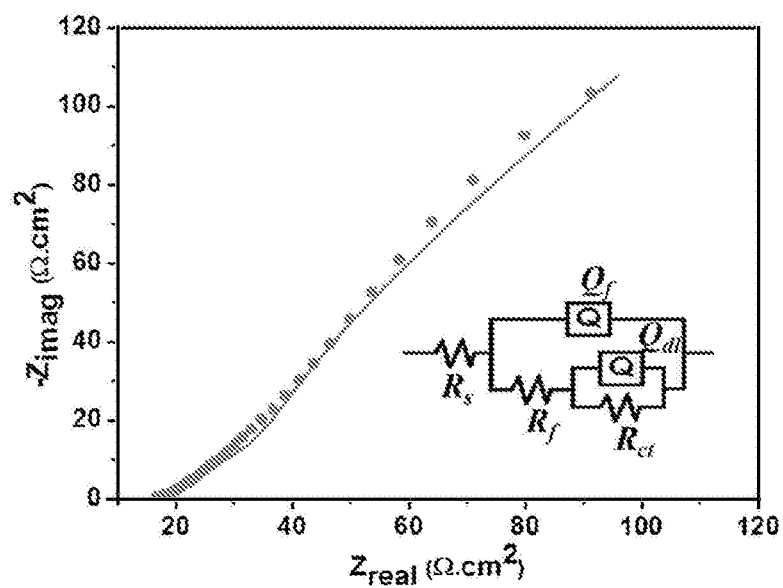
FIG. 9. The Nyquist plot of the coupon incubated in CS@LS after 7 days of incubation.

The R$_{ct}$ value is maximum at 7 days and it has decreasing with the higher incubation time (Table 1). However, the R$_{ct}$ values are about 1.8 times higher than the SRB corrosion experiments at the corresponding incubation intervals and this enhancement in the R$_{ct}$ value is due to the corrosion inhibition effect of CS@LS. The inhibitory effect of CS@LS in the absence of the SRB is evaluated after 7 days of incubation (FIG. 9). The CS@LS may form a layer on the coupon surface along with the biofilm formation, and this can be verified by comparing the R$_f$ values during the initial incubation times. The R$_f$ values of the experiments with CS@LS are 3-3.7 times higher than the SRB corrosion experiments for 7-15 days of incubation confirming the formation of CS@LS film on the surface. The biofilm breakdown takes place as time lapses, which is confirmed by the decrease in the R$_f$ values with longer incubation times.

The corrosion inhibition efficiency (IE) is calculated from:

$$IE=(R_{ct}'-R_{ct})/R_{ct}' \quad (1)$$

where R$_{ct}'$ is the charge transfer resistance of the coupon in SRB with CS@LS and R$_{ct}$ is in presence of SRB alone. The IE at different incubation time intervals is given in Table 1. The IE is calculated as 68, 82, 80, 85, 80 and 78% for 7, 10, 15, 21, 28 and 35 days of incubation, respectively. The maximum corrosion inhibition was found to be 85% with CS@LS as a corrosion inhibitor. In our previous study, CZNC was able to provide only 74% maximum corrosion inhibition with 250 µg·mL$^{-1}$. The inhibitor dose of CZNC was limited to 250 µg·mL$^{-1}$ due to the ZnO content in the CZNC biocide. Here we were able to use high dose of 500 µg·mL$^{-1}$ since CS@LS are metal-free and made of renewable components, which is expected to have a lower toxicity. Nevertheless, toxicity range and environmental impact of the new nanospheres need to be investigated in independent studies.

The corrosion inhibition capability of CS@LS has been compared with the commercial biocide; glutaraldehyde (GA) by EIS analysis. FIG. S3 shows the Nyquist plots of the coupons incubated in 5% GA after 15 days of incubation. The diameter of Nyquist plot is low for SRB with GA compared to CS@LS, which can be attributed to the better corrosion inhibition induced by the CS@LS. The R$_f$ and R$_{ct}$ values for SRB with GA is low (136.4 and 158.8 Ω·cm$^2$ respectively) when compared with CS@LS (209 and 312.8 Ω·cm$^2$ respectively). In the case of SRB with 5% GA, complete bacterial growth can be inhibited; however, there is a reaction between the SRB media and GA which is evidenced from the color change of media solution to pink (FIG. 10). Normally, the solution containing SRB having light black color and the color becomes dark as time goes on. Therefore, it is confirmed that the CS@LS nanospheres inhibits SRB induced corrosion in an efficient manner than GA.

TABLE 1

R$_{ct}$, R$_f$ and IE values after EIS fitting.

| Incubation media | Incubation time (days) | R$_f$ (Ω · cm$^2$) | R$_{ct}$ (Ω · cm$^2$) | IE (%) |
|---|---|---|---|---|
| SRB alone | 7 | 79.7 | 363.6 | — |
|  | 10 | 75.6 | 256.1 | — |
|  | 15 | 69.4 | 173.8 | — |
|  | 21 | 45.4 | 137.2 | — |
|  | 28 | 38.6 | 107.9 | — |
|  | 35 | 23.6 | 88.4 | — |
| CS@LS alone | 7 | 136.1 | 74.4 |  |
| SRB with CS@LS | 7 | 292.7 | 609 | 68 |
|  | 10 | 249.2 | 468 | 82 |
|  | 15 | 209 | 312.8 | 80 |
|  | 21 | 129.7 | 254.6 | 85 |
|  | 28 | 90.6 | 193.2 | 80 |
|  | 35 | 71.2 | 157.3 | 78 |

3.4. Biofilm and Corrosion Products Characterization

The effect of CS@LS at 500 µg·mL$^{-1}$ on SRB activity and biofilm and corrosion products formation on the coupons were investigated with SEM, EDS, and XPS. Generally, the presence of exopolysaccharndes (EPS) which is excreted by the bacteria to adhere to the metal surface is visible on the surface after 4 days of incubation along with SRB cell (FIG. 11). In the presence of CS@LS, different morphology of EPS is visible by SEM due to possible complex formation with CS@LS. Few SRB cells are present on the surface but without proper cell morphology (FIG. 11). After 7 days of incubation, the adhesion of numerous active SRBs can be seen in the SEM images of the coupon surface (FIG. 5(A)). While in presence of CS@LS, the number of attached SRB cells is significantly reduced even with noticeable damage at the bacterium cell surface (FIG. 5(B)). The CS@LS may form a film on the surface of the coupon surface that could hinder the bacterial attachment as indicated by the less number of bacteria on the surface. In addition, the antibacterial effect of CS@LS results mainly in the damage of bacterial cell walls as seen in the SEM image. Similar observations of cell wall damage were observed as the effect of different nanomaterials on other bacteria. For example, ZnONPs induced predominant damage on most of the SRB cells in presence of 100 µg·mL$^{-1}$ of ZnONPs and SRB cells suffered dominant cell lysis observed by severe cell disruption at higher concentration (200 µg·mL$^{-1}$) of ZnONPs. Another work reported a significant and progressive damage on the cell wall of *S. aureus* and *P. aeruginosa* was visible, which resulted in total cell lysis in contact with chitosan-gold nanocomposites.

After 21 days of exposure, uneven deposits of corrosion products were visible on the coupon surface along with complex porous structure of biofilm when exposed to SRB alone (FIG. 5(C)). In the presence of CS@LS, SEM showed different morphology of corrosion products and biofilm with few damaged bacteria on the surface (FIG. 5(D)). This could be attributed to the biocidal effect of CS@LS that inhibits the growth of SRB, which can significantly inhibit the corrosion process. After 35 days of exposure, corrosion products were dominant on the surface along with limited biofilm structure in the case of coupons exposed to SRB alone (FIGS. 5(E) and (F)). In the presence of CS@LS, similar observation is present but with different morphology of corrosion products. No bacteria were visible on the coupon surface in both cases, which could be covered inside the corrosion product layer. The different morphology of the corrosion product is an implication of different corrosion products on the surface in presence of CS@LS. EDS and XRF analysis have quantified the sulfur and iron content in the biofilm and corrosion products film. According to the EDS analysis after 35 days, a reduction in the concentration of Fe and S content by 43% and 31% respectively was observed in the presence of CS@LS. (FIG. 12). The XRF analysis also showed the reduction in Fe and S content by 56% and 29% respectively in the presence of CS@LS confirming the inhibition of SRB activity (FIG. 13).

Figure 5:
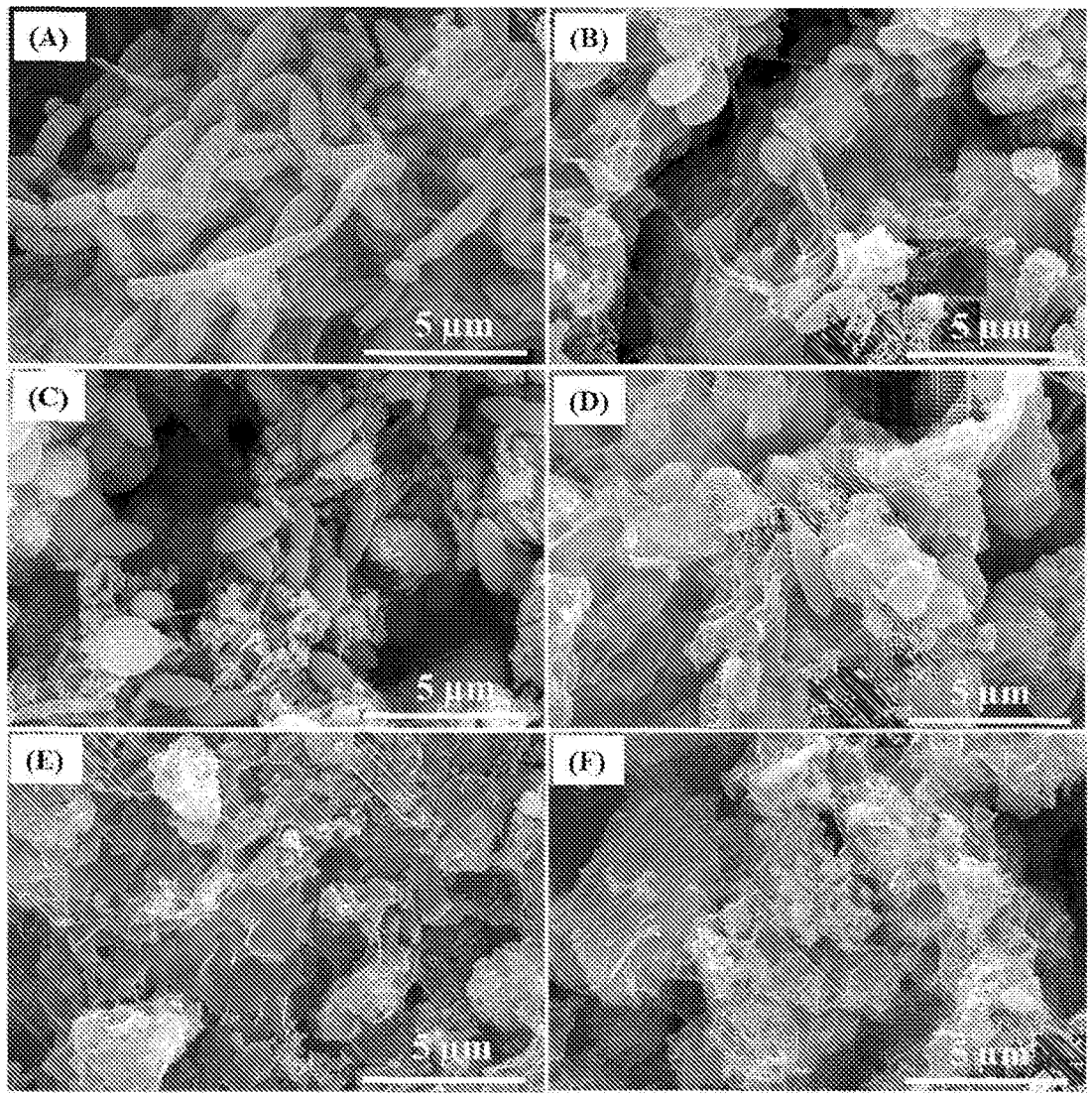
FIG. 5. SEM images of the biofilm after 7 days incubation in SRB media (A), 21 days (C) and 35 days (E) of incubations. SEM images of the biofilm incubated in after 7 days (B), 21 days (D) and 35 days (F) of incubations in SRB enriched media with 500 μg·mL-1 CS@LS.
Figure 35:
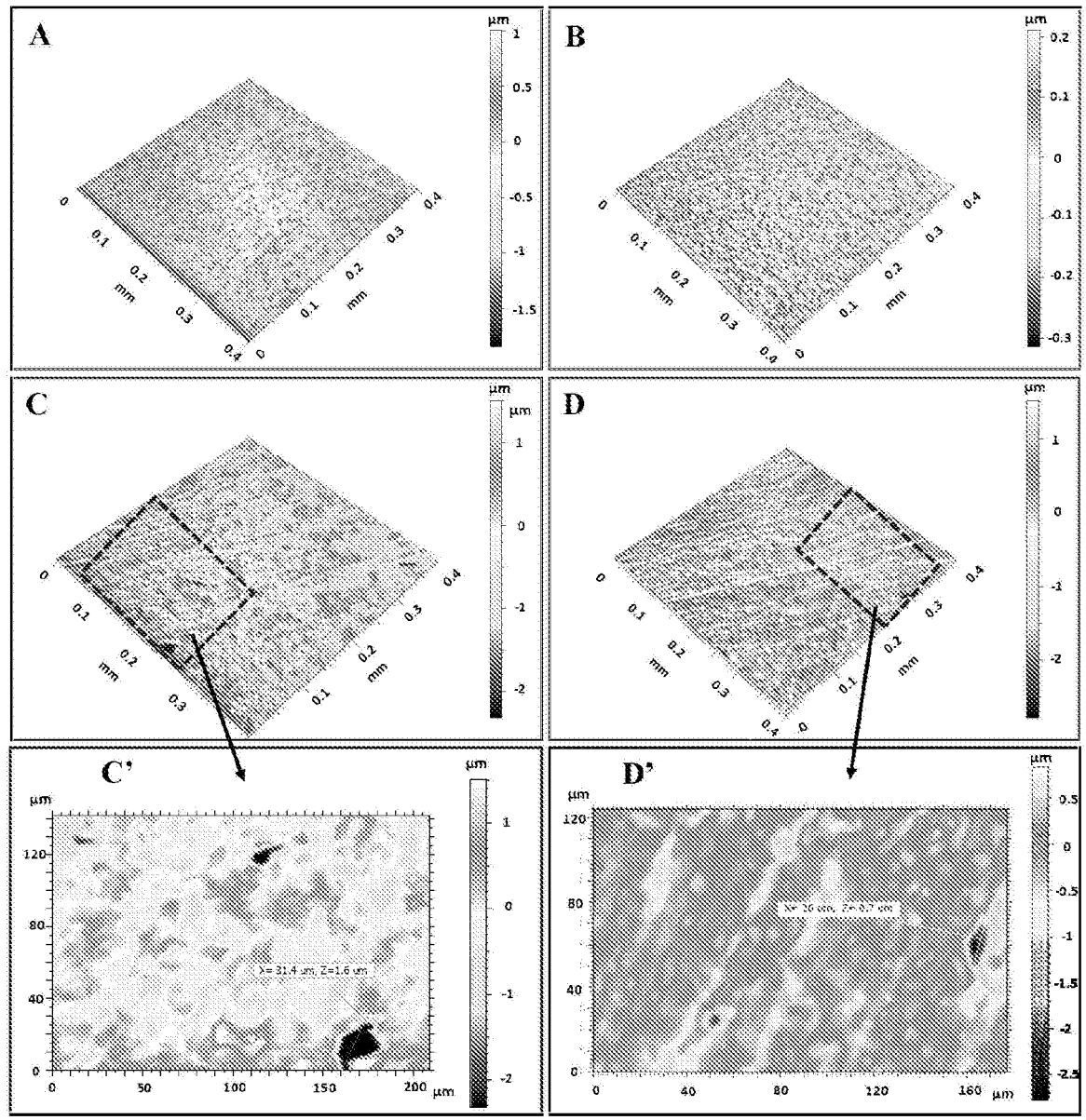
FIG. 35 shows profilometry images (3D) of the surface of the coupon incubated in FIG. 35A SRB alone and FIG. 35B CZNC-10-inhibited SRB after (FIG. 35A and FIG. 35B) 7 days of incubation and (FIG. 35C and FIG. 35D) 28 days of incubation. The magnified 2D images (FIG. 35C') and FIG. 35D') show the pit size. CZNC-10 concentration is 250 μg/mL.

FIG. 5 shows SEM images of the biofilm after 7 days incubation in SRB media FIG. 5(A), 21 days FIG. 5(C) and 35 days FIG. 5(E) of incubations. SEM images of the biofilm incubated in after 7 days FIG. 5(B), 21 days FIG. 5(D) and 35 days FIG. 5(F) of incubations in SRB enriched media with 500 µg·mL$^{-1}$ CS@LS.

FIG. 14 shows the XPS survey of corrosion products after 35 days in SRB media with and without 500 µg·mL$^{-1}$ of CS@LS. The peaks for Fe 3p, Fe 2p, C 1s, O 1s, S 2p and S 2s are observed in both spectra, which can be attributed to biofilm and corrosion products on the coupon surface. The peaks for S 2p and S 2s are confirmed the presence of sulfide and organic sulfur which are formed by the SRB activity. However, the smaller peak intensities of Fe 2p, S 2s and S 2p in the coupon incubated in presence of CS@LS revealed the inhibition effect of the CS@LS towards SRB growth. In addition, the high-resolution XPS spectra of Fe 2p and S 2p are examined to confirm the reduction in the intensity of XPS peak as well as to evaluate the corrosion products.

The fitted Fe 2p peaks after 35 days with and without CS@LS are shown in FIGS. 6(A) and (B) respectively. Two sharp peaks at 709.6 eV which are corresponding to FeO and at 707.6 eV (Fe 2p$_{3/2}$) corresponds to mackinawite (Fe$_{1+x}$S) and pyrite (FeS$_2$) present in both spectra. In addition, a peek at around 712.4 eV, which corresponds to Fe$^{3+}$ originated from Fe$_2$O$_3$ is present in both the coupons. Sharp peaks at around 710.4 eV (Fe 2p$_{3/2}$) correspond to FeS is present in the coupon exposed to SRB alone. The peak at 713.7 eV (Fe 2p$_{3/2}$) is corresponding to Fe(III)O originated from Fe$_2$O$_3$ is obtained in the presence of CS@LS. From the XPS analysis, it was found that the corrosion products are mainly FeO, FeS, FeS$_2$ and Fe$_2$O$_3$. However, FeS peak is prominent only in the coupon exposed to SRB alone which confirmed the SRB activity as well as a reduction in SRB activity in presence of CS@LS.

Figure 6:
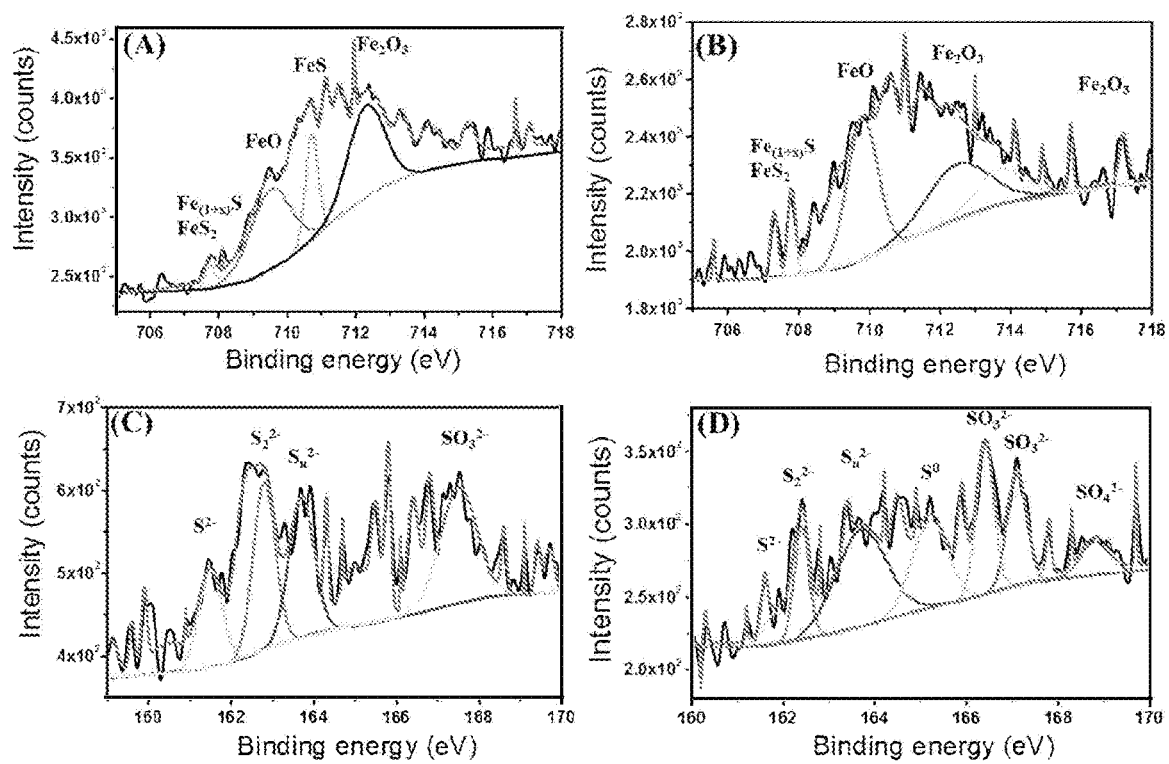
FIG. 6. High-resolution Fe 2p spectra (A, B) from coupons incubated in SRB alone (A) and SRB with 500 μg·mL-1 of CS@LS (B). High-resolution S 2p (C, D) from coupons incubated in SRB alone (C) and SRB with 500 μg·mL-1 of CS@LS (D).

FIG. 6 shows high-resolution Fe 2p spectra (FIG. 6(A) and FIG. 6(B)) from coupons incubated in SRB alone FIG. 6(A) and SRB with 500 µg·mL$^{-1}$ of CS@LS FIG. 6(B). High-resolution S 2p (FIG. 6(C) and FIG. 6(D)) from coupons incubated in SRB alone FIG. 6(C) and SRB with 500 µg·mL$^{-1}$ of CS@LS FIG. 6(D).

The fitted S 2p spectra after 35 days in FIG. 6(C) and FIG. 6(D) shows a monosulfide (S$^{2-}$) peak at 161.4 eV (S 2p$_{3/2}$), disulfide (S$_2^{2-}$) peak at 162.3 eV and polysulphide (S$_n^{2-}$) species peak at 163.8 eV in both coupons. Additionally, a peak at 167.4 eV (S 2p$_{3/2}$), corresponds to sulphite (SO$_3^{2-}$) is also present in both coupons. The (S$^{2-}$) and (S$_2^{2-}$) peaks are most likely attributed to the Fe—S bond and the S$_n^{2-}$ peak may originate from S—S bonding. However, additional peaks at 166 eV corresponds to sulphite (SO$_3^{2-}$), at 165 eV corresponds to S 2p$_{1/2}$ component of S$^0$ type sulfur and peak at 168.8 eV corresponds to SO$_4^{2-}$ (S 2p$_{3/2}$) were present in the coupon incubated with CS@LS nanospheres. The reduction in the intensity of monosulfide, disulfide and polysulphide species peaks in presence of CS@LS reveals the significant inhibition of SRB activity.

Figure 7:
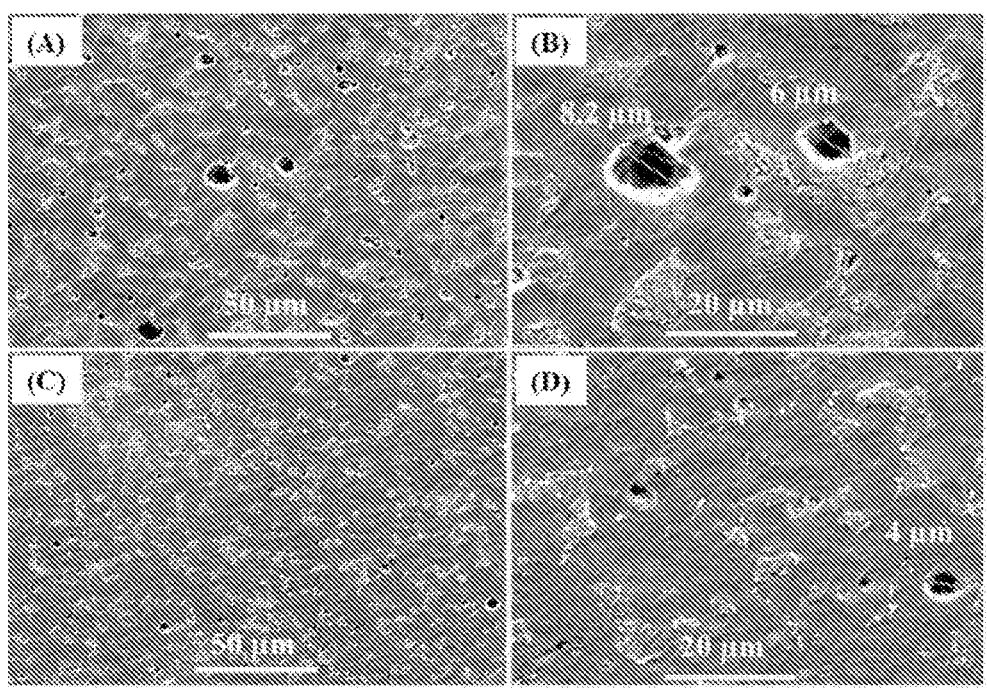
FIG. 7. SEM micrograph of corrosion pits after removing the corrosion products from SS400 coupons incubated in SRB alone (A and B) and in presence of CS@LS nanospheres (C and D) after 35 days of incubation.
Figure 15:
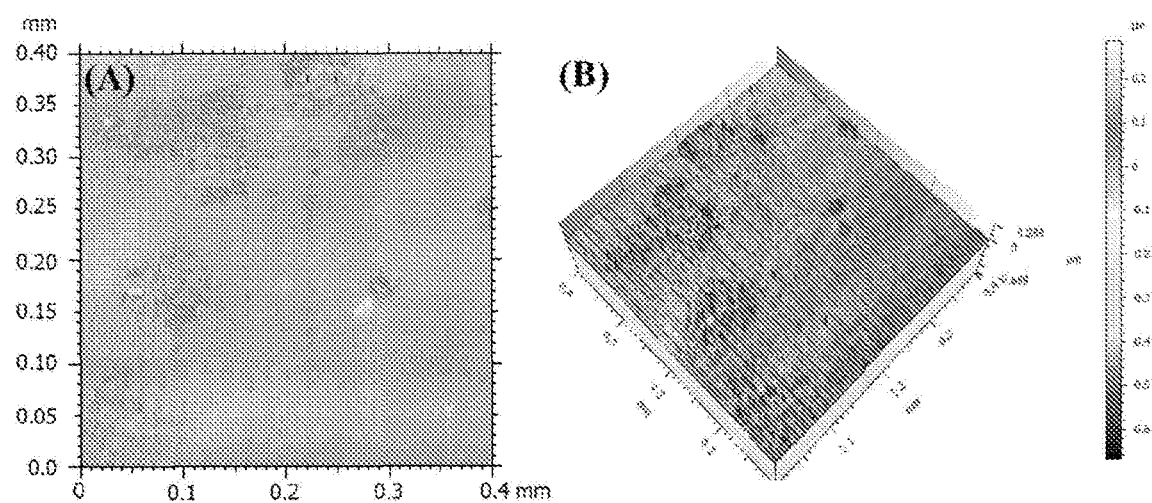
FIGS. 15. (A) 2D and (B) 3D Profilometry images of the bare carbon steel coupon surface.

SEM and surface profilometry analysis show the coupon surface after removing biofilms and corrosion products. FIG. 7 shows the SEM images of pits observed on the coupon surface. Pits diameter is greater when coupon is incubated in SRB alone as compared with SRB/CS@LS mixture. The widest pit is observed in the coupon incubated SRB alone is around 8.2 µm in diameter while it is only 4 µm in case SRB with CS@LS. These results are matching with EIS and XPS data. In addition, the surface roughness of both coupons was also calculated form profilometry. For comparison, the 2D and 3D profilometry images of the bare coupon is shown in FIG. 15(A) and FIG. 15(B). The average surface roughness of the bare coupon is 17±2 nm, which is appropriate for bacterial attachment. FIG. 16 shows high-resolution image of the coupon surface after removing the corrosion products from the coupon surface. After 35 days of incubation, the average roughness of the coupons is 780±19 nm in absence of CS@LS inhibitor. While in presence of CS@LS inhibitor, the average surface roughness is reduced to 458±16 nm, i.e. the surface roughness of the coupon is reduced to approx. 40% in presence of the CS@LS.

FIG. 7 shows SEM micrograph of corrosion pits after removing the corrosion products from SS400 coupons incubated in SRB alone (FIG. 7(A) and FIG. 7(B)) and in presence of CS@LS nanospheres (FIG. 7(C) and FIG. 7(D)) after 35 days of incubation.

Generally, the biocorrosion inhibition by any nanomaterials can be originated from their antibacterial activity against microorganisms. Due to the hydrophilic nature, CS@LS can readily bind to the negatively charged bacterial cell surfaces which led to membrane disruption and cell death. The physical interaction between nanoparticles and bacterial cells leads to the inactivation of bacterial cells and cell damage. In addition, the chitosan having film formation capability on the carbon steel surface which protects the surface from the initial bacterial attachment.

4. Conclusion

CS@LS nanospheres have been successfully evaluated as a novel biocide for the inhibition of SRB induced biocorrosion. It was found that CS@LS nanospheres at 500 µg·mL$^{-1}$ is the optimal inhibitory concentration for SRB. From the electrochemical analysis, the R$_{ct}$ values are approximately doubled in the presence of CS@LS compared with the CS@LS-free media irrespective of incubation intervals. The maximum corrosion inhibition efficiency achieved for CS@LS against SRB induced corrosion is 85%. From SEM and XPS analysis, it was found that CS@LS significantly reduced biocorrosion by inhibiting bacterial growth as well as preventing the bacterial attack by a protective film made of CS@LS. EDS and XRF analysis showed that iron and sulfur content in the biofilm are significantly reduced in presence of CS@LS nanospheres. The corrosion products were mainly iron oxides and iron sulfides, and the intensities are significantly reduced in presence of CS@LS due to inhibitory action of nanospheres against SRB. SEM and profilometry analysis showed fewer surface defects on the coupon incubated with CS@LS, indicating effective corrosion inhibition. In short, the CS@LS nanospheres are presented as renewable and environmentally benign biocide for the inhibition of SRB induced MIC on carbon steel systems.

Example 2

Eco-Friendly and Biodegradable Lignin Reinforced Chitosan Nanocomposites for Efficient Inhibition of Sulfate Reducing Bacteria in Inject Water Abstract Sulfate reducing bacteria (SRBs) induced biofilm formation is a global industrial concern due to its role in the development and spread of microbial induced corrosion (MIC). Traditional biocides being used for inhibiting the biofilm growth are considered inefficient and detrimental to environment. Herein, a novel and simple procedure for one step synthesis of lignin reinforced biocompatible and biodegradable chitosan nanocomposites (CNLS-NCs, CS@LS, or CS@LS-1:1 composite) under solvent-free conditions is presented. Stable CNLS-NCs was developed with an average size of 40 nm and zeta potential of +34.25 mV and used as an effective and ecofriendly biocide for the growth inhibition of SRBs. The SRBs biofilm growth inhibition performance of the synthesized nanocomposites were evaluated by sulfate reduction profiles coupled with analysis of extracted extracellular polymeric substances (EPS) and lactate dehydrogenase (LDH) release assays. A decrease in sulfate reduction was found with increasing CNLS-NCs concentration. As the nanocomposite concentration was increased from 50 to 500 µg/mL, the specific sulfate reduction rate (SSRR) decreased from 0.278 to 0.036 g-sulfate/g-VSS*day showing a relative sulfate reduction inhibition of 86.64% as compared to that of control. Similarly specific organic uptake rate (SOUR) decreased from 0.082 to 0.039 0.036 g-TOC/g-VSS*day giving a relative co-substrate oxidation inhibition of 52.19% as compared to that of control. The multiple probable number (MPN) experiments showed SRBs counts of $2.1 \times 10^7$ per mL for control, whereas, the assay spiked with higher concentration of 500 µg/mL CNLS-NCs showed reduction in cell viability to $1.5 \times 10^6$ per mL. Bacterial cell damage was revealed by flow cytometry analysis coupled with LDH release assay. The NCs showed long-term stability and excellent antibacterial properties against SRBs growth, and is thus potentially useful for combating the problems of biofilm growth in harsh marine and aquatic environments.

Introduction

Biofilm formation is a major problem in many industrial systems including oil and gas industry. Biofilms which consist of bacterial cells embedded in a highly hydrated, extracellular polymeric matrix on metal surfaces are formed by different microorganisms [1]. Apart from abiotic corrosion, biocorrosion which is estimated ~20% of corrosion affects the lifetime of various industrial materials and equipment [2]. Among the anaerobic microorganisms, sulfate-reducing bacteria (SRBs) are one of the most important groups commonly associated with microbial corrosion. Copper, carbon steel, stainless steel and their alloys are widely used in marine environments, however, the presence of sulfate-reducing bacteria (SRBs) in an anaerobic marine environment can significantly accelerate the biocorrosion of metal and its alloys [3]. The formation of SRBs biofilm can deteriorate metal surfaces, which encourage metal sulfide precipitation and result in an intergranular corrosion. Microbiologically influenced corrosion (MIC) of the infrastructure leads to serious economic and environmental problems. Usually seawater is co-injected to enhance the oil recovery as inject water. Seawater has high sulfate concentrations where anaerobic conditions will eventually prevail and sulfate-reducing bacteria can metabolize hydrocarbons and thereby intensify the biocorrosion of metal structures under anaerobic conditions [4-6]. The traditional strategy to control MIC is the application of biocides to kill the microorganisms in the aqueous environment. However, it is now recognized that these traditional biocides are not environment friendly, less affective when microorganisms are into biofilm matrix because of diffusion barrier due to which biocides cannot penetrate into the biofilm [7-9]. Over the ensuing days, there is a need to replace the conventional biocides with environmentally benign and efficient antibacterial agents. A lot of effort has been made toward the sustainable production of alternative sustainable, environment friendly bactericidal agents to address concerns over conventional biocides.

Application of nanomaterials (NMs) in medicines, foods, cosmetics, and environmental processes is on increase due to their unique size dependent physicochemical characteristics different from their bulk counter parts [10-13]. Several NMs composed of metal, metal oxides (e.g. Ag, Cu, ZnO, Ti, Ni), natural polymers and carbon based materials have been recognized as an effective biocide against a variety of microorganisms [10, 14-18]. However, there is a concern that after releasing into the environment, these NMs can cause toxicity to living systems [19]. So, there is a need to find out the NMs which are stable, have excellent antibacterial activity and are sustainable and environmentally benign. These efforts have advanced considerably recently and have promised new considerations. Nanoparticles occur naturally in the environment and have been intentionally used for centuries as minerals, clays, and products of bacteria, however, the systematic design and synthesis of engineered nanomaterials has only occurred in the last few decades. Much work in today's studies of engineered nanoparticle is focused on green NMs derived from natural biopolymers. Chitosan is inexpensive, nontoxic, biocompatible and biodegradable naturel polymer obtained from biomass and possesses antibacterial properties and hydrophilic nature. It is commendable to indicate that the bactericidal properties of chitosan based NMs on different individual microorganisms strains have been significantly studied [20, 21]. Much of the current understanding of bactericidal activities has been studied by bacterial viability and growth analysis, of monoculture bacterial model systems and assays using techniques like colony forming unit (CFU) assays and optical density (OD) measurements to find out bacterial growth efficiency and/or calculate minimum inhibitory (MIC) concentrations. However, the antibacterial activity of chitosan against complex naturel bacterial consortia has not been studied and understood. Therefore, it is much needed to focus on the complexity of systems and move from individual species to more complex mesocosms and assessing the effects of engineered nanomaterials in naturel microbial consortia. It is expected that chitosan based organic nano biocides could efficiently inhibit biofilm growth as these NMs would adsorb onto metal surfaces through heterocyclic atoms (such as nitrogen, oxygen, sulfur, and phosphorus), multiple bonds, or aromatic rings and block the active sites, thus inhibiting the biofilm growth.

Chitosan contains active free amino groups which imparts a net positive charge favoring ionic interaction with many negatively charged surfaces or polymers which have made it of great interest for applications as antibacterial agent [22, 23]. Usually, chitosan NPs are synthesized by addition of anionic compound like trypolyphosphate which is harmful to environment. So researchers are interested to find new nontoxic anionic compounds. Biopolymers are attractive candidates to create high-performance and environmentally friendly functional reactive compounds. Lignin is the most abundant natural renewable bioresource and one of the major non-cellulosic component of wood and byproduct of paper industry [24, 25]. The lignosulfonic acid (LSA) is one of the most important lignin derivatives, which is a waste product from paper industry and have good antibacterial activity [25]. To our knowledge, to date no work has been directly done about the use of LSA as anionic biopolymer for synthesis of Chitosan-LSA (CNLS-NCs) nanocomposites and its use as a biocide for SRBs and/or any other bacterial biofilm growth inhibition.

In the present work, we report an innovative simple and efficient procedure for one step synthesis of CNLS-NCs, as an effective biocide, green and sustainable, under solvent-free conditions. For the first time, physicochemical properties and biological activity of lignin-chitosan nanocomposites were tested against SRBs biofilm in inject seawater. The antibacterial effects of chitosan and lignin different stoichiometric ratios on the sulfate reduction process of anaerobic SRBs biofilm were investigated at various concentrations and compared to that of chitosan and lignin. The safe use of these nanoparticles in aquatic environment was tested using the zebrafish acute toxicity assays, a cheap aquatic and reliable model that is increasingly used for drug and nanoparticle toxicity testing. Based on the observed antibacterial activity, the optimized nanocomposites exhibiting higher antibacterial activity were further studied by performing the analysis of extracellular polymeric substances (EPS) of biofilms coupled with scanning electron microscopy (SEM) and lactate dehydrogenase (LDH) release assay.

Materials and Methods a. Materials

Low molecular weight (LMW) Chitosan (CS) with 85% degree of deacetylation was purchased from Sigma Aldrich Co., Ltd (USA). Lignosulfonic acid sodium salt (LS) (average Mw ~52 000, average Mn ~7000), glacial acetic acid, $Na_2SO_4$, $H_2SO_4$, and formaldehyde were supplied by Sigma-Aldrich. SRBs culture was enriched from biofilm sludge obtained from MAERSK Oil Research Center (MORTC), Qatar. Deionized (DI) water was used to prepare all solutions. All other chemicals were analytical grade and used without further purification. For zebrafish acute toxicity, similar to many other studies, Diethylaminobenzaldehyde (DEAB) was as used as a positive control. That is, DEAB is a competitive inhibitor of aldehyde dehydrogenases and known to cause toxic and teratogenic effects. N-Phenylthiourea (PTU) in egg water (E3 media) was used as a medium to raise zebrafish embryos in vitro. Furthermore, PTU was utilized to inhibit pigment formation in the developing embryos, thus in it facilitate imaging under the microscope. E3 media ingredient includes potassium chloride (KCl), sodium chloride (NaCl), calcium chloride dihydrate ($CaCl2·2H2O$), and magnesium sulfate heptahydrate ($MgSO4·7H2O$). All of the above chemicals were purchased from Sigma-Aldrich, Germany. 10× Stock solutions for zebrafish embryos experiments such as Egg water, PBS, and PTU, and methylene blue solution was prepared as described in. Water used to prepare working solutions was purified using a MilliQ water purification system (Millipore, France). To avoid aggregation and to approach the maximum dispersion, a stock solution 1.0 g/L for the chitosan-lignin (CNLS-NCs or CN,LS) nanoparticles were prepared by adding 0.01 of each compound to 10 mL 1× PTU-E3 media. Then, all the stock solutions were probe sonicated for 5 minutes for 2 cycles. At the time of the experiment, the stock solutions were then further diluted in PTU-E3 media to the desired tested concentration (25, 50, 100, 150, 200, 250 mg/L).

b. Synthesis of Chitosan-Lignosulfonic Acid Nanocomposites (CS@LS)

CS@LS nanocomposites were prepared by formal cross-linking of CS and LS as earlier reported method. Briefly, CS (10 mg/mL) was dissolved in an aqueous solution of 1% (w/w) acetic acid and stirred overnight at room temperature using a magnet stirrer. Obtained solution was filtered (pore size 0.45 m, Millipore, USA) to remove residues of insoluble particles and diluted with DI water to various concentrations: 1.0, 2.0, 3.0 mg/mL. The pH of these solutions was adjusted to 5.0 using 10 N aqueous NaOH. LS was dissolved in DI water at various concentrations similar to that of CS. A cross-linking solution was prepared by adding $Na_2SO_4$ (1.5 g), formaldehyde (0.54 g) and $H_2SO_4$ (1.25 mL) into 4.7 mL of DI water. CS@LS nanocomposite were initially synthesized by adding CS (1 mg/mL) and LS (1 mg/mL) at mass ratios of 2:1, 1:2 and 1:1, respectively, at room temperature (25° C.) under magnetic stirring. Cross linking solution was added drop wise to the solution mixture. The reaction was carried out for 20 min and the resulting suspension was washed three times with DI water to remove any unused cross linker. After finding the appropriate mass ratios of CS and LS, effect of CS and LS concentration on size of CS@LS was studied.

c. CS@LS Nanocomposite Characterization, Aggregation and Stability Studies

CS, LS, and synthesized CS@LS nanocomposite were characterized by X-ray diffractometer (XRD), fourier transform infrared spectroscopy (FTIR), scanning electron microscopy (SEM), transmission electron microscopy (TEM), Zetasizer and backscattering studies. A Zeta phase analysis light-scattering (ZetaPALS) analyzer (Malvern Instruments, Zetasizer Nano ZS) was used to measure the zeta potentials. The hydrodynamic diameter of the composite was measured using dynamic light scattering (DLS) and the ZetaPALS analyzer (Malvern Instruments, Zetasizer Nano ZS). Stability of the CLSA nanocomposite were investigated by exposing it to a concentration range of salts and humic acid. The hydrodynamic diameters were measured without moving the cell at specific intervals over 40 min to achieve early stage aggregation kinetics. Wide angle XRD (WXRDs) was recorded using a Bruker D8 Advance (Bruker AXS, Germany). XRD with Cu-Ka radiation ($\lambda$=1.54056 A) at a voltage of 40 kV and a current of 15 mA with a step scan of 0.02° per step and a scanning speed of 1°/min. Scanning electron microscopy (SEM) was measured using a FEI Quanta 650 FEG SEM, after gold sputter coatings on samples. (TEM) images were recorded using a FEI Tabs F200X TEM. The samples were dispersed in ethanol and mounted on a lacey carbon Formvar coated Cu grid.

Then stability of CNLS-NCs in injects water and effect of organics on the aggregation and settlement was evaluated using backscattering assays. One milliliter of 20, 50, 100, 200, and 500 mg/L of CNLS-NCs were suspended in injects water and transferred to quartz colorimetric cuvette. In a second assay, the effect of organics on the aggregation and settlement of NPs was evaluated by adding 100, 200, and 500 μg/mL of humic acid, whereas, CNLS-NCs was kept constant at 50 μg/mL. With the passage of time, the change in backscattering signal was used to indirectly characterize the aggregation of CNLS-NCs. The backscattering (B) was determined after different time intervals and the aggregation of nanocomposite was calculated using Eq. (1).

$$\% \text{ Aggregation}(A_t) = \frac{B_o - B_t}{B_o} \times 100 \quad (1)$$

d. Enrichment of Sulfate-Reducing Bacteria (SRBs) Biofilm and Biofilm Inhibition Studies The mixed culture of SRBs used in this study was enriched from biofilm samples collected from Alshaheen oil filed in Qatar as described earlier [29]. Postage's C medium was used to prepare the active SRBs cultures (Postgate, 1984) in simulated inject sea water. The pH of the medium was initially adjusted to approximately 7.5 with a 1 N NaOH solution and was heat-sterilized at 15 psi and 120° C. for 20 min. A high purity nitrogen gas was purged through the medium to maintain anaerobic conditions before inoculation. The culture was maintained in 1 L bottles at 35° C. on a rotary shaker at 110 rpm. The developed culture was further sub-cultured every week under anaerobic conditions for several months. Sulfate reduction and sulfide production were indicated through blackening of the media.

Batch assays were performed in glass vessels of 250 mL capacity containing 150 mL of Postgate C media prepared in synthetic seawater. Sodium sulfate and sodium lactate were used as the sulfate and carbon sources, respectively. The reactors were seeded with enriched mixed SRBs biofilm to make volatile suspended solids (VSS) concentration of 500 mg/L. In order to investigate the effect of synthesized nanomaterials on the activity of SRBs, the inhibition effect of synthesized nanomaterials (Ch, LSA, and CLSAs on the sulfate reduction, organics compound oxidation and sulfide production. To examine the effect of CLSAs on SRBs biomass, the batch assays were subjected to 10, 20, 50, 100, and 250 μg/mL CLSA concentrations with sulfate and TOC concentrations at 1000 and 650 mg/L, respectively. A high purity nitrogen gas was purged through the medium to maintain anaerobic conditions before inoculation. The reactors were exposed to continuous shaking at 110 rpm and constant mesophilic temperature of 35° C. Aliquots of the samples were withdrawn at specific time intervals. Abiotic controls consisted of the sterile seawater and CLSA suspension medium without the inoculum. All experiments were performed in triplicate and average values were reported.

e. Cell Staining and Flow Cytometer Analysis

Cell suspensions after reaction were collected and stained with SYTO 9 and PI simultaneously using LIVE/DEAD® BacLight Bacterial Viability and Counting Kit (L34856). Briefly, 1 mL of the bacterial suspension was washed with PBS buffer by centrifugation at 10,000×g for 3 minutes and resuspended in PBS buffer. A staining solution was prepared by adding 987 μL of PBS buffer, 1.5 μL SYTO 9 (3.34 mM) nucleic acid stain and 1.5 μL propidium iodide (30 mM) into a flow cytometry analysis tube. 10 μL of a SRB cell suspension prepared earlier was added into the staining solution. Mixture was thoroughly mixed and incubated for 20 minutes in dark at room temperature. Stained samples were analyzed with a The BD Accuri™ C6 flow cytometer (BD Biosciences, CA).

f. SEM Imaging, LDH Release Assay and Analysis of EPS from Biofilm

Effect of CNLS-NCs on SRB biomass structure was investigated by field emission-scanning electron microscopy (FE-SEM). SEM imaging of the samples was done using the method as described earlier [27]. Images were taken by using a FEI Quanta 650 FEG SEM. LDH release assay was used to determine the cell membrane activity of SRBs biofilm exposed to CLSA in inject water using LDH kit (Roche Applied Science). The standard protocol assay was performed according to the manufacturer's instructions. Briefly, SRBs biomass suspension treated with 250 μg/mL of CLSA was transferred into sterile 1 mL centrifuge tubes. Then, 50 μL substrate mixtures were added and tubes were incubated at room temperature in the dark for 1 hr. The reaction was quenched by the addition of 50 μL of stop solution. LDH release was quantified by measuring absorbance at 490 nm.

In order to study the effects of concentration of nanomaterials on sulfidogenic biofilm, EPS were extracted as described earlier. At the end of batch experiments, 10 mL of mixed liquor was taken from all the reactors and centrifuged at 12,000 rpm for 5 min. Supernatant was wasted and pellets obtained were resuspended in distilled water. A quantity of 0.06 mL formaldehyde (36.5%) was added to the suspension, with this then incubated at 4° C. After 1 h, 4 mL of 1 N NaOH were introduced for 3 h at 4° C. The incubated samples were centrifuged at 10,000 rpm for 10 min and the supernatant obtained was collected as EPS extracts and stored at −20° C. before further characterization. Concentrations of proteins, humic substances, carbohydrates, and lipids within the EPS extract were analyzed as described elsewhere [32].

2.6. Analytical Methods

Liquid samples from all the assays were collected at different time intervals and centrifuged at 10,000 rpm for 20 min. Supernatant obtained was used for further analysis. TOC was analyzed using TOC analyzer. Before TOC analysis, samples were acidified with 1 M HCl and $N_2$ gas was purged to remove dissolved sulfide. Volatile suspended solids (VSS) were analyzed following the standard methods (APHA, 1998). Dissolved sulfide was analyzed immediately after sample collection by titrimetric method (APHA, 1998). Concentration of sulfate and sulfite was analyzed by a DX ICS-5000 ion chromatography (IC) unit (Dionex, USA).

2.7 Zebrafish Culture and Acute Toxicity Assay

We used wild type zebrafish embryos (AB strain) in our study. For detailed information about our zebrafish aquatic system (Aquaneering, USA), original source of the zebrafish, zebrafish culture, mating protocol, and animal protocol guidelines, the reader is advised to visit the following articles. For the acute toxicity assay, at 24-hours post fertilization (hpf), embryos were dechorionated as described in. Briefly, E3 media were removed and 0.5 mg/mL of pronase enzyme (Sigma, Germany) in 10 mL PTU-E3 media was added and incubated for 10 min at 28° C. until the chorion become soft. Then, embryos were washed 2-3 times with PTU-E3 medium until the embryos were released and free from the chorion. The healthy dechorionated embryos were selected for the acute nanoparticle exposure experiment. Embryos were placed in 12-mutiwell plate, each well contains 3 mL of fresh PTU-E3 media containing (i) six different concentrations of chitosan-lignin (25, 50, 100, 150, 200, and 250 mg/L) (ii) positive control (PC) DEAB (0.1, 10, 100 µM), and (iii) PTU-E3 media alone as a negative control (NC), and incubated for additional 48 (until embryos reached 72-hpf). The mortality rate and teratogenicity (morphological deformities) were observed and recorded at 2-time point intervals (48 and 72-hpf) using a standard stereo microscope (Zeiss, Germany). The teratogenic effects of both nanoparticles were determined based on the normal embryo morphology of the negative control (FIG. 9A), and abnormal morphology [defects in body size, heart and yolk edema, scoliosis, pigmentation, and movement problem (FIG. 9B)] of the positive control. Teratogenicity was scored at 72-hpf by calculating the number of dead and deformed embryos over the total number of normal embryos used in each concentration (50 embryos). The embryos were scored as dead if they showed coagulation of unfertilized eggs, no somite formation, lack of detachment of tail-bud from the yolk sac, and no heartbeat [34]. The median lethal dose ($LC_{50}$) was calculated using the Graph Pad Prism software and as detailed in. Furthermore, the no observed effect concentration (NOEC) value was designated as the highest tested concentration with no statistically significant teratoginic score (<20% deformaty and mortality). within the exposure period (24-72 hpf, total 48 h) when compared with the negative control.

Results and Discussions a. Nanomaterials Characterization

CS@LS were synthesized using LS compound as the counter ion polymer to react with protonated polycationic CS polymer. In presence of crosslinking reagent in aqueous media, the CS and LS polymers strongly bonded by covalent bonding. CS@LS was prepared by the addition of LS solution into CS solution at room temperature under magnetic agitation at selected CS to LS weight ratios of 1:1, 2:1, and 1:2 with fixed CS concentration of 2 mg/mL. The size of the synthesized CS@LS was measured by investigating hydrodynamic diameter by Zetasizer.

FIG. 18 depicts the SEM images of the synthesized CS@LS nanocomposites. The nanocomposites at 2:1 (FIG. 18(A)) and 1:2 mass ratios (FIG. 18(B)) of CS and LS showed irregular shaped aggregates, whereas, 1:1 mass ratio of CS and LS showed very uniform spherical shape particles with average diameter of 40 nm. FIG. 18(D) shows the effect of CN to LS weight ratio on nanocomposite size. Hydrodynamic diameter CN to LS weight ratio was observed within the tested CN to LS ratio range. CN and LS mass ratios showed prominent effect on synthesized nanocomposite size. The hydrodynamic diameter of nanocomposite at CN and LS ratios of 2:1 and 1:2 was about 351 nm and 374 nm, respectively, whereas it was 148 nm for mass ratio of 1:1. The smaller hydrodynamic diameter of CNLS-NCs at 1:1 mass ratio of CH:LN can be attributed to the uniform spherical size of the nanocomposites as confirmed by SEM analysis. Based on the above mentioned results, CNLS-NCs synthesis was found optimum at initial CN concentration of 1 mg/mL with CN and LS mass ratio of 1:1 and was used for the further characterization and SRBs inhibition experiments.

FIG. 19(A) describes the XRD patterns of CS, LS and CS@LS-1:1. It was observed that the diffractogram of CS consisted of two major peaks at ca. ~10.0° and ~20.0°, which are typical fingerprints of crystal CS [28, 29]. Lignin salt has a broad (002) graphite-peak centered near 2θ~22° [30]. The CS@LS-1:1 composite showed broad peak at 22.7°, may be due to the formation of a new binary framework that could disrupt the original structure of both CS and LS. In the composite, the peak at 10.0° disappeared, while the peak intensity at around 20.0° decreased indicated a more amorphous phase of the composite.

FIG. 18 shows SEM images (A) CS@LS-2:1 (B) CS@LS-1:1 and (C) CS@LS-1:2; TEM images (D) CS@LS-2:1 (E) CS@LS-1:1 and (F) CS@LS-1:2.

The FTIR spectra of CS, LS and CS@LS-1:1 composite are given in FIG. 19(B). The characteristic absorption bands at 1654, 1381 and 1069 cm$^{-1}$ are assigned to the C=O stretching (amide I), $CH_3$ symmetrical deformation, and the C—O stretching vibrations (C—O—C) of chitosan, respectively [30]. The FTIR spectrum of LS shows characteristics absorption bands at 1609, 1209, and 1044 cm$^{-1}$ corresponding to the C=C stretch of phenyl, C—O stretch of —$OCH_3$, and S=O stretch of —$SO_3Na$, respectively [38]. The FT-ATR spectrum of CS@LS-1:1 showed absorption band at ~1158 (sym. $SO_2$ stretch), and at ~1634 (—$NH_2$ bending vibration) and confirmed presence of sulphonic acid groups and amine groups. The cross-linked structure of the CS@LS-1:1 composite was also confirmed by diether (—C—O—C—) absorption band at 1031 cm$^{-1}$ [39]. Furthermore, strong absorption band at ~1101 cm$^{-1}$ attributed to the C—O stretch of CS and —$OCH_3$ groups.

FIG. 19 shows (A) XRD pattern of CS, LS, and CS@LS-1:1 composite; and (B) FTIR spectra of CS, LS, and CS@LS-1:1 composite.

The antibacterial activity of nanoparticles largely depends on the surface charge of the nanoparticles due to their interaction with proteins and enzymes in bacterial membrane. Zeta potential of CNLS-NCs was about +34.25 mV. CN and LS formed compact nano complexes after adding cross linker with an overall positive surface charge as measured by zeta potential.

Nanoparticles can transform due to number of processes, including aggregation/agglomeration, redox reactions, exchange of surface moieties, and reactions with bio-macromolecules e.g. natural organic matter (NOM) and extracellular polymeric substances (EPS) in the biofilm. These active transformations in turn affect the transport, and bactericidal characteristics of nanoparticles in the biofilm sludge. So it is critical to comprehend and characterize the stability of nanocomposites in the reaction media. So the trends of CNLS-NCs aggregation was investigated by modeling the aggregation of CNLS-NCs in inject water at different initial CNLS-NCS concentrations. FIG. 20 shows the CNLS-NCs precipitation rates for the suspensions at different CNLS-NCs concentrations. The $A/A_0$ ratio (where $A_0$ and A shows the initial and at any time t absorbance, respectively) showed that the suspensions with lower concentrations of CNLS-NCs were relatively more stable because the faster $A/A_0$ changes, the less stable will be the suspension. The precipitation rate gradually increased with the time for initial 5 hours with increasing CNLS-NCs concentration of the suspension to 500 mg/L. After 5 hr of reaction time, there was no further sedimentation and suspensions become stable.

FIG. 20 shows sedimentation plots for CNLS-NCs plotted at different initial concentration of nanocomposite suspensions.

b. Influence of synthesized nanocomposite on SRBs activity. In this study, we synthesized the CNLS-NCs at different mass ratios of CN and LN and investigated the antibacterial activity of nanocomposites against enriched anaerobic SRBs consortia. The inhibitory activity was initially studied by exposing the bacterial consortia to CN, LN, and CNLS-NCs at different CN and LS mass ratios of 1:1, 1:2 and 2:1 named as CNLS-NCS1, CNLS-NCS2 and CNLS-NCS3, respectively. In order to find out the impact of different materials on activity of SRBs consortia, co-substrate oxidation and sulfate reduction was assessed by analyzing TOC and residual sulfate concentrations. FIG. 21(A) depicts the sulfate reduction and organics oxidation profiles (TOC) for the SRBs consortia exposed to three materials. In control assay, the sulfate concentration was reduced form initial 1000 mg/L to 35 mg/L after 85 h of reaction time with more than 96% of sulfate reduction efficiency. The concentration of TOC decreased from 700 mg/L to 180.5 mg/L with an organic oxidation efficiency of 73.6%. The sulfate reduction efficiency was 82.0, 88.78, 53.8, 65.26 and 76.81% in presence of 100 mg/L of CN, LS, CNLS-S1, CNLS-S2 and CNLS-S3, respectively. It can be observed that CNLS-S1 showed the highest decrease in sulfate reduction (FIG. 21). Similarly, TOC removal efficiency profiles also showed the similar trends and CNLS-S2 showed the highest residual organics concentration with a co-substrate utilization efficiency of 54.26%.

FIG. 21 shows SRBs activity measurements of biomass treated with CN, LN and CNLS-NCs nanocomposite in inject water. SRBs Biofilm (200 mg·VSS/L) were incubated with 100 µg/mL of each nanomaterial at 35° C. at 150 rpm shaking speed. FIG. 21(A) shows sulfate reduction profiles during reaction time, and FIG. 21(B) shows relative sulfate reduction and organics oxidation inhibition given as % of the control. Batch reactor without any nanomaterials was used as control. Error bars represent the standard deviation of three independent assays.

Activity of SRBs can be investigated in terms of sulfate reduction and co-substrate oxidation as sulfate reduction is oxidation reduction reaction, in which sulfate act as electron acceptor, accordingly, a suitable and sufficient electron donors is required for the SRBs activities. CN and LS had a small inhibitory effect on the SRBs activity in terms of sulfate reduction (15.5% and 8.46%, respectively) and TOC utilization (14.3% and 6.3%, respectively). The inhibitory effects of all three nanocomposites were higher than the inhibition caused by CN and LN. Further it was found that the nanocomposite CNLS-S1 (CN:LN=1:1) showed the highest inhibition of 44.53% and 32.34% for sulfate reduction and co-substrate oxidation, respectively, as compare to the other nanocomposites synthesized at different mass ratios. Tus, different inhibitory affects could be due to the different characteristics of the three nanocomposites related to their size, shape and stability. As reported in the earlier section, CNLS-S1 has the smallest hydrodynamic diameter in aqueous suspension as compare to other two nanocomposites. Moreover, the nanocomposite shape is regular, uniform and stable in presence of high salt concentration. So, CNLS-S1 showed the highest inhibition of SRBs activity as compared to CN, LS, CNLS-S2 and CNLS-S3 and was considered as the optimal one for further studies.

c. Impact of Different CNLS-NCs Concentrations on the SRBs Activity

As concentration of 100 µg/mL of CNLS-NCs was inhibitory to both anaerobic organics oxidation and sulphate reduction, it was considered important to investigate whether lower and higher concentrations of synthesized nanocomposite have any effect on microbial metabolism. Batch assays were performed to investigate the effects of CNLS-NCs concentrations from 0 to 500 mg/L. FIG. 22A describes the sulfate reduction profiles in presence of different CNLS-NCs concentrations. The residual sulfate concentration in absence of any NMs decreased form 200 mg/L to 4.52 mg/L with a sulfate reduction efficiency of about 98%. Residual sulfate concentration in presence of 20 mg/L CNLS-NCs was pretty stable and similar to those in the absence of CNLS-NCs in control assay. These results indicated that lower concentration of 20 mg/L of synthesized nanocomposite had no significant inhibitory effects on SRBs activity. Nevertheless, when SRBs consortia was exposed to higher concentration of 50-500 µg/mL CNLS-NCs, the residual sulfate concentrations significantly increased from 4.52 mg/L in control to approximately 174.0 mg/L with increasing CNLS-NCs concentrations to 500 µg/mL. The sulfate reduction efficiency of assays exposed to 150 µg/mL of CNLS-NCs was about 36.0% and in presence of 300 µg/mL was about 14%, which was remarkably lower than that in the control (97.4%). Though, further increase in CNLS-NCs concentration to 500 µg/mL showed almost same sulfate reduction profile as that in presence of 300 µg/mL of CNLS-NCs suggesting that it was the optimal concentration for SRBs inhibition in our experimental set up. FIG. 22B shows the specific sulfate reduction rates (SSRR) at different CNLS-NCs concentrations. A decrease in SSRR was found with increasing CNLS-NCs concentration, as the nanocomposite concentration was increased from 50 to 500 µg/mL, the SSRR decreased from 0.278 to 0.036 g-sulfate/g-VSS*day showing a relative sulfate reduction inhibition of 86.64% as compared to that of control.

Figure 22:
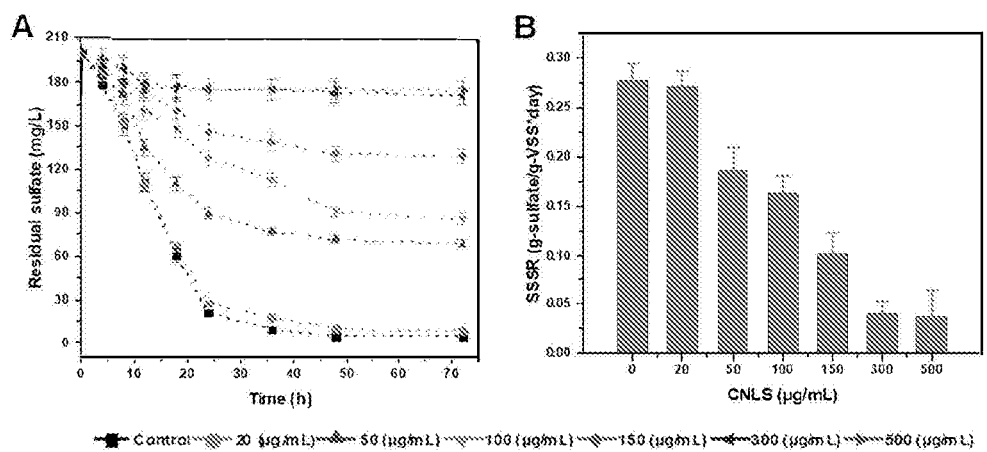
FIG. 22 shows activity of anaerobic SRBs mixed consortia (200 mg·VSS/L) treated with different concentrations of CNLS-NCs (0-500 μg/mL) in inject sea water at 35° C.

FIG. 22 shows activity of anaerobic SRBs mixed consortia (200 mg·VSS/L) treated with different concentrations of CNLS-NCs (0-500 µg/mL) in inject sea water at 35° C. FIG. 22A shows sulfate reduction and FIG. 22B shows relative sulfate reduction inhibition as % age of control at different concentrations of CNLS-NCs nanocomposites. Batch reactor without any nanomaterials was used as control. Error bars represent the standard deviation of three independent experiments.

The sulfate transport takes place because of the concentration gradient of sodium ions and/or protons, and electrical potential across the cell membrane [27]. Dissimilatory sulfate reduction by anaerobic sulfate-reducing bacteria occurs in three steps. Firstly, intracellular sulfate is activated to adenosine phosphosulfate (APS) by the enzyme ATP sulfurylase. The APS-sulfite redox couple has a favorable redox potential ($E0^r$) of −60 mV, which allows APS to reduce to sulfite with the enzyme APS reductase. Finally, sulfite is reduced to sulfide with the enzyme dissimilatory sulfite reductase (DSR) [28]. The influences of CNLS-NCs on the bio-transformations of sulfate to sulfide under the anaerobic sulfidogenic environment were further investigated by analyzing intermediate sulfite and biogenic sulfide production in presence of different concentrations of CNLS-NCs. The results obtained at the end of batch assays are presented in FIG. 23. Sulfite was detected as the intermediates of sulfate reduction. The concentration of sulfite was 1.2 mg/L in control assay, whereas, sulfite concentration gradually increased with increasing CNLS-NCs concentrations and was 10.41 mg/L in presence of highest CNLS-NCs concentration of 500 mg/L. The accumulation of sulfite in presence of higher CNLS-NCs concentrations might be attributed to sulfidogenic oxidation inhibition. In this study, increase in sulfite accumulation which is an intermediate product in sulfate reduction indicated that CNLS-NCs could significantly inhibit sulfite reduction to sulfide.

Figure 23:
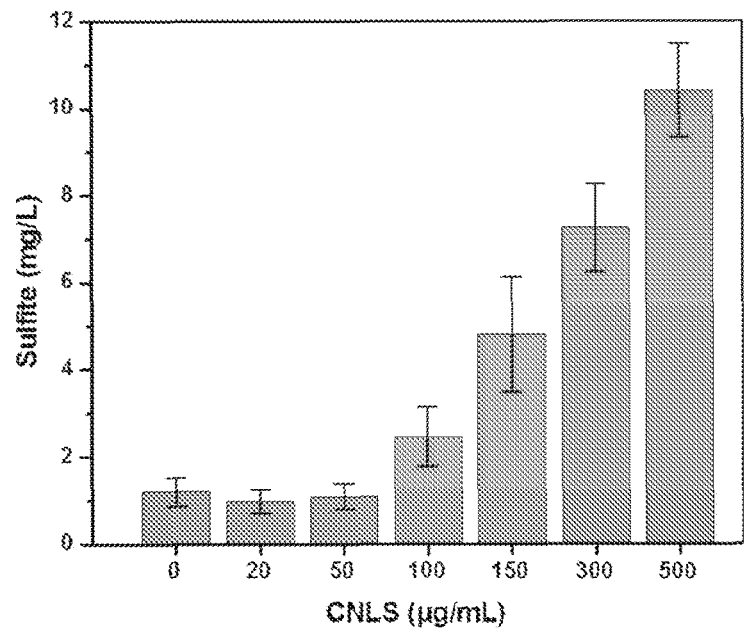
FIG. 23 shows sulfite production form SRBs mixed consortia treated with different concentrations of CNLS-NCs (0-500 μg/mL) in inject sea water at 35° C. Batch reactor without any nanomaterials was used as control. Error bars represent the standard deviation of three independent experiments.

FIG. 23 shows sulfite production form SRBs mixed consortia treated with different concentrations of CNLS-NCs (0-500 µg/mL) in inject sea water at 35° C. Batch reactor without any nanomaterials was used as control. Error bars represent the standard deviation of three independent experiments.

Moreover, it was observed that sulfide production was significantly different to that of control assays where no nanoparticles were presented (FIG. 24). The concentrations of dissolved sulfide also decreased in presence of CNLS-NCs and showed concentration dependent behavior. Total dissolved sulfide concentration was 28.48 mg/L in absence of any CNLS-NCs, and decreased to 8.12 mg/L in presence of 500 mg/L of CNLS-NCs causing a strong inhibition to biogenic sulfide production at higher concentrations of the inhibitor.

FIG. 24 shows sulfide production form SRBs mixed consortia treated with different concentrations of CNLS-NCs (0-500 μg/mL) in inject sea water at 35° C. Batch reactor without any nanomaterials was used as control. Error bars represent the standard deviation of three independent experiments.

FIG. 25 depicts the effects of CNLS-NCs concentration on the pH of the batch assays. The initial pH of the assays was adjusted to 7.5 before spiking CNLS-NCs into the SRBs consortia. pH of the control assay was found to be 8.16 as expected for the biological sulfate-reduction reaction due to production of alkalinity. However, the pH decreased to 7.41 in presence of 500 μg/mL CNLS-NCs. The decrease in the pH values and dissolved sulfide concentrations in presence of NCs indicated that the sulfate-reduction reaction inhibition and eventually lower alkalinity production.

FIG. 25 shows pH profiles in batch assays exposed to different concentrations of CNLS-NCs.

Decrease in sulfide production could be attributed to the accumulation of sulfite during the sulfate reduction process. It is imperative to indicate that no data on application of chitosan/lignin base nanomaterials for SRBs inhibition have been found in the literature to compare with our results obtained in this study.

The presence of appropriate and adequate co-substrate (electron donor) is required for the efficient reduction of sulfate to sulfide. In this study, lactate was used as co-substrate and influence of CNLS-NCs on lactate oxidation was assessed by analyzing TOC. FIG. 26A shows the organics oxidation profiles in presence of different CNLS-NCs concentrations. The initial average TOC concentration of 150 mg/L was reduced to 18.41 mg/L after 192 h of reaction time in the absence of any inhibitor (NCs) as the control assay. The average residual TOC concentrations increased from 23.5 to 87.25 mg/L with increasing CNLS-NCs concentrations from 20 to 500 μg/mL. So, CNLS-NCs showed significant effect on co-substrate oxidation, where, it decreased from 87.72% to 41.83% with increasing CNLS-NCs concentration from 0 to 500 mg/L.

We also investigated the effect of CNLS-NCs on the specific organics utilization rate (SOUR). FIG. 26B shows the SOUR of SRBs consortia in presence of different concentrations of CNLS-NCs. When the NCs concentration was increased from 20 to 500 μg/mL, the SOUR decreased from 0.082 to 0.039 0.036 g-TOC/g-VSS*day giving a relative co-substrate oxidation inhibition of 52.19% as compared to that of control.

Figure 26:
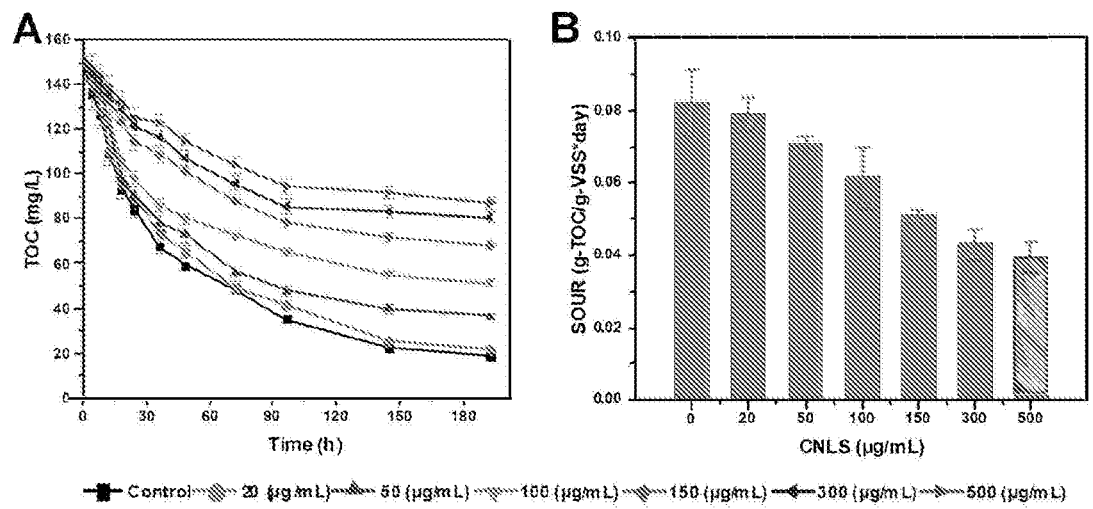
FIG. 26 shows activity of anaerobic SRBs mixed consortia (200 mg·VSS/L) treated with different concentrations of CNLS-NCs (0-500 μg/mL) in inject sea water at 35° C.

FIG. 26 shows activity of anaerobic SRBs mixed consortia (200 mg·VSS/L) treated with different concentrations of CNLS-NCs (0-500 μg/mL) in inject sea water at 35° C. FIG. 26A shows organics oxidation as TOC and FIG. 26B shows specific organics utilization rate (SOUR) profiles during 190 h reaction time. Batch reactor without any nanomaterials was used as control. Error bars represent the standard deviation of three independent experiments.

It is well-known that anaerobic oxidation of organic compounds with mixed microbial consortia can be achieved by a sequence of biochemical reactions. Lactate could be oxidized to intermediate propionic acid, ethanol, acetic acid, and finally to $CO_2$. However, accumulation of propionic acid in biological sulfate reduction process was reported earlier in presence of ZnO-NPs [12] and profiles of co-substrate and its intermediate products in showed that ZnO-NPs could significantly affect co-substrate utilization. Inhibition of intermediate propionic acid was attributed to sulfidogenic oxidation inhibition. So, inhibition of co-substrate utilization in this study could be assigned to the accumulation of intermediate organics compound formed after lactate oxidation. The CNLS-NCs are in suspension and are not expected to contribute in the biochemical reaction. So, it was assumed that the CNLS-NCs may have inhibited the bacteria through physical interaction and/or due to oxidative stress caused by the production of reactive oxygen species. The CNLS-NCs could act as an obstruction that could stop the interaction of the electron donor-acceptor couple to the active bacterial site and/or can inhibit the enzyme activities causing the sulfate reduction.

d. Influence of CNLS-NCs on SRBs Viability and General Physiology

To further evaluate the inhibitory properties of CNLS-NCs on SRBs biomass, multiple probable number (MPN) tests were carried out after 190 h of reaction time for the assays in absence and presence CNLS-NCs to determine the count of viable bacterial cells in the batch assays. The MPN experiments showed that the estimated SRBs counts in the control assay (in absence of NCs) were $2.1 \times 10^8$ per mL. In spite of differences in co-substrate oxidation and sulfate reduction rates, the batch assays exposed to 20, 50, 100 and 150 μg/mL CNLS-NCs had almost similar bacterial growth counts as compared to that of control. However, the assays spiked with higher concentration of 300 and 500 μg/mL CNLS-NCs showed reduction in cell viability, in which, SRBs counts decreased to $1.8 \times 10^7$ and $1.5 \times 10^6$ per nL. This showed that the SRBs consortia exposed up to 150 μg/mL of NCs were not dead but simply deactivated and lost the ability to reduce sulfate. Yet, higher concentrations of NCs resulted in significant viability loss of SRBs consortia. The SRBs-NCs contact in the well-mixed reactors could be responsible for the deactivation of SRBs bacteria as discussed earlier. The results found in this study are in agreement with previously reported data, where metal sulfides [41] and iron nanoparticles [42] showed the similar behavior against SRBs bacteria at lower concentrations.

Cell viability measurement using cultivation-based methods is not an adequate approach as most of the bacteria could be viable-but-not-culturable and therefore a bimolecular method is advantageous for the better understanding of microorganism's cell viability [43]. The direct estimate of SRB culture viability was further investigated utilizing flow cytometry measurements (FCM). Because the mixed culture of SRB used in this study is very diverse, and heterogeneous, the use of flow cytometry offers a promising technique for the analysis of cell viability after exposure to antibacterial materials [44]. In FCM, the term cell viability indicates the cells with intact membranes which are detected using nucleic acids staining dyes retention or exclusion such as propidium iodide (PI) and SYTO 9. The SYTO 9 is a dye capable of staining all cells, whether living or dead, whereas, the PI is capable of staining only dead or damaged/compromised cells. FIG. 27 shows the cytograms of flow cytometric analysis, in which each cell is represented as a function of green fluorescence and red fluorescence on the horizontal and vertical axis, respectively. Due to activation of energy transfer phenomenon in presence of SYTO 9 and PI in dead cells, the PI fluorescent emission spectrum absorbs the spectrum of SYTO 9 and thus only PI spectrum is visible. Consequently, viable cells with green fluorescence can be clearly distinguished from dead ones with red fluorescence (FIG. 27(a)). In compromised cells, both green and red fluorescence are emitted and a third region can be distinguished in the flow cytometry plots (labeled as black color). In the analysis of the experimental data, both cells in red and compromised regions were considered as inactive and inhibited cells which were not able to grow after exposure to synthesized nanocomposites. FIG. 27(a)(i) and FIG. 27(b)(i) show the dot plots and histogram of control SRB culture which shows initial culture was composed of about 92% of viable cells and 3% of dead cells, whereas 4% of the cells were of compromised status. For the assay exposed to highest concentration of 500 µg/mL CNLS-NCs, cells viability decreased to 24%. This decrease in viability did not correspond to an equivalent increase in dead cells, which reached only to 12.7%. The decrease in cell viability was balanced by the increase in compromised and/or damaged cells to 62%. These results indicated that most of the cells were not dead but severely damaged and lost their ability to reduce sulfate and utilize organic substrate as discussed earlier.

FIG. 27 shows red and green fluorescence and forward light scattering distributions of SRB culture before and after exposure to CNLS-NCs. FIG. 27(a) shows dot plots of green versus red fluorescence of bacterial culture exposed to (i) 0 µg/mL (ii) 300 µg/mL and (iii) 500 µg/mL of CNLS-NCs. FIG. 27(b) shows green fluorescence histograms of viable and dead cells of bacterial culture exposed to (i) 0 µg/mL (ii) 300 µg/mL and (iii) 500 µg/mL of CNLS-NCs.

Scanning electron microscopy (SEM) analysis was used to find the impact of CNLS-NCs on SRB cells morphology before and after exposure to CNLS-NCs. SRB cells were intact, smooth and viable in absence of nanocomposites (control assay, FIG. 28(A)), whereas, in presence of CNLS-NCs large numbers of cells were aggregated and suffered from a prevalent surface damage (FIG. 28(B)). Some bacterial cells still maintained the membrane integrity, but they were deformed.

Figure 28:
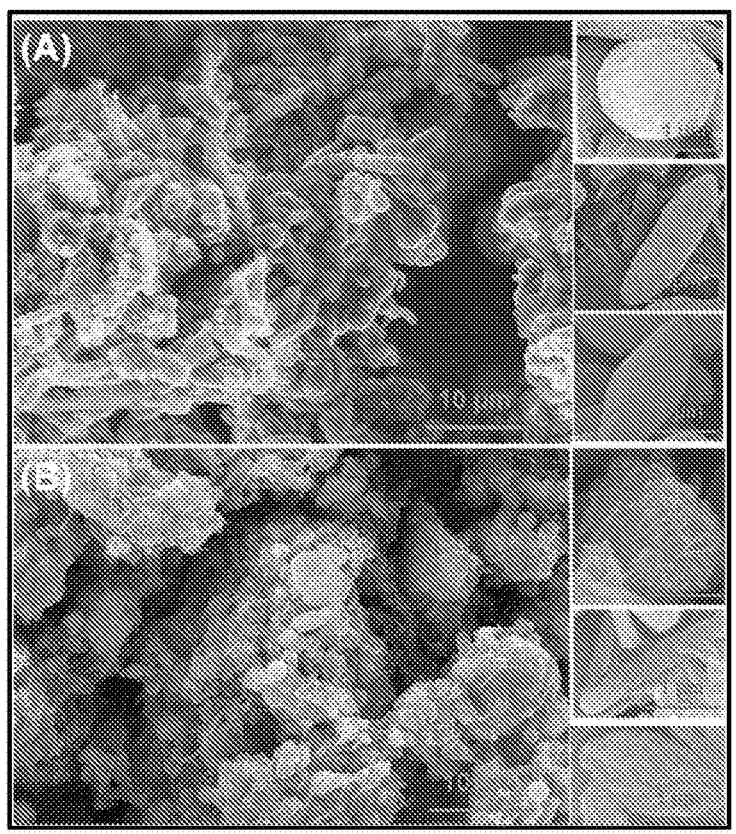
FIG. 28 shows scanning electron microscopy (SEM) analysis to find the impact of CNLS-NCs on SRB cells morphology before and after exposure to CNLS-NCs. SRB cells were intact, smooth and viable in absence of nanocomposites.

FIG. 28 shows SEM images of SRB sludge at lower and higher magnifications FIG. 28(A) control and FIG. 28(B) exposed to 500 µg/mL CNLS.

To confirm this SEM analysis, LDH release assay was performed (which is an indicator of cell membrane damage) to determine the SRB cells surface integrity. LDH assay showed that no measurable cytoplasmic leakage occurred after exposure to CNLS-NCs concentration up to 100 µg/mL (FIG. 29) confirming that the surface of SRBs consortia was intact. Nonetheless, higher CNL-NCs concentrations resulted in significant cytoplasmic leakage and the results are in line with the SRBs viability studies by MPN method. The toxicity of several nanoparticles has been assigned to ROS dependent or independent oxidative stress induced by NPs [45]. Another possible explanation of nanomaterials toxicity in addition to oxidative stress is cell membrane damage. In this study, the exposure of SRBs consortia to 500 µg/mL CNLS-NCs considerably increased the extracellular LDH to 265.5% as compared to that of control which indicates a substantial cytoplasmic leakage outside the cells.

Figure 29:
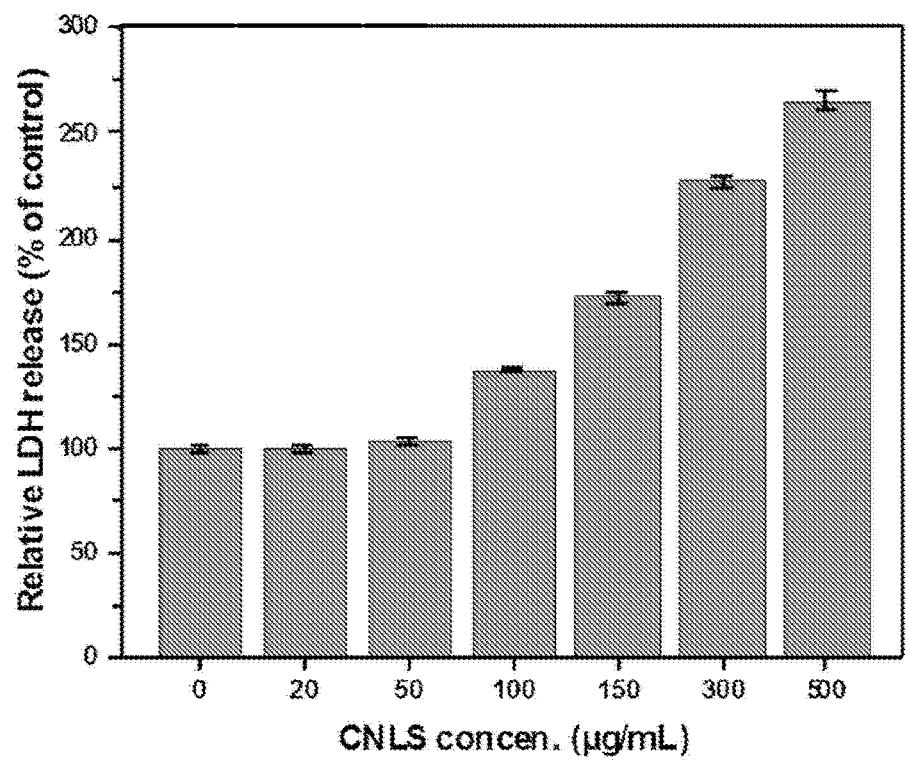
FIG. 29 shows Lactate dehydrogenase release from SRBs sludge biomass exposed to different concentrations of CNLS-NCs after 168 h of reaction time. Batch reactor without any nanomaterials was used as control. Error bars represent the standard deviation of three independent experiments.

FIG. 29 shows Lactate dehydrogenase release from SRBs sludge biomass exposed to different concentrations of CNLS-NCs after 168 h of reaction time. Batch reactor without any nanomaterials was used as control. Error bars represent the standard deviation of three independent experiments.

Formation of biofilm by SRBs may act as a survival strategy in a toxic and nutritionally deficit environment. Extracellular polymeric substances (EPS) are typically reported to keep microorganisms together in biofilm complex structure. In this study, we investigated the impact of CNLS-NCs on the different constituents of EPS secreted by SRBs consortia and results are given in Table 4. The protein contents of the SRBs consortia after exposure to 500 µg/mL CNLS-NCs was decreased from 3.37 to 1.93 mg/g-VSS, whereas the amount of carbohydrates after exposure to CNLS-NCs did not show significant differences as compared to that of control. Exposure of CNLS-NCs also affected the concentrations of humic substances and lipids which was 2.12 mg/g-VSS and 0.256 mg/g-VSS, respectively, in absence of NCs. However, in presence of 500 µg/mL CNLS-NCs, the contents of both constituents decreased to 1.12 mg/g-VSS and 0.189 mg/g-VSS, respectively. In biofilm formation, proteins are carbon and energy source, whereas, polysaccharides are capable of both adhesion and cohesion interactions. The impact of different nanoparticles on different constituents of EPS of diverse bacterial communities has been investigated (Ref). Nevertheless, to date, only a few studies have provided actual information on impact of nanoparticles on SRBs biofilm formation, EPS production, and cell growth inhibition. Additionally, there is no data available on the use of chitosan/lignin nanocomposite as a biocide to inhibit SRBs activity and impact of NCs on EPS contents. Higher inhibitory effects of CNLS-NCs can be attributed to the nano size together with the presence of large number of amino groups which make the NCs hydrophilic and bio-adhesive binding readily to negatively charge bacterial cell surfaces leading to membrane disruption and cell death.

According to the above investigations, CNLS-NCs caused the significant inhibition to biological sulfate reduction and organics oxidation and inhibitory affects were dependent on concentration of the NCs. The inhibition of SRBs activity occurred due to the accumulation of sulfite during sulfate reduction and serious inhibition of co-substrate utilization. The SRBs inhibitory effect was because of the decrease in cell viability, serious cytoplasmic leakage and loss of cell integrity and EPS contents.

TABLE 4

Measurements of extracellular polymeric substances (EPS) extracted form SRBs biofilm treated with different concentrations of CNLS-NCs (0-500 µg/mL) in inject sea water at 35° C. after 168 hr of reaction time.

| CNLS-NCS (µg/mL) | Carbohydrates (mg/g) | Proteins (mg/g) | Humic substances (mg/g) | Lipids (mg/g) |
| --- | --- | --- | --- | --- |
| 0 | 53.8 | 3.37 | 2.12 | 0.256 |
| 20 | 53.21 | 3.36 | 2.12 | 0.251 |
| 50 | 50.26 | 3.25 | 1.95 | 0.234 |
| 100 | 47.37 | 2.62 | 1.54 | 0.218 |
| 150 | 45.94 | 2.21 | 1.378 | 0.207 |
| 300 | 44.38 | 1.94 | 1.12 | 0.197 |
| 500 | 43.32 | 1.93 | 1.07 | 0.189 |

3.5 Acutoxicity Results: Impact of Chitosan/Lignin CNLS-NCs Exposure on Embryo Survival.

We investigated the acute toxicology of the cross linked CNLS-NCs and the non-cross linked CN, LS nanoparticles according to the acute toxicity assay adapted from the Organization for Economic Co-operation and Development (OECD) guideline for testing chemical toxicity (No 203 and 236). The tested concentrations (0, 25, 50, 100, 150, 200, 250) that we selected in this study have significant environmental relevance. That is, these concentrations were chosen to be parallel and within the testing scale of the Fish and Wildlife Service Acute Toxicity $R_{ct}$ ting Scale, which classified compound's toxicity according to $LC_{50}$ as follow: highly toxic from 0.1-1.0 mg/L, 1.0-10 mg/L moderately toxic, 10-100 mg/L slightly toxic, 100-1000 mg/L practically nontoxic, and >1000 mg/L is relatively harmless. In our study, the $LC_{50}$, was basically calculated by fitting sigmoidal curve to mortality results using the following equation, $y=Bot+(Top-Bot)/[1+10 \char`\^\{k*(X0-Log(C))\}]$. Bot, minimum mortality; Top, maximum mortality; k, curve slope; X0 and $LC_{50}$ were estimated from the mortality curve (FIG. 30D). The $LC_{50}$ for the positive control DEAB was 2.5 µM, and for the CNLS-NCs was 103.3 mg/L. However, for CN, LS, the $LC_{50}$ was much higher than the CNLS-NCs (584.8 mg/L). Thus, according to the Fish and Wildlife Service Acute Toxicity $R_{ct}$ ting Scale, both nanoparticles can be classified as "practically not toxic".

At 72-hpf, the NOEC (the concentration where >80% of the embryos survived and did not show deformities) for the CNLS-NCs was between 50-100 mg/L (FIG. 30C). At 50 mg/L CNLS-NCs, no significant sign of body deformities was recorded (similar to negative control, FIG. 30B)]. However, 100 mg/L concentration of CNLS-NCs, 24% were dead and 19% of the embryos started to show deformities, such as yolk and heart edema found in the DEAB positive control (FIG. 30B). On the other hand, for CN, LS, the NOEC was higher than CNLS-NCs, between 150-200 mg/L. It is noteworthy that at high concentrations of both CNLS-NCs (>150 mg/L) and CN, LS (>250 mg/L), around 10% of the embryos become hyperactive, a teratogenic phenotype associated chitosan nanoparticles that we had observed in previous study. The lower NOEC and $LC_{50}$ demonstrated by the CN, LS over the CNLS-NCs could be due to many reasons. Dechorionated embryo can uptake up to nanoparticles with size 50 nm or less by skin and up to 700 nm by only oral digestion. Thus at 72-hpf, the only way that nanoparticles to enter the body of the dechorionated embryos is by their permeable skin, because their oral cavities did not open until 96-hpf (Ref) The CNLS-NCs formed compact that is smaller (~40 nm) and able to disperse in aqueous media better than the none cross linked CN, LS. Therefore, CNLS-NCs were able to penetrate the skin of the embryos and causing more toxicity than CN, LS. We have shown previously that chitosan and other chitosan derivatives such as chitosan zinc oxide are ecofriendly nanoparticles. However, at high concentrations, these nanoparticles has potential organ-specific toxicity. Similarly, it would be interested to study the potential organ and cellular toxicity mechanisms of CNLS-NCs excreted after long time exposure and at higher concentrations.

Figure 30:
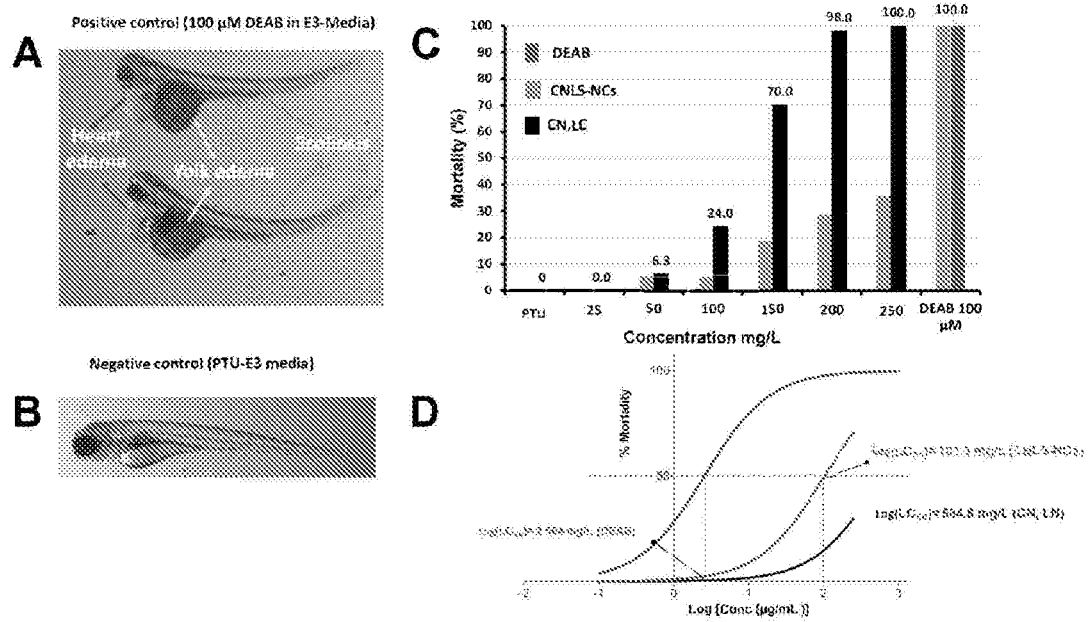
FIG. 30 shows representative pictures (72-hpf) of acute toxicity experiments of embryos exposed to (A) 100 μDEAB as positive control, and (B) negative control PTU-E3 media alone Note the normal embryo in the negative control versus the deformed embryos in the positive control (small size, yolk, cardiac edema, and scoliosis (C) Acute toxicity and survival rate of embryos exposed at different concentrations of DEAB, CNLS-NCs and CN, LS. (D) Mortality response curve. 50 embryos were used in each concentration, n=50.

FIG. 30 shows representative pictures (72-hpf) of acute toxicity experiments of embryos exposed to (FIG. 30A) 100 µDEAB as positive control, and (FIG. 30B) negative control PTU-E3 media alone Note the normal embryo in the negative control versus the deformed embryos in the positive control (small size, yolk, cardiac edema, and scoliosis (FIG. 30C) Acute toxicity and survival rate of embryos exposed at different concentrations of DEAB, CNLS-NCs and CN,LS. (FIG. 30D) Mortality response curve. 50 embryos were used in each concentration, n=50.

Conclusion

We have developed an eco-friendly and biodegradable chitosan/lignin (CNLS-NCs) based nanocomposite by an innovative, simple and one step synthesis method. Chitosan and lignin formed compact nano complexes after adding cross linker with an overall positive surface charge of 34 mV as measured by zeta potential. Spherical CNLS-NCs were synthesized with an average size of 40 nm and applied to inhibit the SRBs induced biofilm growth in inject sea water. CNLS-NCs showed stable behavior in inject water at higher concentrations and depicted excellent inhibitory affects to sulfate reduction and organics oxidation. This work demonstrated that synthesized nanocomposite with significant antibacterial efficacy is a potential biocide for the inhibition of biofilm growth.

Example 3

Controlling the Biocorrosion of Sulfate-Reducing Bacteria (SRB) on Carbon Steel using ZnO/Chitosan Nanocomposite as an Eco-Friendly Biocide Abstract In this report, interlinked chitosan-ZnO nanocomposite at 10% ZnO (CZNC-10) is successfully used as green biocide for biofilm control and reduction of biocorrosion on steel transport systems. It was found that 250 µg/mL CZNC-10 can be used efficiently for the inhibition of sulfate reducing bacteria (SRB) biofilm on carbon steel. The $R_{ct}$ values after 21 and 28 days of incubation in presence of CZNC-10 are almost 3.2 and 2.8 times higher than the control respectively, indicating a strong corrosion inhibition with 74% maximum inhibition efficiency.

1. Introduction

Steel is widely utilized material for building platforms and transport systems in oil/gas sector. Despite the abundance and economic value, the largest capital loss in oil/gas operations is resulting from steel corrosion. About 20% of the annual corrosion damages of metals may be induced by microbial influenced corrosion (MIC) in anaerobic environments. MIC is a process influenced by various microorganisms, which drives the corrosion kinetics under anaerobic conditions, causing various environmental and economic problems including reservoir souring, oil contamination, and pipeline failure. MIC occurs beneath the accumulated biofilm in the pipelines through several mechanisms, such as cathodic depolarization, concentration and galvanic cell formation, and direct electron transfer.

Among several types of bacteria responsible for this type of corrosion, sulfate reducing bacteria (SRB), are the main microorganisms that can anaerobically generate sulfide species causing progressive biocorrosion beneath the formed biofilms. The most known SRB strains are *Desulfovibrio* and *Desulfotomaculum*, which can survive a wide range of pH (4-8), temperature (10-40° C.) and pressure (up to 507 bar). The biogenic oxidation/reduction reactions in these bacterial strains produce corrosive agents such as hydrogen sulfides ($H_2S$), metal sulfates and sulfides. Particularly, production of $H_2S$ gas in high concentrations establishes intrinsic heterogeneity, which can favor the electrochemical reactions that lead to critical localized corrosion processes. Additionally, the presence of SRB poses health and safety risks to workers due to uncontrolled production of toxins including sulfides.

High concentrations of biocides are used in oil/gas industries to disinfect water and inhibit excessive biofilm formation caused mainly by SRB. However, traditional biocides, usually, suffer from low efficiency against biofilms, high operational cost, and adverse environmental impact due to releasing of disinfectant by-products. The use of green biocides have been proposed to overcome these issues due to lower toxicity, environmental acceptability, safety and ease of use. Several nanomaterials have been utilized to inhibit the growth of different microorganisms that could be used as possible alternatives for traditional biocides. Zinc oxide nanoparticles (ZnO NPs) have been proposed as an efficient antibacterial agent in several applications. However, their biological toxicity and environmental impact have limited their practical use. In order to resolve this, the NPs are combined with some antimicrobial polymers to reduce the cytotoxicity as well as to improve their stability and efficiency without affecting their functional properties. In our previous work, it is revealed that interlinked chitosan-ZnO NPs nanocomposite can be used as a very efficient biocide for mixed SRBs culture in concentration-dependent manner with minimal impact on the environment and marine biota.

In the current work, we studied the application of interlinked chitosan-ZnO NPs at 10% initial ZnO loading (CZNC-10) as a SRB biocorrosion inhibition system for S150 carbon steel in simulated inject seawater. The nature, kinetics, and morphology of the biocorrosion are fully investigated using the electrochemical impedance spectroscopy (EIS), X-ray photoelectron spectroscopy (XPS), optical profilometry, transmission electron microscopy (TEM), and scanning electron microscopy (SEM) and energy dispersive X-ray spectroscopy (EDS).

2. Materials and Methods 2.1. Materials

Carbon steel (S150) bars of 8 mm diameter were purchased from local market, Qatar. The chemical composition of carbon steel (S150) is (wt. %) 0.13% C, 0.31% Si, 1.51% Mn, 0.24% Cr, 0.31% Mo, 2.84% Ni, 1.03% Cu, 0.95% Al and balance Fe. PhenoCure™ (phenolic thermosetting resin) compression mounting compound was purchased from Buehler, Illinois Low molecular weight chitosan with 85% degree of deacetylation, $MgSO_4$, sodium citrate, $CaSO_4$, $NH_4Cl$, NaCl, $Na_2SO_4$, KCl, $SrCl_2$, KBr, $K_2HPO_4$, sodium lactate and yeast extract were purchased from Sigma-Aldrich. Zinc nitrate (hexahydrate), trypolyphosphate (TPP), sodium hydroxide (NaOH) were obtained from Fisher Scientific. All chemicals were analytical grades and were used without further purification.

2.2. Synthesis of CZNC-10 Nanocomposite

ZnO NPs/chitosan NPs (Ch NPs) (CZNC-10) were synthesized as described elsewhere with a slight modification. Briefly, Ch NPs were prepared by coagulation of chitosan (0.1%) aqueous solution in 1% (w/w) acetic acid by 0.5 μg/mL trypolyphosphate (TPP). TPP solution was added dropwise to the chitosan solution and pH was kept at 5.5. The ZnO NPs were synthesized by wet chemical method using zinc nitrate and NaOH as precursors under constant stirring for 2 h in presence of soluble starch as a stabilizing agent. The obtained white suspension was dried at 80° C. overnight to convert $Zn(OH)_2$ into ZnO NPs. Final CZNCs nanocomposite was prepared by mixing 10% (w/w) ZnO NPs in Ch NPs suspension followed by ultra-sonication for 20 min. After sonication, the homogeneous suspension was purified by centrifugation and pellets were washed three times with deionized (DI) water. Finally, the pellets were freeze-dried and the obtained powder was used for the subsequent experiments.

2.3. Coupons Preparation

Figure 40:
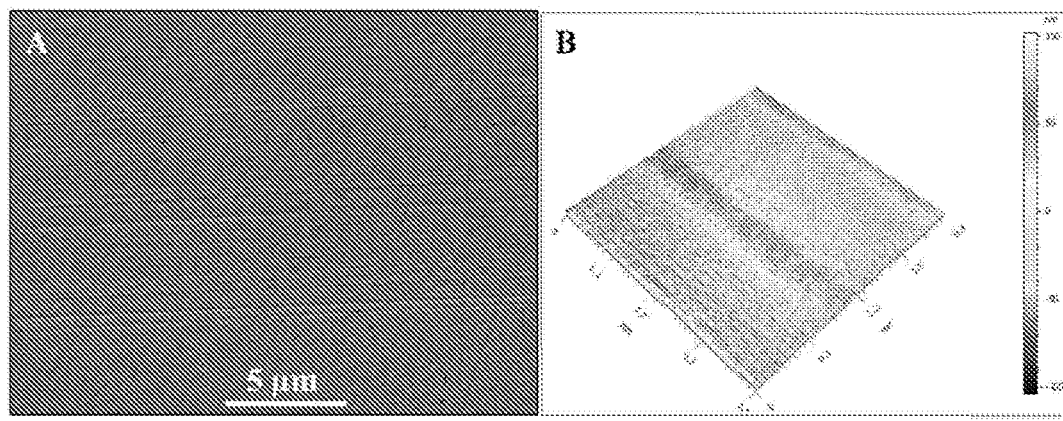
FIG. 40 show SEM image (FIG. 40A) and 3D Profilometry image (FIG. 40B) of the bare coupon surface.

The working coupons were cut from a steel bar in 8 mm diameter and 10 mm height and were hot mounted using PhenoCure compression mounting compound (SimpliMet 1000 Automatic Mounting Press, Buehler, Illinois). Coupons were polished using an automated polishing machine (EcoMet 250 Grinder Polisher, Buehler, Illinois, USA). First, the coupons were ground sequentially with up to 1200 grit silicon carbide paper to obtain a smooth surface. Finally, the coupons were polished to a mirror finish with 6 and 3 μm silica suspensions. The attachment of bacterial cell on a substrate is usually affected by the surface roughness of the substrate material. The smooth surface is visible in the SEM micrograph of the polished bare coupon (FIG. 40A). The 3D profilometry image of the polished bare coupon is shown in FIG. 40B. The average surface roughness (Sa) is 16.76±2.4 nm which was consistent across the polished coupon. Prior to testing, coupons were cleaned with acetone followed by sterilization via immersion in absolute ethanol and then dried and kept desiccated.

2.4. SRB Culture

SRB culture was enriched from sludge biomass (obtained from Al-Shaheen offshore oil filed, Qatar) using Postage's C medium (Postgate, 1984) in simulated inject seawater as described earlier. The pH of the medium was adjusted to approximately 7.5 with 1 N NaOH solution and was heat-sterilized at 15 psi and 120° C. for 20 min. Before inoculation, high purity nitrogen gas was purged through the medium to maintain anaerobic conditions. The bacterial culture was incubated in 1 L bottles at 35° C. on a rotary shaker at 110 rpm and was further sub-cultured every week under anaerobic conditions. After 6 months of incubation, an active mixed culture of SRB was obtained and used for further biocorrosion inhibition studies. The concentration of SRB biomass in the culture media was measured in terms of volatile suspended solids (VSS).

2.5. Coupons Incubations with SRB Culture

SRB corrosion inhibition experiment was conducted by incubating the coupons in liquid medium containing enriched SRB biomass (250 mg·VSS/L) along with ATCC Medium 1249 (Modified Baar's Medium for Sulfate Reducers) in simulated inject seawater. Table 6 shows the composition of the injected seawater. Samples were incubated with and without the inhibitors (CZNC-10) at different concentrations in a sealed glass container after purging with nitrogen gas for 30 min to remove oxygen and keep in a shaking incubator at 37° C. for different time intervals. The corrosion inhibition experiments were performed using different concentrations of CZNC-10 and ChNPs as biocides. Coupon samples were drawn from the incubation media after definite time intervals and gently washed with DI water prior to each electrochemical and/or spectroscopic analysis.

TABLE 6

Composition of simulated seawater

| Chemical ion | Concentration (mg/L) | Part of salinity (%) |
|---|---|---|
| Chloride $Cl^-$ | 19345 | 55.03 |
| Sodium $Na^+$ | 10752 | 30.59 |
| Sulfate $SO_4^{-2}$ | 2701 | 7.68 |
| Magnesium $Mg^{+2}$ | 1295 | 3.68 |
| Calcium $Ca^{+2}$ | 416 | 1.18 |
| Potassium $K^{+1}$ | 390 | 1.11 |
| Bicarbonate $HCO3^{-1}$ | 145 | 0.41 |
| Bromide $Br^-$ | 66 | 0.19 |
| Borate $BO_3^-$ | 27 | 0.08 |
| Strontium $Sr^{+2}$ | 13 | 0.04 |
| Fluoride $F^-$ | 1 | 0.003 |

2.6. Characterization

The synthesized CZNC-10 was characterized by SEM coupled with an EDS unit) and TEM. The SEM and EDS analysis were carried out using FEI Quanta 650 FEG SEM, after sputtering the samples with gold (3 nm). TEM was carried out by FEI Talos 200X TEM after mounting the dispersed aqueous solution on a lacey carbon Formvar coated Cu grid. For biofilm analysis by SEM and XPS, the recovered coupons from the SRB enriched media were fixed with 2% glutaraldehyde solution for 30 min. Then the coupons were washed with DI water, followed by dehydration with 25, 50, 75, 90, and 100% ethanol (vol %) successively for 10 min each. The coupons were then kept dried under nitrogen prior to the SEM and XPS analysis. XPS analysis of given samples was performed with ESCALAB 250X (Thermo Fisher Scientific) using AlKα excitation radiation (25 W, hv=1486.5 eV) and 1 eV energy resolution. For profilometry analysis, the biofilm and corrosion products were removed by sonicating the coupon in ethanol three times (10 s each) followed by sonication in a solution containing 5 mL/L HCl (37%) and 3.5 g/L hexamethylene tetramine for 5 min and finally washing with DI water. In addition to the bare coupon, four sets of coupons were analyzed; after 7 days and 28 days of incubation in SRB enriched media without and with 250 µg/mL CZNC-10. Surface profile images were obtained using KLA-Tencor P17 stylus profilometer. Three measurements were performed on three different locations on each coupon. The instrument has a lateral resolution of 2 µm and vertical resolution of about 1 nm. For each location measured, a total area of 400×400 µm was scanned. The data was then processed using Apex3d-7 software to create a surface profile and calculate the average surface roughness ($S_a$) for each sample.

2.7. Electrochemical Studies

Figure 41:
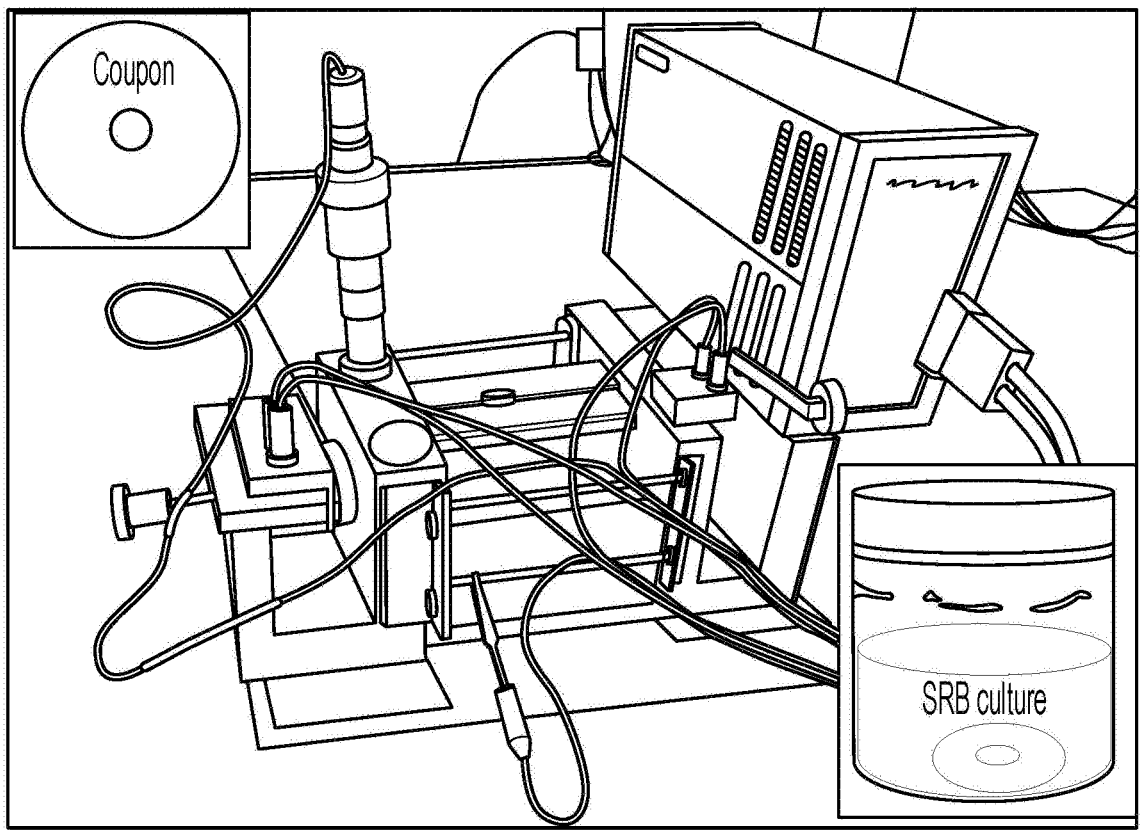
FIG. 41 shows the photo of the experimental set up used for the corrosion studies. Inset shows the photo of hot mount coupon and SRB culture used for the experiments.

EIS analysis was carried out using Gamry potentiostat (Gamry 600+, PA, USA) using the SRB treated carbon steel coupon as a working electrode, calomel and graphite disk electrodes as reference and counter electrodes, respectively. The photo of the experimental setup and the hot mount coupon used for the corrosion studies are shown in FIG. 41. After different exposure times, the S150 hot mounted coupons were removed from the immersion solutions, and mounted into Gamry flow cell for the electrochemical measurements. The electrolyte used for the analysis was simulated inject seawater. The EIS measurements were recorded at an open circuit potential with a 10 mV sinusoidal signal over the frequency range of 0.01-105 Hz. The experimental results were analyzed by Gamry Echem Analyst software version 7.05. Before the EIS measurements, steady state conditions were achieved by keeping the whole setup at open circuit potential (OCP) for 30 min.

3. Results and Discussion

3.1. CZNC-10 Composite Morphology

Figure 31:
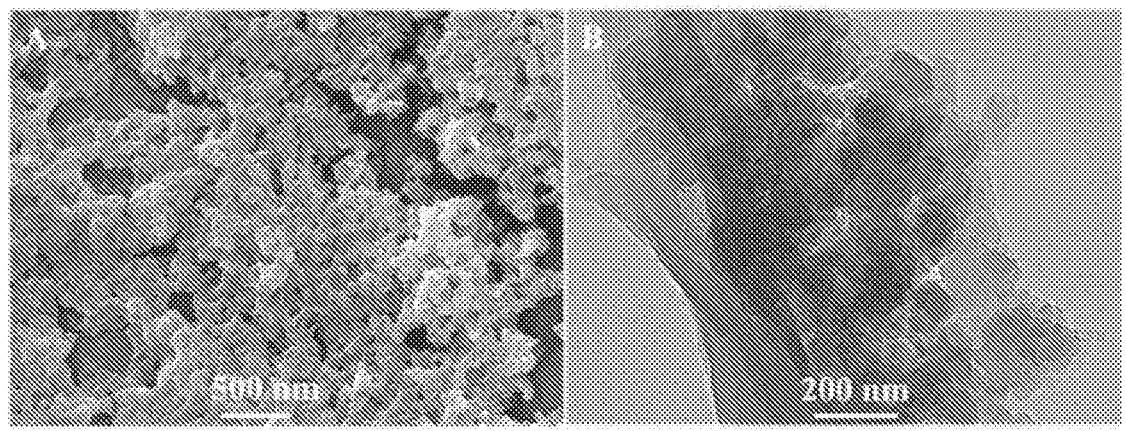
FIG. 31 shows SEM (FIG. 31A) and TEM (FIG. 30B) micrographs of CZNC-10 nanocomposite.
Figure 42:
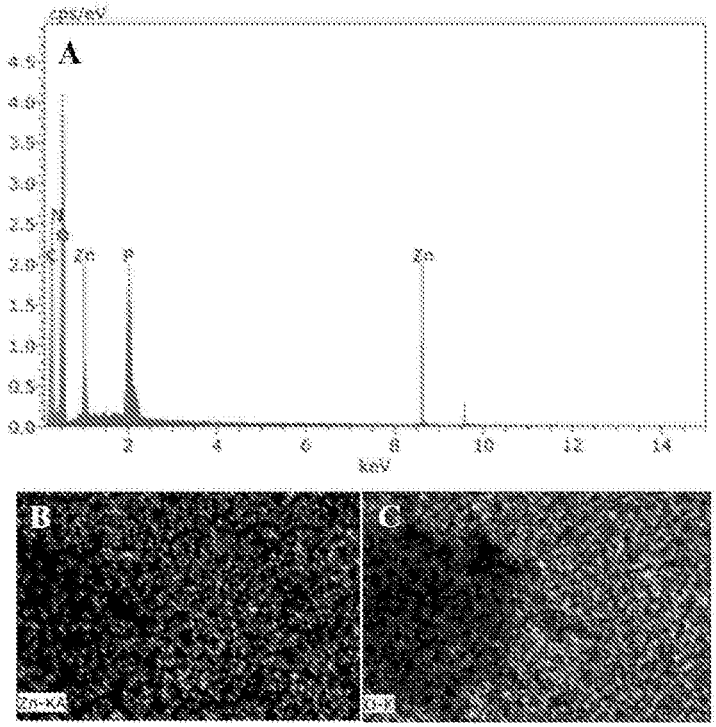
FIG. 42 shows EDS data (FIG. 42A) of the CZNC-10. The elemental mapping of Zn and O elements are given in (FIG. 42B) and (FIG. 42C).

The SEM and TEM micrographs of the as prepared CZNC-10 are shown in FIG. 31. From the images, the shape of the particles is almost spherical and the average size is in the range of 100-150 nm. The EDS analysis confirmed the presence of Zn, O, C and N as an evidence of CZNC-10 composition, and the elemental mapping of Zn clearly shows the uniform distribution of ZnO NPs the nanocomposite (FIG. 42). In addition, it was evident from our previous study that CZNC-10 was stable in colloidal suspensions as well as in inject seawater by measuring the zeta potential (+29 mV) and by monitoring the average hydrodynamic diameter in simulated inject seawater respectively.

FIG. 31 shows SEM (FIG. 31A) and TEM (FIG. 31B) micrographs of CZNC-10 nanocomposite.

3.2. Coupon Surface Characterization

Figure 32:
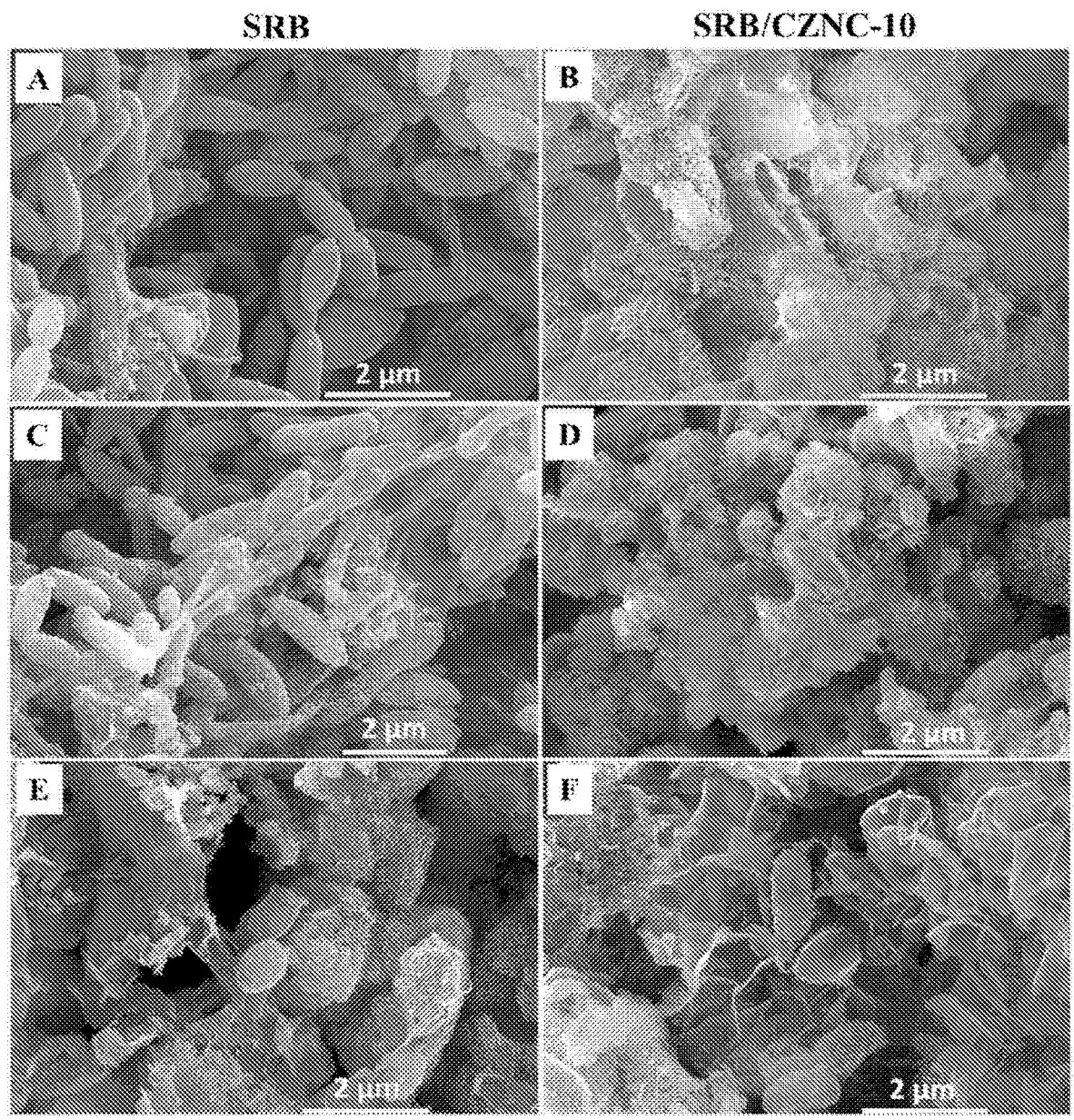
FIG. 32 shows SEM micrographs of the biofilm incubated in SRB media after 4 days (FIG. 32A and FIG. 32B), 7 days (FIG. 32C and FIG. 32D) and 28 days (FIG. 32E and FIG. 32F) of incubation in the absence (FIG. 32A, FIG. 32C and FIG. 32E) and presence (FIG. 32B, FIG. 32D and FIG. 32F) of 250 μg/mL of the CZNC-10 inhibitor.

The effect of CZNC-10 nanocomposite on SRB activity and biofilm formation as well as corrosion products formation on carbon steel coupons was investigated by SEM, EDS, and XPS. A 250 µg/mL CZNC-10 is used to evaluate effect of CZNC-10 nanocomposite on SRB biofilm formation as it is found to be the optimum concentration as will be shown in the electrochemical characterization section (Section 3.4.). It is worth noting that SRBs are known to produce exopolysaccharides (EPS) during biofilm formation, which helps the adhesion of bacterial cells to the surface and is one of the vital factors causing biocorrosion. The structural characteristics of biofilm formation on the coupons in SRB inoculated media, after 4, 7, and 28 days of incubation in the absence and presence of CZNC-10 are analyzed by SEM as shown in FIG. 32. During the initial growth phase, bacteria is observed with a predominance of the rod-like morphotype. After 4 days incubation in SRB media, bacterial cells start to metabolize and produce small proportions of EPS which can easily adhere to the metal surface to form a film that can be seen in the SEM image (FIG. 32A).

FIG. 32 shows SEM micrographs of the biofilm incubated in SRB media after 4 days (FIG. 32A and FIG. 32B), 7 days (FIG. 32C and FIG. 32D) and 28 days (FIG. 32E and FIG. 32F) of incubation in the absence (FIG. 32A, FIG. 32C and FIG. 32E) and presence (FIG. 32B, FIG. 32D and FIG. 32F) of 250 µg/mL of the CZNC-10 inhibitor.

This indicates that the carbon steel coupon is susceptible to bacterial adhesion and biofilm formation, which can happen readily upon contact with SRB. Therefore, number of active bacteria that adhere onto coupon surface increases with observed heterogeneous, porous, and three-dimensional biofilm. In presence of CZNC-10 as an inhibitor for SRB after 4 days of incubation, a layer of biofilm was also formed on the coupon surface but with an obvious damage of the bacterial cells (FIG. 32B). The bacterial damage can be attributed to the bactericidal activity of the CZNC-10 against SRB.

After 7 days of incubation in SRB media, numerous healthy SRB cells were still observed either individually or in small-size clusters on the coupon surface with increasing amount of extracellular polymeric substance (EPS) (FIG. 32C). However, in presence of CZNC-10 with the biotic media, the number of healthy SRB cells on the coupon is significantly reduced with obvious deformation on the surface of the individual cells (FIG. 32D). This can be due to the efficient inhibitory effect of the CZNC-10, which renders SRB more vulnerable to damage. Similar observations were reported on the effect of other nanomaterials on bacterial communities. By extending the exposure time to 28 days, both coupons exposed to SRB in presence and absence of CZNC-10 showed somewhat similar morphology with a heterogeneous and uneven deposits of corrosion products along with more complicated porous structure of biofilm and EPS are seen on the coupon surface alone (FIG. 32E and FIG. 32F). Therefore, further quantitative analysis is required to differentiate the corrosion products and film morphology after 28 days. Although traces of CZNC-10 do present in FIGS. 32B, 32D and 32F however it could not be distinguished due to the small size and low concentration of CZNC-10 as compared with bacteria and EPS constituents.

Figure 43:
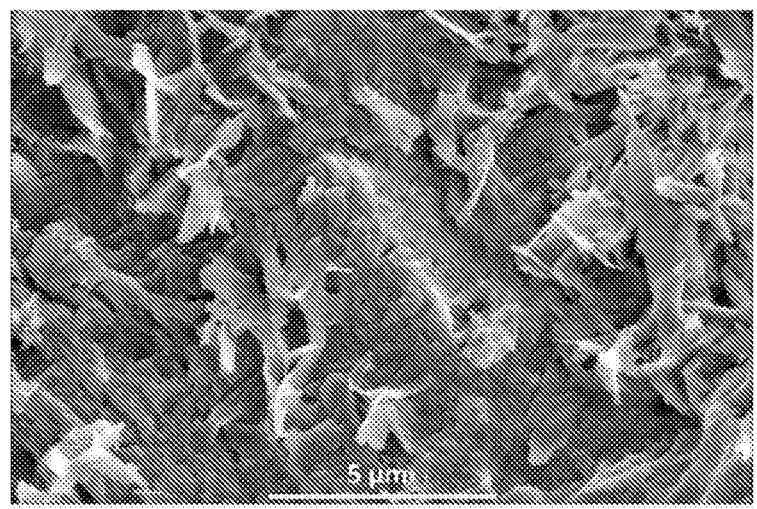
FIG. 43 shows the SEM image after 28 days of incubation of a coupon in the abiotic media in absence of SRB or CZNC-10.
Figure 44:
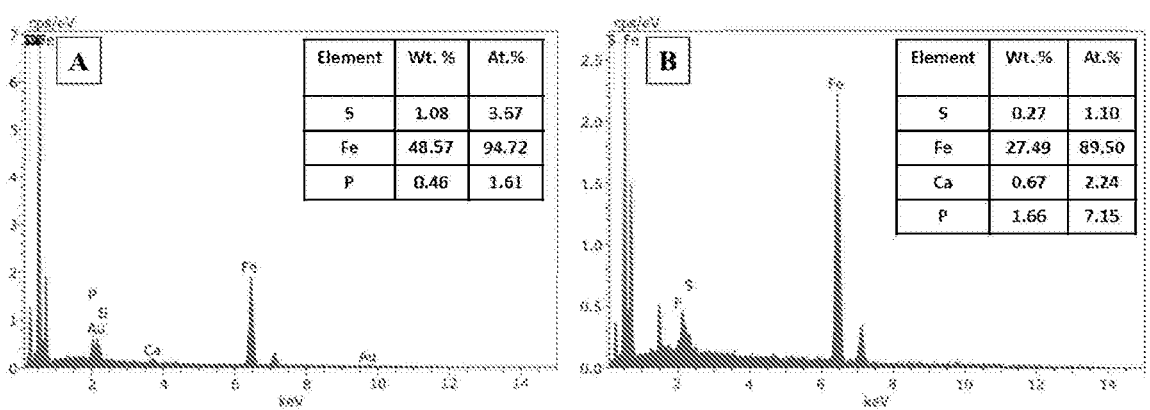
FIG. 44 shows EDS analysis of biofilm after 28 days of incubation.

The SEM image of the coupon immersed in the abiotic media without SRB and CZNC-10 is shown in (FIG. 43). In abiotic condition, the morphology of the corrosion film is entirely different as compared with biotic corrosion. The coupon surface is covered with a layered structure along with deposited corrosion products as a result of chemical corrosion. According to the semi-quantitative EDS analysis of the biofilm after 28 days incubation (FIG. 44), sulfur content was reduced by approximately 70% in the presence of CZNC-10 inhibitor, which confirms the inhibition in the SRB activity. No Sulfur element was detected in the abiotic sample (data no shown). Sulfur content in the film is strong evidence of SRB activities of sulfate reduction. EDS analysis are performed to quantify the sulfur and iron content. According to the semi-quantitative EDS analysis of the biofilm after 28 days incubation (FIG. 44), sulfur content was reduced by approximately 70% in the presence of CZNC-10 inhibitor, which confirms the inhibition in the SRB activity.

Figure 33:
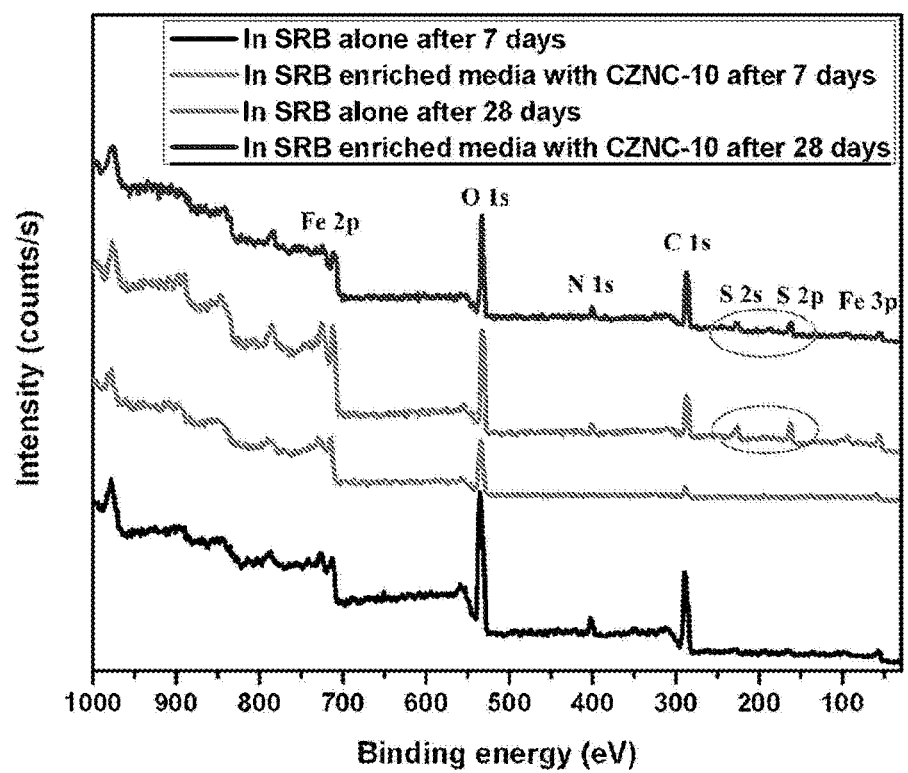
FIG. 33 shows wide XPS spectra for surface of carbon steel coupon incubated in SRB and SRB-enriched media with 250 μg/mL of CZNC-10 after 7 and 28 days of incubation.

XPS analysis is conducted to compare the composition and surface chemistry of the film (which is a mixture of biofilm and corrosion products) formed on the carbon steel coupons exposed to SRB with and without the presence of CZNC-10. FIG. 33 presents wide XPS survey scan of film on the treated coupons after 7 and 28 days of incubation in SRB-enriched media in the presence and absence of 250 µg/mL of CZNC-10. The peaks for Fe 3p, Fe 2p, C 1s and O 1s are observed in all samples spectra, which can correspond to the change in corrosion products composition on the carbon steel coupons. Shallow peaks for S 2p and S 2s are observed after 7 days of incubation in SRB confirming the SRB activity. The absence of shallow S peaks and low peak intensities of C 1s, O 1s and N 1s in the coupon incubated in CZNC-10-treated SRB after 7 days of incubation demonstrates the initial inhibition of SRB by CZNC-10. Meanwhile, the peaks for S 2p and S 2s are observed only after 28 days for both coupons confirming the presence of sulfide and organic sulfur as a result of the SRB activity. The intensity of these peaks is lowered in presence of CZNC-10 due to the inhibition of SRB activity.

FIG. 33 shows wide XPS spectra for surface of carbon steel coupon incubated in SRB and SRB-enriched media with 250 µg/mL of CZNC-10 after 7 and 28 days of incubation.

To evaluate the corrosion products on the surface of the coupons, the high-resolution XPS spectra of Fe 2p and S 2p are used. FIG. 34A and FIG. 34B show the high-resolution spectra and curve fitted Fe 2p peaks obtained from 28 days incubation in the absence and presence of CZNC-10, respectively. Two sharp peaks at 710.3 eV (Fe $2p_{3/2}$) correspond to FeS, and 707.6 eV (Fe $2p_{3/2}$) corresponds to mackinawite ($Fe_{1+x}S$) as well as pyrite ($FeS_2$) present in the spectra of both the coupons. An additional peak at 713.8 eV (Fe $2p_{3/2}$), corresponding to Fe(III)O originated from $Fe_2O_3$, is also present in both coupons. From the spectra, it is confirmed that the corrosion product mainly consists of FeS, $FeS_2$, $FeSO_4$, and $Fe_2O_3$ for both samples. The intensity of the ($Fe_{1+x}S$) as well as pyrite ($FeS_2$) peaks are almost similar for both the coupons. However, the FeS peak intensity is higher in the coupon incubated in SRB alone than the one with CZNC-10-inhibited SRB. The reduction in the peak intensity of FeS for the coupon incubated with CZNC-10 is attributed to the SRB inhibition activity of CZNC-10.

The curve fitted S 2p spectrum after 28 days (FIG. 34C and FIG. 34D) shows a monosulphide ($S^{2-}$) peak at 161.4 eV (S $2p_{3/2}$), disulphide ($S_2^{2-}$) peak at 162.3 eV (S $2p_{3/2}$) and $SO_4^{2-}$ peak at 168.8 eV (S $2p_{3/2}$) in both the spectra. Additionally, a peak at 163.3 eV corresponds to disulphide ($S_2^{2-}$) species (S $2p_{3/2}$) and a peak at 164.6 eV corresponds to organic sulphide (Org-S) (S $2p_{3/2}$) are present in the spectra of the coupon incubated in SRB alone. A peak at 163.8 corresponds to polysulphide ($S_n^{2-}$) species are present in the coupon incubated in CZNC-10 inhibited SRB. The ($S^{2-}$) and ($S_2^{2-}$) peaks could originate from the Fe—S bond and the $S_n^{2-}$ peak may be originates from S—S bonds. This confirms the formation of FeS, $FeSO_4$ and organic sulfur on the coupon surface as a result of SRB activity after 28 days of incubation. However, the low peak intensity in presence of CZNC-10 reveals the significant inhibition of SRB due to the anti-SRB activity of CZNC-10.

Figure 34:
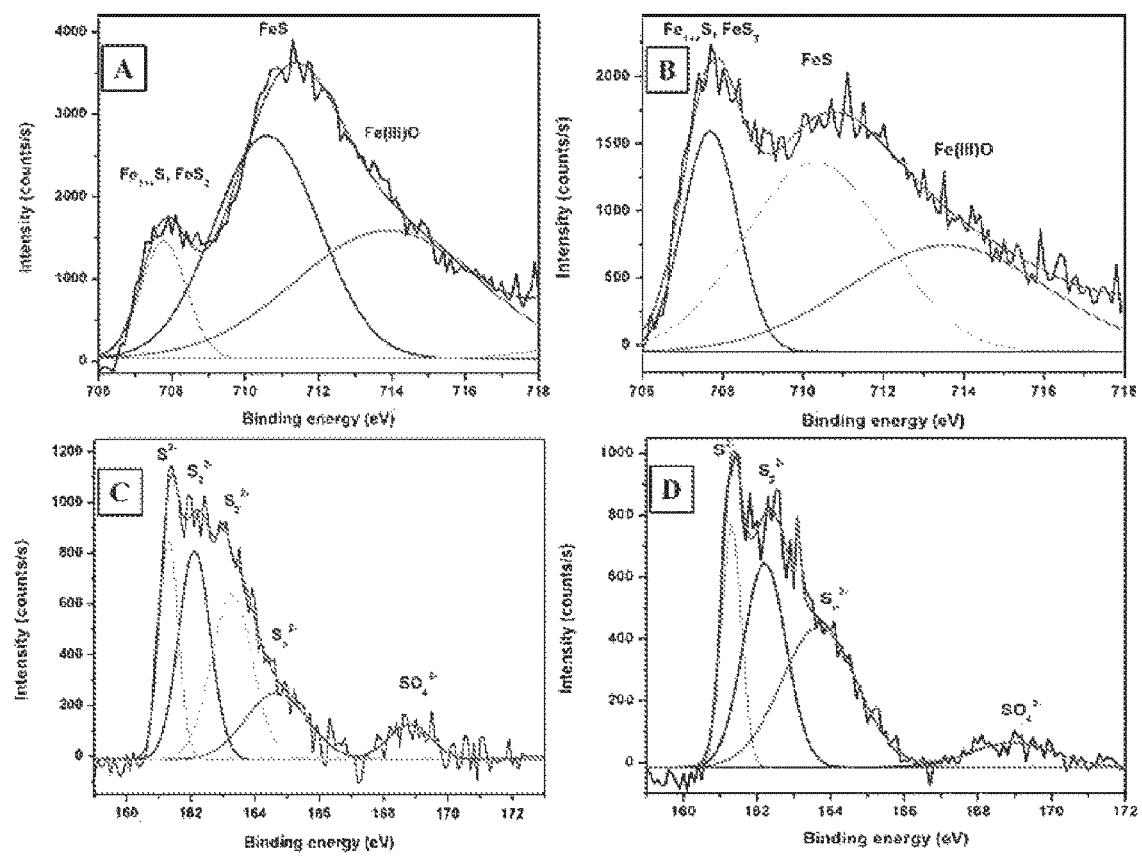
FIG. 34 shows high-resolution Fe 2p (FIG. 34A and FIG. 34B) and S 2p (FIG. 34C and FIG. 34D) from SRB (FIG. 34A and FIG. 34C) and SRB enriched media with 250 μg/mL of CZNC-10 (FIG. 34B and FIG. 34D).

FIG. 34 shows high-resolution Fe 2p (FIG. 34A and FIG. 34B) and S 2p (FIG. 34C and FIG. 34D) from SRB (FIG. 34A and FIG. 34C) and SRB enriched media with 250 µg/mL of CZNC-10 (FIG. 34B and FIG. 34D).

3.3. Post Corrosion Surface Profilometry

Surface profilometry is used to examine the surface of the coupon after cleaning it from biofilms and corrosion products. The biofilm is removed by ethanol and the corrosion products are removed by hydrochloric acid-hexamethylene tetramine mixture as described in the experimental section.

FIG. 35 shows profilometry images (3D) of the surface of the coupon incubated in FIG. 35A SRB alone and FIG. 35B CZNC-10-inhibited SRB after (FIG. 35A and FIG. 35B) 7 days of incubation and (FIG. 35C and FIG. 35D) 28 days of incubation. The magnified 2D images (FIG. 35C' and FIG. 35D') show the pit size. CZNC-10 concentration is 250 µg/mL.

FIG. 35 shows high resolution profiles of the steel surface after treatment with SRB enriched media with and without CZNC-10. After 7 days of incubation (FIG. 35A and FIG. 35B) the average roughness of the coupons is 141±12.76 nm and 69.0±9.55 nm in absence and presence of CZNC-10 inhibitor, respectively. This difference in the surface roughness may be due to the initial corrosion inhibition provided by the CZNC-10 on the coupon surface. As shown in FIG. 35C and FIG. 35D, the average surface roughness of the coupon after 28 days incubation with SRB is 287.0±18.89 nm which is lowered to 244.5 f 8.89 nm in presence of CZNC-10-inhibited SRB. This shows that the surface is more corroded after 28 days of incubation in comparison with 7 days and the corrosion is less for the coupon incubated in SRB enriched media with CZNC-10. The well-known mechanism of SRB-mediated biocorrosion involves the formation of $H_2S$ followed by the precipitation of iron sulfides and the formation of elemental sulfur. Under these conditions, biofilms can promote the formation of pits underneath the sulfide deposits. The pit size on the coupon surface is measured and compared to the SRB activity in both the coupons. The largest pit size on the coupon incubated in SRB alone was ~31.4 µm with a depth of 1.6 µm (aspect ratio=1/A=2.1×$10^3$) whereas in presence of CZNC-10, it is ~20 µm wide with a depth of 0.7 µm (aspect ratio=2.2×$10^3$) as observed in FIG. 35C' and FIG. 35D', respectively. This confirms the inhibition of SRB activity on the surface in presence of CZNC-10 with no change in the aspect ratios of the large pits, which means no change in the corrosion form will be detected when using the new CZNC-10 biocorrosion inhibitor. This is an important issue in selecting biocides as some of them can change the form of corrosion leading to unexpected behavior of the system suffering from MIC.

3.4. Electrochemical Impedance (EIS) Analysis

EIS is one of the most reliable methods to characterize electrochemical reactions at the metal/biofilm interface and to evaluate the interfacial phenomena of the biofilm formation and corrosion process development. Coupons incubated with SRB enriched media with and without CZNC-10 inhibitor are analyzed after 4, 7, 10, 21, and 28 days. FIG.

36 shows the Nyquist and Bode phase plots of the steel incubated with SRB alone (FIG. 36A, FIG. 36B and FIG. 36C) and SRB-enriched media with 250 µg/mL CZNC-10 (FIG. 36D, FIG. 36E and FIG. 36F). The insets in the aforementioned figure are magnifications of the low impedance regions. The smaller the Nyquist semicircles diameter indicate smaller charge transfer resistance across the interface of the metal/solution electrolyte which refers to higher corrosion rates. As observed in FIG. 36A, a remarkable increase in the diameter of Nyquist semicircles after 7 days compared to 4 days. The increase in the diameter of semicircle to maximum after 7 days of incubation can be attributed to the complete biofilm formation by SRB, which reaches its maximum at 7 days. After 7 days, the diameter of Nyquist semicircles shows a gradual decrease with time, which is associated with the gradual breakdown in the biofilm protection, which leads to faster corrosion rates. Hence, it is also confirmed that the SRB biofilm plays a pivotal role in the corrosion inhibition during the initial days of incubation. At 21 and 28 days of incubation, the diameters of the semicircles continue to decrease indicating increasing corrosion rates due to the breakdown of the biofilm.

Figure 36:
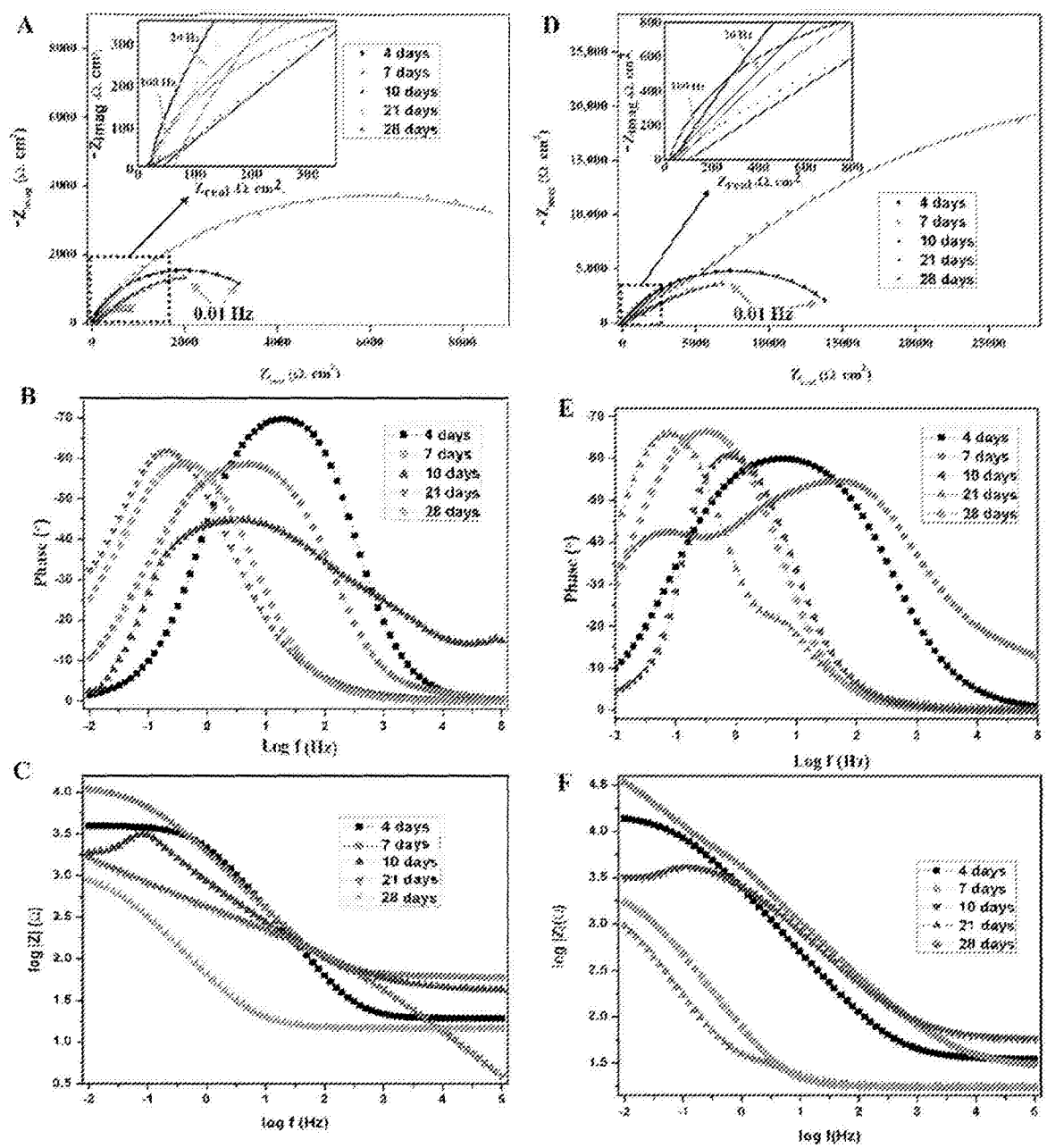
FIG. 36 shows Nyquist (FIG. 36A) and Bode phase (FIG. 36B and FIG. 36C) plots of the steel incubated with SRB alone. Nyquist (FIG. 36D) and Bode phase (FIG. 36E and FIG. 36F) plots of the steel incubated in SRB-enriched media with 250 μg/mL CZNC-10. The inset in (FIG. 36A) and (FIG. 36D) are zoom of the low impedance region.

FIG. 36 shows Nyquist (FIG. 36A) and Bode phase (FIG. 36B and FIG. 36C) plots of the steel incubated with SRB alone. Nyquist (FIG. 36D) and Bode phase (FIG. 36E and FIG. 36F) plots of the steel incubated in SRB-enriched media with 250 µg/mL CZNC-10. The inset in (FIG. 36A) and (FIG. 36D) are zoom of the low impedance region.

Figure 45:
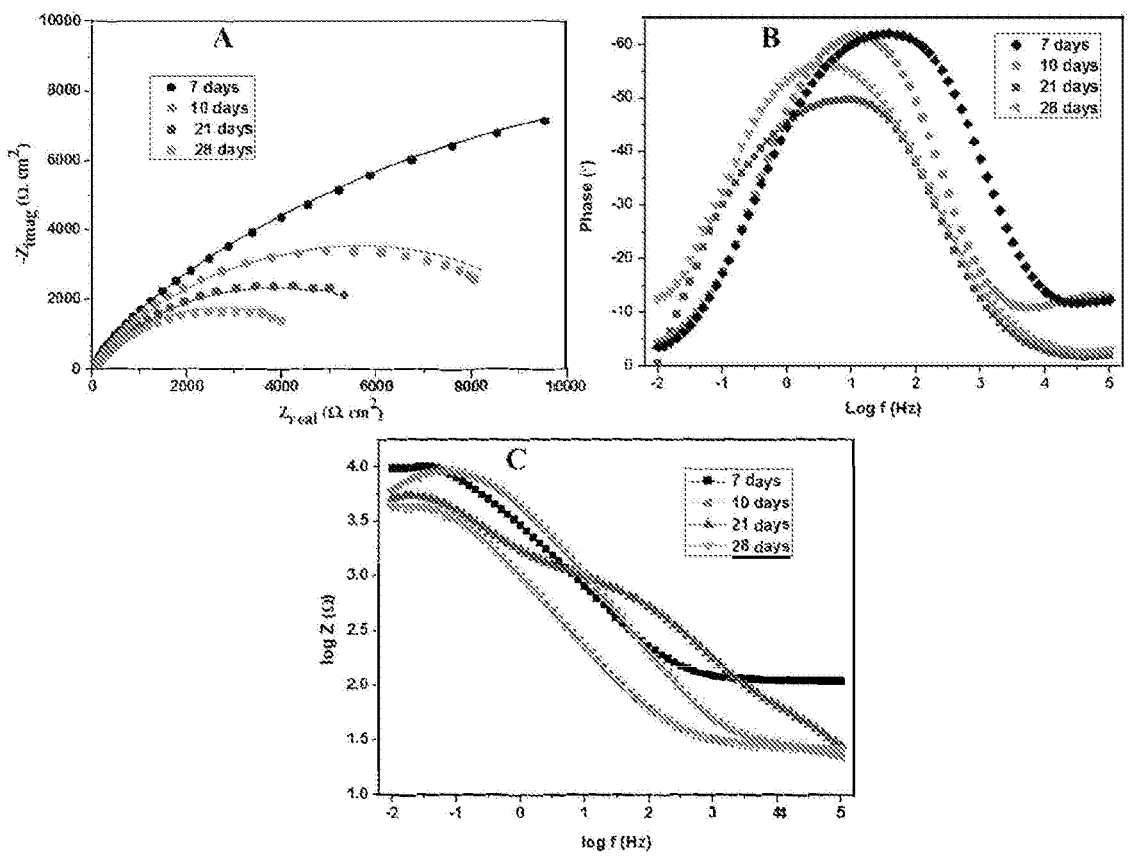
FIG. 45 shows Nyquist (FIG. 45A) and Bode (FIG. 45B and FIG. 45C) plots of the steel incubated with the abiotic media without SRB and CZNC-10.

As shown in FIG. 36D, in presence of CZNC-10 inhibitor, the same trend is observed as in the presence of SRB alone but the diameters of Nyquist semicircles are significantly larger irrespective of incubation times, which indicates that a corrosion inhibition is induced by CZNC-10. After 7 days, a difference in impedance is observed in Nyquist and the Bode phase plots in the presence of CZNC-10. In this case, a mass transfer control dominates, which is indicated by a change from a semicircle to a straight line. This is attributed to the diffusion through porous structure as displayed in FIG. 36D. The latter is due to the formation of an adherent biofilm layer from a mixture of the inhibitor and inhibited SRB at the metal surface besides the corrosion product, which acts as a barrier to the corrosive ions and outer Helmholtz layer. The biotic reduction of sulfate to iron sulfide in this system may be reduced in presence of CZNC-10 and it is reflected in the composition of the biofilm layers after 7 days, as was observed from the XPS analysis. The corresponding Bode phase plots are given in FIG. 36B and FIG. 36D and Bode modulus plots are given in FIG. 36C and FIG. 36F. The phase angle θ vs. log frequency plots shows that the phase peak shifts to the low frequency side upon increasing the incubation time. This frequency shift with increasing incubation time reveals the formation of a porous, conductive iron sulfide layer in the presence of SRB with high electrical capacitance value. The EIS analysis of the steel immersed into the abiotic media without SRB and CZNC-10 is shown in FIG. 45. In the absence of SRB, the semicircle's diameter decreases progressively and the phase peak was shifted to a low frequency upon increasing the incubation time, with much lower corrosion rate as compared with the presence of SRB.

Figure 37:
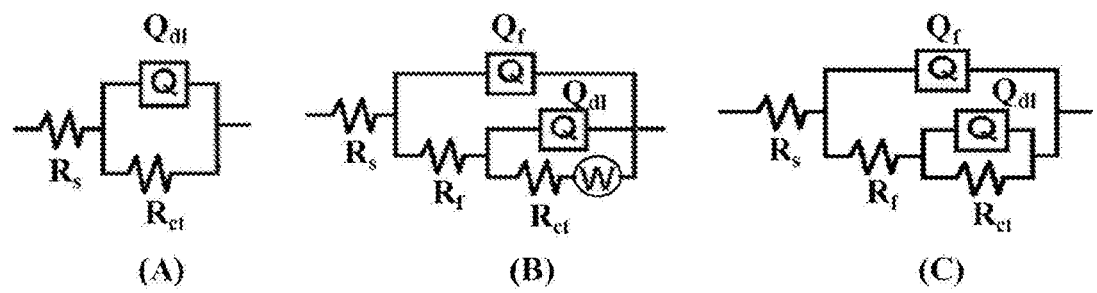
FIG. 37 shows equivalent circuits used for fit experimental impedance data.

FIG. 37 illustrates the equivalent electrical circuits used to model the respective EIS data. In the equivalent circuits, $R_s$ represent the resistance of the electrolyte, $Q_f$ represents a constant phase element (CPE) of the film, $R_f$ represent the resistance of the film, $Q_{dl}$ represent CPE of the electrical double layer, $R_{ct}$ represent the charge transfer resistance of the electrical double layer, and W represent Warburg impedance element due to diffusion. The impedance of Q is calculated from the equation:

$$Z_Q = Y_0^{-1}(j\omega)^{-n} \quad (1)$$

where ω is angular frequency in rad/s, $Y_0$ and n are the CPE constant. The term n is an exponential term corresponds to the related roughness of coupon surface. As n is getting close to unity, the CPE behaviour is getting close to an ideal capacitor.

During 4 days of incubation, a thin passive extracellular polymeric substances (EPS) film started to form on the coupon surface mainly composed of carbohydrate, protein, humic substances, and lipids usually accumulate in a form of biofilm. Hence, the contribution of the corrosion film and SRB biofilm were not resolved during initial days of incubation. Therefore, one time constant model (FIG. 37(A)) is used to fit the EIS data after 4 days of incubation. However, the two time constant model (FIG. 37(B)) is used to fit the EIS data after 7 and 10 days of incubation and the two time constant model (FIG. 37(C)) is used to fit the EIS data after 21 and 28 days of incubation. The equivalent circuits used for fitting the data for 7 and 10 days are different due to the more prominent effect of SRB biofilm during initial 7-10 days of incubation. The term W corresponds to electrochemical process controlled by diffusion alone due to the biofilm influence. For longer incubation times, the influence of biofilm compared to corrosion product film is less as seen in the Bode phase plot and hence, the term W is removed from the circuit.

FIG. 37 shows equivalent circuits used for fit experimental impedance data. FIG. 37(A) for 4 days of incubation, FIG. 37(B) for 7 and 10 days of incubation and FIG. 37(C) 21 and 28 days of incubation.

The $R_{ct}$ and $R_f$ values after fitting EIS data are given in Table 1 and the whole EIS fitting parameters are given in Table 7. The $R_{ct}$ values after 7 days of incubation are ~3.2 times higher than the $R_{ct}$ values of the coupon after 4 days of incubation for both SRB and SRB with 250 µg/mL CZNC-10. This higher $R_{ct}$ value confirms the corrosion protection of the biofilm against corrosion at 7 days. After 10 days of incubation, the $R_{ct}$ in biotic media is decreased which corresponds to the start of the breakdown of the corrosion protection of the biofilm and the values were further reduced to lower values for 21 and 28 days of incubation, which indicates an increase in the corrosion rate.

On the other hand, the $R_{ct}$ values of coupons in presence CZNC-10 are higher than the SRB alone for all incubation times. The $R_{ct}$ values of the coupon after 4, 7 and 10 days of incubation are almost 3.5-3.7 times higher than the corresponding SRB alone. Moreover, the $R_{ct}$ values of coupon for 21 and 28 days of incubation are almost 3.2 and 2.8 times higher than the corresponding SRB experiments respectively. This increase in the $R_{ct}$ value confirms the effect of CZNC-10 towards the corrosion inhibition against SRB induced MIC. The relative increase in the corrosion inhibition efficiency (IE) is calculated by using the equation $$IE = (R_{ct}' - R_{ct})/R_{ct}' \quad (2)$$

where $R_{ct}'$ is the charge transfer resistance of the coupon incubated in SRB with CZNC-10 and $R_{ct}$ is the corresponding charge transfer resistance in presence of SRB alone. The IE is calculated as 73.4%, 71.4%, 71%, 68.6% and 61.3% for 4, 7, 10, 21 and 28 days of incubation, respectively.

The % IE for each incubation times is given in Table 5. The biofilm formation during the initial days of incubation is further confirmed from the $R_f$ values (Table 5). The $R_f$ is the highest at 7 days of incubation and decreases as time proceeds for both the coupons. The subsequent decrease in the $R_f$ value with more incubation time demonstrates the start of the breakdown of the film and hence the corrosion rate start to increase. In addition, the higher $R_f$ value of in the presence of CZNC-10 (15370 $\Omega \cdot cm^2$) in comparison with the absence of CZNC-10 (4760 $\Omega \cdot cm^2$) after 7 days of incubation can be attributed to the film/layer formation of CZNC-10 during the initial days of incubation. The double layer capacitance represented by $Q_{dl}$ is calculated using an equation from ref. The double layer capacitance is inversely proportional to $R_{ct}$, thus, according to Table 5 the double layer capacitance decreases from 4 days to 7 days incubation and then it increases for longer incubation times for both cases.

than their corresponding SRB alone. A significant shift towards positive values for the 7 days of incubation in both cases was noticed which is decreased later at 10 days of incubation and remains stable within 10-20 mV shift throughout the rest of the incubation time. The shift to positive potential for 7 days incubation indicates the maximum activity and growth of SRBs species which significantly decreases the corrosion rate of coupons (as was confirmed by the $R_{ct}$ values at 7 days of incubation). The effect of abiotic media solution towards the corrosion of S150 carbon steel is evaluated by measuring the OCP after incubating the coupon in media solution without any SRB or CZNC-10. The OCP values remains stable for the entire incubation periods with a small shift toward positive values and there is no specific feature is found as seen in the SRB incubated coupons.

Figure 39:
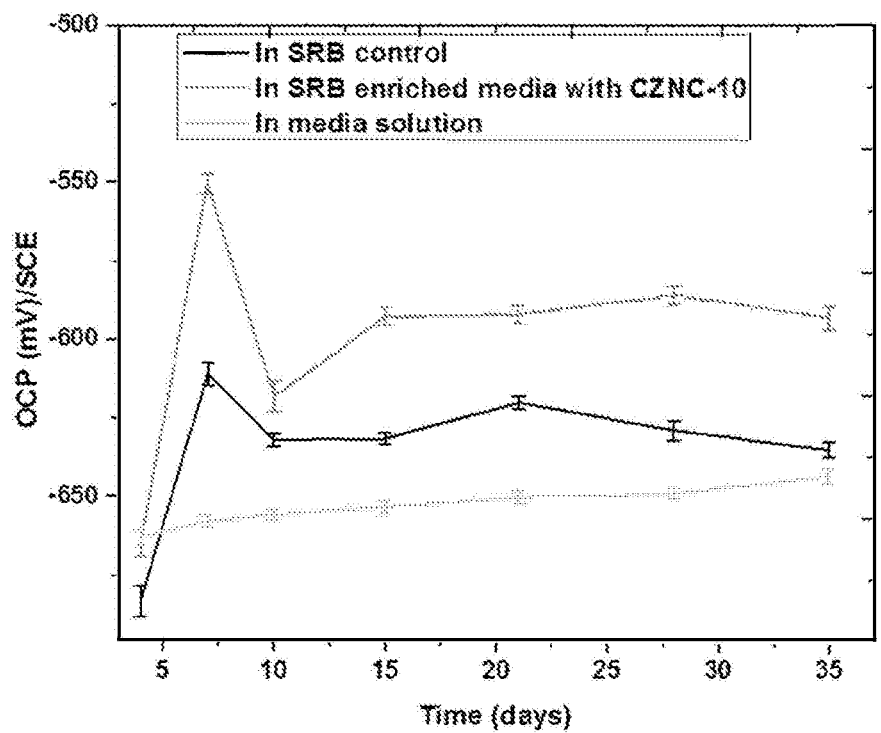
FIG. 39 shows OCP variations of the coupons incubated in SRB alone, SRB enriched media with CZNC-10 (250 μg/mL) as well as in media solution for different incubation time.

FIG. 39 shows OCP variations of the coupons incubated in SRB alone, SRB enriched media with CZNC-10 (250 µg/mL) as well as in media solution for different incubation time.

From the electrochemical analysis, it is found that the corrosion inhibition is maximum at 7 days of incubation due to the biofilm formation by SRB. The addition of CZNC-10 significantly enhances the corrosion inhibition irrespective of the incubation times. This is attributed to combined effect of CZNC-10 on the SRB growth as well as through the co-formation of a more protective film along with the SRB biofilm. The corrosion inhibition is maximum at 7 days and corrosion rate starts to increase after 7 days of incubation for both the coupons. The relative increase in the corrosion inhibition efficiency of CZNC-10 at 250 µg/mL is found to be 61-74% compared to the corresponding coupons without inhibitor at the same incubation periods of time.

Table 7. EIS Fitting Parameters

4. Conclusion

The inhibition of SRBs biocorrosion on carbon steel with CZNC-10 was successfully evaluated in detail in this work. 250 µg/mL CZNC-10 was used as the optimal inhibitory concentration for SRB. The biofilm and corrosion product with and without CZNC-10 were characterized by SEM and XPS and found that CZNC-10 significantly reduced biocorrosion by inhibiting bacterial growth and co-forming of a more protective film on the carbon steel surface to prevent the bacterial attack during the initial days of incubation. The XPS analysis suggested that the corrosion products, mainly iron oxides and iron sulphides, are significantly reduced in presence of CZNC-10. The profilometry analysis showed less corrosion damages on the coupon surface incubated with CZNC-10. The EIS analysis also showed almost 3.2 and 2.8 times increase of charge transfer resistance ($R_{ct}$) on carbon steel coupon after 21 and 28 days of incubation in

| Sample treatment | Incubation time (day) | $R_s$ ($\Omega \cdot cm^2$) | $R_f$ ($\Omega \cdot cm^2$) | $Y_f$ (mS · Sec$^n$/cm$^2$) | $n_f$ | $R_{ct}$ ($\Omega \cdot cm^2$) | $Y_{dl}$ (mS · Sec$^n$/cm$^2$) | $n_{ct}$ | $Q_{dl}$ (µF · cm$^{-2}$) | $Q_f$ (µF · cm$^{-2}$) | W |
|---|---|---|---|---|---|---|---|---|---|---|---|
| SRB enriched media | 4 | 18.31 | | | | 3973 | 0.068 | 0.86 | 905.87 | | |
| | 7 | 60 | 4760 | 0.073 | 1 | 12680 | 0.127 | 0.68 | 368.88 | 743.89 | 0.020 |
| | 10 | 26.91 | 2267 | 0.150 | 0.93 | 4272 | 0.267 | 0.56 | 1133.60 | 1591.00 | 0.015 |
| | 21 | 20.75 | 886 | 0.137 | 0.81 | 1575 | 0.193 | 0.73 | 2446.10 | 3745.73 | |
| | 28 | 17.46 | 318.8 | 0.020 | 0.93 | 765 | 0.046 | 0.89 | 3497.50 | 5949.97 | |
| SRB enriched media with CZNC-10 (250 µg/mL) | 4 | 34.45 | | | | 14980 | 0.102 | 0.72 | 305.27 | | |
| | 7 | 24.37 | 15370 | 0.069 | 1 | 44430 | 0.027 | 0.63 | 105.02 | 262.11 | 0.048 |
| | 10 | 16.8 | 1816 | 0.081 | 1 | 14750 | 0.008 | 0.90 | 218.93 | 1744.86 | 0.021 |
| | 21 | 28.93 | 502 | 0.053 | 0.61 | 5021 | 0.084 | 0.58 | 866.20 | 8099.52 | |
| | 28 | 17.62 | 187.2 | 0.049 | 0.51 | 1980 | 0.289 | 0.85 | 1986.80 | 15615.85 | |

TABLE 5

EIS fitting values of $R_{ct}$, $R_f$ and IE.

| Coupon incubated in | Incubation time (day) | $R_f$ ($\Omega \cdot cm^2$) | $R_{ct}$ ($\Omega \cdot cm^2$) | IE (%) |
|---|---|---|---|---|
| SRB alone | 4 | — | 3973 | — |
| | 7 | 4760 | 12680 | — |
| | 10 | 2267 | 4272 | — |
| | 21 | 886 | 1575 | — |
| | 28 | 318.8 | 765 | — |
| SRB enriched media with CZNC-10 (250 µg/mL) | 4 | — | 14980 | 73.4 |
| | 7 | 15370 | 44430 | 71.4 |
| | 10 | 1816 | 14750 | 71 |
| | 21 | 502 | 5021 | 68.6 |
| | 28 | 187.2 | 1980 | 61.3 |

Figure 38:
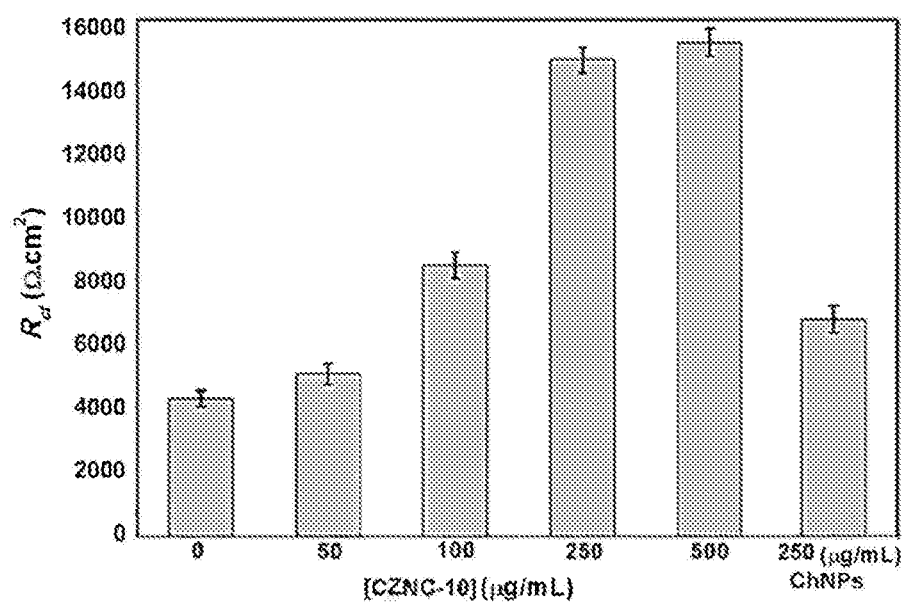
FIG. 38 shows $R_{ct}$ vs concentration of CZNC-10 after 10 days of incubation. The error bar shows the standard deviation of three repetitive measurements.

The effect of CZNC-10 concentration towards the corrosion inhibition was further investigated in SRB enriched media in presence of 0. 50, 100, 250, and 500 µg/mL CZNC-10, after 10 days incubation. Ch NPs (250 µg/mL) was tested as control. As shown in FIG. 38, the $R_{ct}$ values after 10 days of incubation showed a continuous increase with concentration and reach a plateau after 250 µg/mL, which agrees well with our previous study. The $R_{ct}$ values of Ch NPs at 250 µg/mL is less than the $R_{ct}$ values of CZNC-10 at 100 µg/mL after 10 days of incubation.

FIG. 38 shows $R_{ct}$ vs concentration of CZNC-10 after 10 days of incubation. The error bar shows the standard deviation of three repetitive measurements.

To correlate the EIS data with the biofilm formation of SRBs during the initial days of incubation, the OCP values are plotted with different incubation times for both active and CZNC-10 inhibited SRB (FIG. 39). Both showed the same trend in the OCP behaviour. However, the OCP values of the coupon incubated with CZNC-10 are always higher presence of CZNC-10. Altogether, the study revealed that the CZNC-10 can be used an effective eco-friendly corrosion inhibition system against SRBs towards the mitigation of MIC.

Example 4

"Green" ZnO-Interlinked Chitosan Nanoparticles for the Efficient Inhibition of Sulfate-Reducing Bacteria in Inject Seawater Abstract Antimicrobial agents and corrosion inhibitors are widely used as biocides in the oil and gas industry to disinfect water and inhibit excessive biofilm formation caused mainly by sulfate reducing bacteria (SRBs). However, traditional biocides may induce bacterial resistance and/or be detrimental to environment by forming harmful disinfection byproducts. In this first systematic study, we synthesized a "green" and highly stable biocide formulations composed of ZnO-interlinked chitosan (Ch) nanoparticles (CZNCs) and evaluated their antimicrobial activity against mixed SRBs culture isolated from real oil field sludge. SEM, TEM, X-ray diffraction (XRD) and FTIR suggested the formation of stable nanocomposites with strong interaction between ZnO and Ch nanoparticles. Synthesized nanocomposites showed highly stable behaviors in the high salt concentrations of inject seawater. The inhibition of SRBs activity was concentration-dependent and more than 73% and 43% inhibition of sulfate reduction and total organic carbon (TOC) removal, respectively, was observed at 250 µg/mL CZNCs at 10% initial ZnO loading. Biocompatibility and environmental impact of the nanocomposite was evaluated by analyzing their potential toxicity in vivo using the zebrafish embryos. Neither mortality nor teratogenic effects were observed on zebrafish embryos using the acute toxicity assay. The hypothetical LC50 for the CZNCs was much higher than 250 µg/mL. It is expected that the new nanocomposite can contribute to the development of "green" biocides for oil/gas industries which will be eco-friendly and will have no adverse impact on the environment.

Introduction

Oil producing companies utilize water injection as a common oil recovery method for decades, especially for offshore fields, where seawater is typically used as inject water. Due to the size and complexity of the injection system and high salinity of the water (~55,000 mg/L); several challenges are faced during this process including microbial growth, fouling and pipelines corrosion. Biofilms accelerate corrosion in a biologically conditioned metal-solution interface. This microbial influenced corrosion (MIC) processes constitutes about 10% of metal corrosion as a whole, which costs the American industry alone 280 billion dollars per year, both for the domestic and global oil and gas industries. Collected seawater samples from the Arabian Gulf indicated the presence of distinct microbial communities including sulfate-reducing bacteria (SRBs).[2] All of these microbes are present in small concentrations in the seawater; however this is enough to cause a pressing threat for the oil recovery process. SRBs are main microorganisms that can anaerobically generate sulfide species during the organisms' respiration process in biofilm causing biocorrosion in the injection networks. Moreover, the produced $H_2S$ gas is toxic, corrosive, and responsible for a variety of environmental and economic problems including reservoir souring, contamination of natural gas and oil, corrosion of metal surfaces, and the plugging of reservoirs due to the precipitation of metal sulfides. Synthetic biocides are commonly used to inhibit biofilm growth, including the oxidizing (chloronation, chloroamination, and ozonation) and non-oxidizing biocides (formaldehyde, glutaraldehyde, and quaternary ammonia compounds etc.). However, release of disinfection byproducts (DBPs), high cost, less efficiency and environmental toxicity restricts the use of biocides in the oil fields. Less expensive, DBPs free, and environmental friendly treatments are sought alternatives for conventional biocides.

Nanoparticles (NPs) can be effective for the disinfection of waterborne microbes while imparting significant reductions in time, waste management, environmental impacts and labor as compared with the conventional chemical disinfection methods. Several studies have proven the antimicrobial activities of nanomaterials against common water born bacteria, SRBs, methanogens, nitrifiers, and denitrifiers. However all of these studies are focused on screening the antibacterial activities of these nanomaterials against individual bacterial strains and no research data available on the inhibition of real field bacterial consortia from oil & gas or any other sector. Zinc oxide nanoparticles (ZnONPs) are largely reported as efficient antibacterial agents suitable for water/wastewater treatment applications and have received significant interest worldwide. Though, biological toxicity and environmental hazard is should be concerned when using metal oxide NPs as antibacterial agent. There is a need to reduce the cytotoxic effects of these NPs to non-hazardous levels by combining metal nanoparticles with polymeric compounds that improve their stability and efficiency without affecting their functional properties. Chitosan (Ch) has been fostered for several applications owing to its low toxicity, biocompatibility and biodegradability, low cost and unique antimicrobial properties. The antimicrobial activity of Ch nanolattices (ChNPs) was observed against a wide variety of microorganisms including fungi, algae, and some bacteria. It is expected that a hybrid material comprising ChNPs/ZnONPs can provide higher antibacterial performance, stable suspension, and minimized cytotoxicity profiles because of the low metal dissolution rates from Ch based complexes. Owning to their low cost, abundance, and environmental safety, we believe it is the right time to explore ChNPs and ZnO nanocomposite as antimicrobial agents in the industrial applications.

Here we introduced, for the first time, ChNPs/ZnO (CZNCs) as an efficient and green alternative for seawater disinfection and inhibition of SRBs biofilm from real oil field sludge. Zebrafish model, a widely accepted model for toxicity assessment, was exploited to evaluate any potential acute toxicology effect of CZNCs and thereby propose optimal nanoparticles concentration with highest efficiency and minimal environmental impact on marine organisms and ecosystems of marine environment Materials and Methods Materials Low molecular weight Ch with 85% degree of deacetylation was purchased from Sigma-Aldrich. Zinc nitrate (hexahydrate), trypolyphosphate (TPP), sodium hydroxide (NaOH) were obtained from Fisher Scientific. SRBs culture was enriched from biofilm sludge obtained from MAERSK Oil Research Center (MORTC), Qatar. Dimethyl sulfoxide (DMSO), diethylaminobenzaldehyde (DEAB) were from sigma Aldrich. Stock solution of 60× E3 media was prepared by dissolving 8.765 g NaCl, 380 mg KCl, 1.185 g $MgSO_4$, and 1.765 G $CaCl_2$) in 0.5 L deionized water (DI) water. DI water was used to prepare all other solutions. All other chemicals were analytical grade and used as received.

Synthesis of Chitosan/ZnO Nanocomposite (CZNCs)

Ch/ZnO nanocomposite (CZNCs) was prepared by ultra-sonication of ChNPs and ZnONPs at different stoichiometric ratios. To prepare ChNPs, Ch (0.1%) was dissolved in an aqueous solution of 1% (w/w) acetic acid and stirred overnight at room temperature using a magnetic stirrer. The solution pH was adjusted to 5.5 using 10 N aqueous NaOH. Trypolyphosphate (TPP) was dissolved in DI water at a concentration of 0.5 µg/mL and filtered through the syringe filter (pore size 0.45 µm, Millipore, USA). Ch and TPP solutions were then passed through the syringe filter to remove insoluble residues. TPP solution was added dropwise to the Ch solution at different initial Ch to TPP ratios. The reaction was carried out for 10 min and the resulting suspension was washed three times with DI water, followed by centrifugation at 10,000 rpm to remove residual TPP. Finally, the obtained pellet was resuspended into DI water and used as ChNPs.

The ZnONPs were synthesized by wet chemical method using zinc nitrate and NaOH as precursors in presence of soluble starch as stabilizing agent. In brief, zinc nitrate (0.1 M) was added to 0.5% starch solution and stirred until completely dissolved. Then, 0.2 M NaOH solution was added dropwise under constant stirring for 2 h. The obtained white suspension was collected by centrifugation at 12000 rpm for 15 min and washed three times with DI water. Nanoparticles were dried at 80° C. overnight to convert $Zn(OH)_2$ into ZnO.

CZNCs were synthesized by adding 1, 5, 10 and 20% (w/w) ZnONPs in ChNPs suspension, namely: CZNCs (1%), CZNCs (5%), CZNCs (10%), and CZNCs (20%), respectively. Reaction mixture was ultrasonicated for 10 min. The homogeneous suspension was centrifuged and pellets were washed thrice with DI water and freeze dried. The obtained powder was used for the further characterization and SRBs biofilm inhibition studies.

CZNCs Characterization and Stability Studies

Synthesized nanomaterials were characterized by Zeta-sizer, X-ray diffraction (XRD), Fourier transform infrared spectroscopy (FTIR), scanning electron microscopy (SEM), transmission electron microscopy (TEM) and UV-Vis spectroscopy. The UV-Vis spectra were collected from Jasco V-670 spectrophotometer (medium response, UV/vis bandwidth 2 nm, scan speed 100 nm/min). A Zeta phase analysis light-scattering (ZetaPALS) analyzer (Malvern Instruments, Zetasizer Nano ZS) was used to measure the electrophoretic mobilities (EPMs) of the CZNCs. CZNCs (10%) showed the optimal SRBs growth inhibition and was used for the further characterization and is indicated as CZNCs. The EPMs were measured 5-10 times for at least three samples of each suspension at CZNCs concentration of 25 µg/mL and pH of 7.5. The zeta potentials were calculated from the average EPMs. The average particle sizes were measured by dynamic light scattering (DLS) and the ZetaPALS analyzer. To determine the impact of ionic strength on CZNCs size, suspensions containing different salt concentrations were prepared in DI to simulate inject seawater and immediately analyzed. The hydrodynamic diameters were measured without moving the cell at specific intervals over 40 min to achieve early stage aggregation kinetics.

The release of $Zn^{2+}$ from CZNCs (10%) and ZnONPs were analyzed by suspending 250 µg/mL CZNCs and 25 µg/mL ZnONPs in inject water in an anaerobic environment with initial pH of 7.5. The suspensions were continuously shaken at 150 rpm and 35° C. for 48 h. Aliquots were withdrawn at specific time intervals and were centrifuged at 12,000 rpm for 15 min. The obtained supernatant was used to analyze the $Zn^{2+}$ concentration. The concentration of $Zn^{2+}$ was quantified using inductively coupled plasma-optical emission spectroscopy (ICP-OES; Perkin-Elmer, AS 93 PLUS).

Wide angle XRD (WXRDs) was recorded using a Bruker D8 Advance (Bruker AXS, Germany). X-ray diffractometer with Cu-Kα radiation (λ=1.54056 Å) at a voltage of 40 kV and a current of 15 mA with a step scan of 0.02° per step and a scanning speed of 1°/min. SEM was measured using a FEI Quanta 650 FEG, after gold sputter coatings on samples. TEM images were recorded using a FEI Talos F200X. The samples were dispersed in ethanol and mounted on a lacey carbon Formvar coated Cu grid.

Enrichment of Sulfate-Reducing Bacteria (SRBs) Biofilm and Biofilm Inhibition Studies The mixed culture SRBs used in this study was enriched from sludge biomass collected from Al-Shaheen oil filed in Qatar operated by MAERSK OIL. Postage's C medium was used to prepare the active SRBs cultures (Postgate, 1984) in simulated inject seawater. Table 8 shows the composition of the inject seawater. The medium pH was initially adjusted to approximately 7.5 with a 1N NaOH solution and was heat-sterilized at 15 psi and 120° C. for 20 min. A high purity nitrogen gas was purged through the medium to maintain anaerobic conditions before inoculation. The culture was maintained in 1 L bottles at 35° C. on a rotary shaker at 110 rpm. The developed culture was further sub-cultured every week under anaerobic conditions for several months. Sulfate reduction and sulfide production were indicated through blackening of the media.

TABLE 8

Composition of simulated sea water

| Chemical ion | Concentration (mg/L) | Part of salinity (%) |
|---|---|---|
| Chloride $Cl^-$ | 19345 | 55.03 |
| Sodium $Na^+$ | 10752 | 30.59 |
| Sulfate $SO_4^{-2}$ | 2701 | 7.68 |
| Magnesium $Mg^{+2}$ | 1295 | 3.68 |
| Calcium $Ca^{+2}$ | 416 | 1.18 |
| Potassium $K^{+1}$ | 390 | 1.11 |
| Bicarbonate $HCO3^{-1}$ | 145 | 0.41 |
| Bromide $Br^-$ | 66 | 0.19 |
| Borate $BO_3^-$ | 27 | 0.08 |
| Strontium $Sr^{+2}$ | 13 | 0.04 |
| Fluoride $F^-$ | 1 | 0.003 |

Batch assays were performed in 250 mL glass vessels of Postgate C media prepared in synthetic seawater. Sodium sulfate and sodium lactate were used as the sulfate and carbon sources, respectively. The reactors were seeded with enriched mixed SRBs biofilm to make volatile suspended solids (VSS) concentration of 1000 mg/L. In order to investigate the effect of synthesized nanomaterials on the activity of SRBs, the inhibition effect of ChNPs, ZnONPs, and CZNCs at (1, 5, 10 and 20%) ZnONPs loadings were examined based on the sulfate reduction, organic substance oxidation and sulfide production. To observe the effect of CZNCs on SRBs biomass, the batch assays were exposed to 10, 20, 50, 100, and 250 µg/mL CZNCs concentrations with sulfate and TOC concentrations of 1000 and 650 mg/L, respectively. A high purity nitrogen gas was purged through the medium to maintain anaerobic conditions before inoculation. The reactors were exposed to continuous shaking at 110 rpm and constant mesophilic temperature of 35° C. Aliquots were withdrawn at specific time intervals and centrifuged at 10,000 rpm for 10 min. The supernatant was used for further analysis. Dissolved sulfide was analyzed by a titrimetric method using the standard examination methods of water and wastewater as described earlier. Concentration of sulfate was analyzed by a DX ICS-5000 ion chromatography (IC) unit (Dionex, USA). Abiotic controls consisted of the sterile seawater and CZNCs suspension medium without the inoculum. All experiments were performed in triplicate and average values were recorded.

LDH Release Assay and Analysis of EPS from Biofilm

Lactate dehydrogenase (LDH) release assay was used to determine the cell membrane integrity of SRB cells exposed to CZNCs in inject water using LDH kit (Roche Applied Science). The standard protocol assay was performed according to the manufacturer's instructions. Briefly, SRBs biomass suspension treated with 250 µg/mL of CZNCs was transferred into sterile 1 mL centrifuge tubes. Then, a 50 µL substrate mixture was added and tubes were incubated at room temperature in the dark for 1 h. The reaction was quenched by the addition of 50 µL of stop solution. LDH release was quantified by measuring absorbance at 490 nm.

In order to study the effects of concentration of nanomaterials on sulfidogenic biofilm, extracellular polymeric substances (EPS) were extracted. At the end of each batch experiment, 10 mL of mixed liquor was withdrawn from the reactors and centrifuged at 12,000 rpm for 5 min. The obtained pellets were resuspended in DI water and 0.06 mL of formaldehyde (36.5%) was added to the suspension and then incubated at 4° C. After 1 h, 4 mL of 1 N NaOH was introduced for 3 h at 4° C. The incubated samples were centrifuged at 10,000 rpm for 10 min and the supernatant was collected as EPS extracts and stored at −20° C. before further characterization. Concentrations of proteins, humic substances, carbohydrates, and lipids within the EPS extract were analyzed as described elsewhere. A brief description of the analysis methods can be found in the supporting information (SI).

Zebrafish Embryos Culture

Fertilized embryos of wild type AB zebrafish strains (Danio rerio) were collected in E3 egg medium in Petri dishes. At 3 hours post-fertilization (hpf), unfertilized and abnormal embryos were discarded. The fertilized embryos were dechorionated with pronase at 24-hpf and retained in 6 well-plates containing E3 egg medium. Next, E3 egg medium was replaced by the different concentrations of drugs to be tested.

Acute Toxicity (Acutoxicity) Assays

We investigated the toxicology of CZNCs nanomaterial with an acute toxicity assay adapted by the Organization of Economic Co-operation and Development (OECD) guideline for testing chemical toxicity (No 203 and 236) and modified it for nanoparticle testing. The purified (acetic acid-free) lyophilized CZNCs nanomaterial was weighted and dissolved in DI water, then sonicated in a water bath for 15 min for several cycles until a complete homogeneous solution is achieved. Next, 24-hpf healthy dechorionated embryos were transferred to 6 well-plate containing the following treatment dissolved in E3 egg medium: (i) four different concentrations (25, 50, 100, 250 µg/mL) of CZNCs (ii) the positive control DEAB (0.1, 1, 10, 100, and 1.0 µM), (iii) the negative control 0.1% DMSO and then incubated at 28.5° C. for an additional 72 h until their age reached 96-hpf. Cumulative survival and mortality were recorded at 3-time point intervals (48, 72, and 96 hpf), In addition, all embryos were observed every day for any teratogenic abnormalities. The median lethal dose (LC50) was calculated by fitting sigmoidal curve to mortality data with a 95% confidence interval. A total of 100 embryos were used for each tested dose condition of the CZNCs, and 20 embryos for DEAB and DMSO concentrations. The toxicity assessment was expressed as a percentage of survived embryos for 96-hpf. Teratogenic score was presented as average standard error of mean. This value was calculated at every stage as the sum of different teratogenic phenotypes, expressed in percentage respect to the total number of possible teratogenic phenotypes at that precise stage of observation.

Results and Discussions

Synthesis and Characterization of CZNC Nanocomposite

Figure 46:
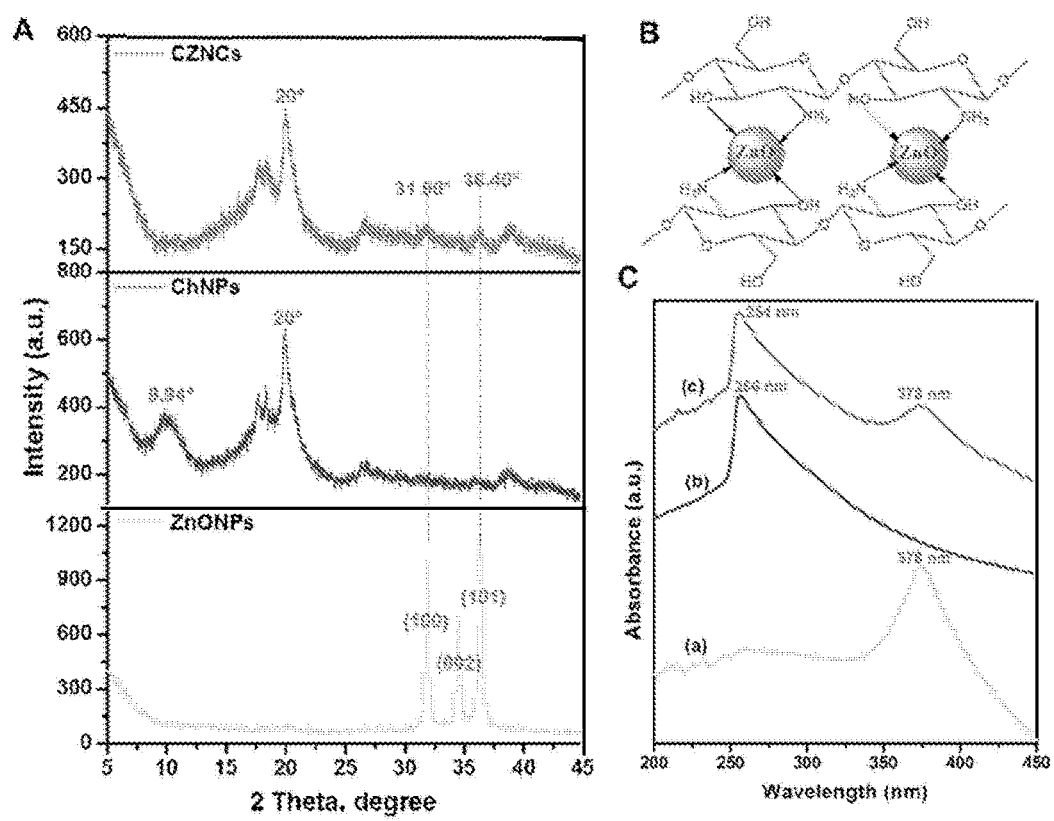
FIG. 46A shows X-ray diffraction patterns of ZnONPs (10%), ChNPs and CZNCs composite.
FIG. 46B shows structure of synthesized CZNCs composite.
FIG. 46C shows UV-vis absorption spectra of: (a) ZnONPs, (b) ChNPs, and (c) CZNCs composite.

CZNCs with 10% ZnONPs fully characterized as the optimal biocidal composite as shown in the subsequent studies. XRD spectra for ZnONPs, ChNPs and CZNCs are depicted in FIG. 46A. ZnONPs revealed typical crystalline peaks assigned to the (100), (002), and (101) diffractions. Moreover, ChNPs showed broad diffraction peaks at $2\theta=\sim9.94°$ and $\sim20°$ which symbolized to semi-crystalline nature. The peak at $2\theta=\sim9.94°$ corresponding to ChNPs was disappeared most likely due to the interruption of intermolecular hydrogen bonding within the ChNPs. Thus, Ch molecular chain was less stacked and formed the complex with ZnONPs (FIG. 46B). Further, two additional less intensity peaks at $2\theta=\sim31.90°$ and $\sim36.40°$ appeared corresponding to (100) and (101) reflections of ZnONPs. This observation indicates the successful incorporation of ZnO nanoparticles within the structure of ChNPs.

FIG. 46A shows X-ray diffraction patterns of ZnONPs (10%), ChNPs and CZNCs composite. FIG. 46B shows structure of synthesized CZNCs composite. FIG. 46C shows UV-vis absorption spectra of: (a) ZnONPs, (b) ChNPs, and (c) CZNCs composite.

UV-visible absorption spectroscopy was used to analyze the interaction of ZnONPs with ChNPs. FIG. 46C shows the UV-vis spectra of ZnONPs, ChNPs, and CZNCs composite. A maximum peak was observed at ~376 nm, corresponding to the characteristic absorption peak for ZnONPs (FIG. 46C (a)). Further, ChNPs exhibited a characteristic absorption band at ~256 nm. The CZNCs composite exhibited the absorption band at ~254 nm and ~373 nm, which confirmed the presence of ZnONPs within the ChNPs networks (FIG. 46C).

Figure 54:
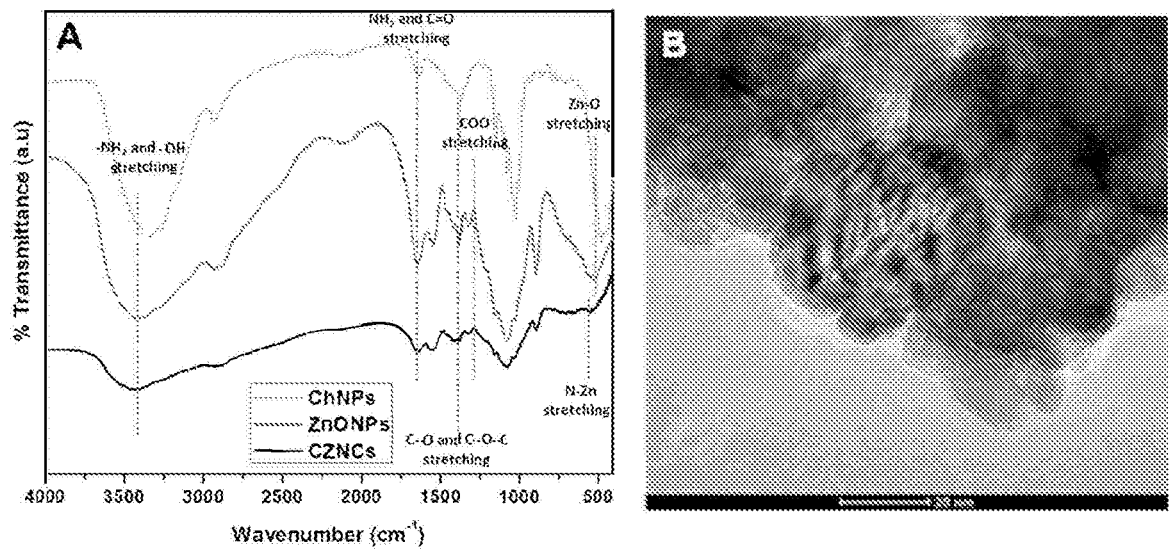
FIG. 54 shows FTIR spectra (FIG. 54A) of ChNPs, ZnONPs and CZNCs and TEM (FIG. 54B) of ZnONPs.
Figure 55:
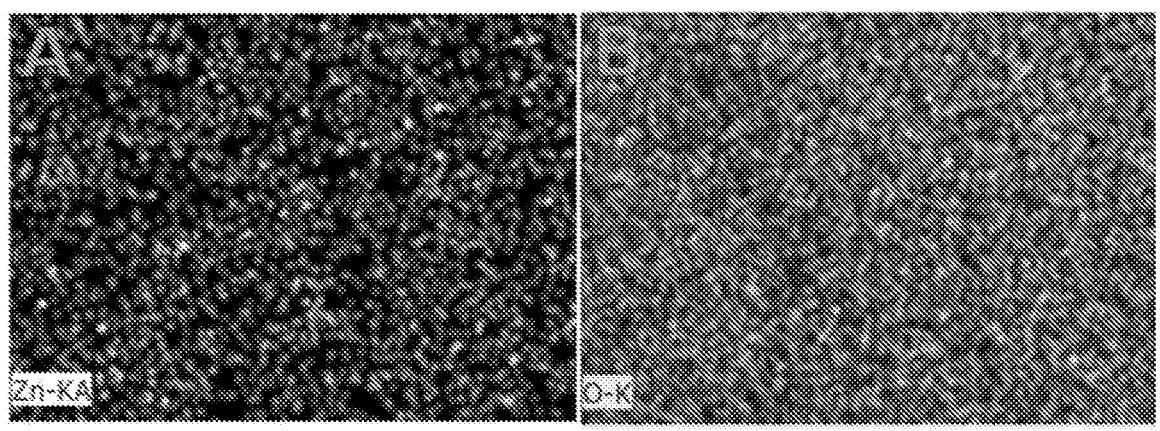
FIG. 55 shows EDS elemental mapping of Zn element (FIG. 55A) and O element (FIG. 55B) in CZNCs.

The FTIR spectra of ChNPs, ZnONPs and CZNCs are depicted in FIG. 54A. For ChNPs, a characteristic band at 3441 $cm^{-1}$ is attributed to the combined peaks of —$NH_2$ and —OH groups stretching vibration. This has been shifted to 3426 $cm^{-1}$ for CZNCs and became broader and stronger indicating a strong interaction between these groups and ZnO. The bands at 1650, 1393 and 1081 $cm^{-1}$ were attributed to the —$NH_2$ bending vibration, $CH_3$ symmetrical deformation, and the C—O stretching vibrations (C—O—C) of Ch, respectively. For ZnONPs, the peak observed at 3442 and 1124 $cm^{-1}$ could be ascribed to 0-H stretching and deformation of the adsorbed water on the metal surface, respectively. The absorption band at 485 $cm^{-1}$ is attributed to the stretching mode of Zn-0. The peaks at 1380 $cm^{-1}$ and 1076 $cm^{-1}$ may be ascribed to —C—O and —C—O—C stretching modes. In CZNCs, there were new absorption peaks at 552 and 465 $cm^{-1}$ due to the stretching vibration of N—Zn confirming the formation of strong attachment between amide group of Ch and stretching mode of ZnO.

The TEM image of the pure ZnONPs in FIG. 54B showed the high crystallinity of the nanoparticles with 30-40 nm average size. FIG. 47A represent the SEM image of the synthesized CZNCs. The average size of ChNPs was around 100-150 nm. TEM image of CZNCs in FIG. 47B and EDS elemental mapping of Zn and O elements confirmed the uniform distribution of ZnONPs in the ChNPs matrix (FIG.

55). Zeta potential (ZP) is an important indication for determining the surface charge of the particles and predicting the their stability. ZP of CZNCs was about +29 mV in all compositions. The magnitude of the ZP is predictive of the colloidal stability. Nanoparticles with ZP values greater than +25 mV or less than −25 mV typically have high degrees of stability. These results revealed that the CZNCs can be stable in colloidal suspensions with ZP more than +25 mV.

Figure 47:
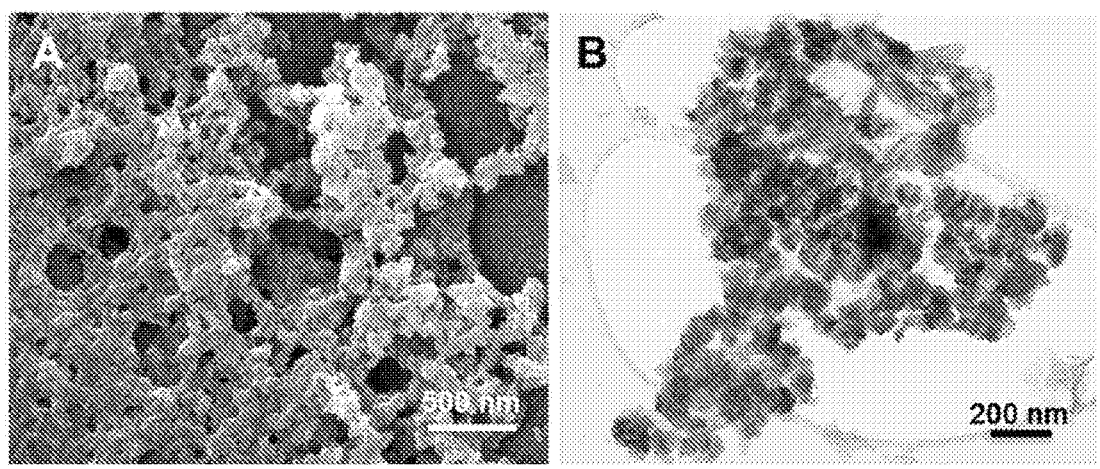
FIG. 47 shows SEM (FIG. 47A) and TEM (FIG. 47B) of the CZNCs composite.

FIG. 47 shows SEM (FIG. 47A) and TEM (FIG. 47B) of the CZNCs composite.

Figure 56:
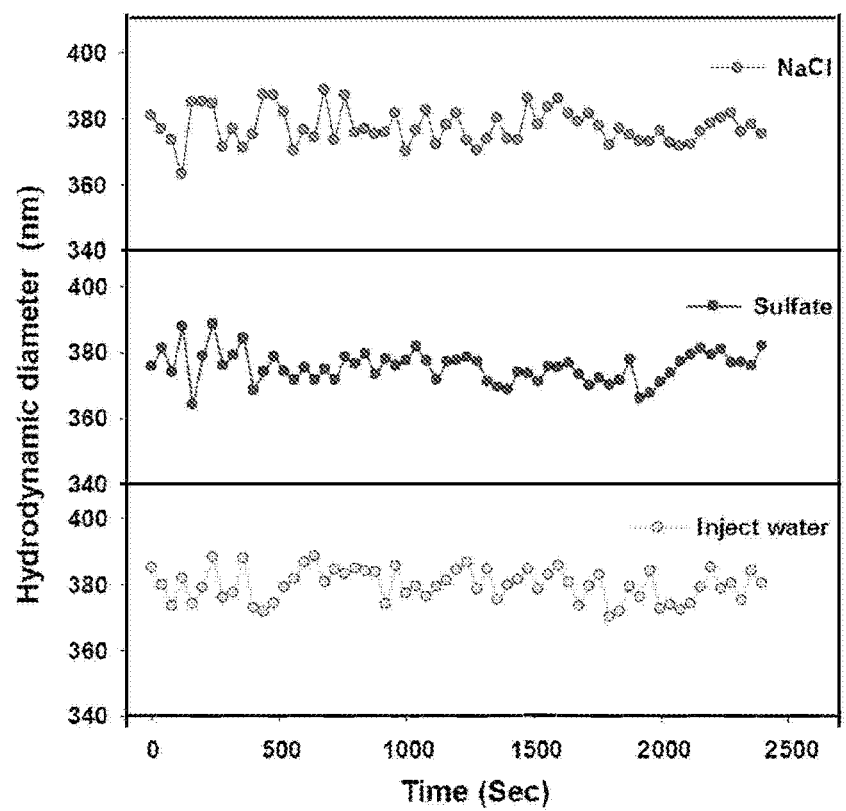
FIG. 56 shows effect of ionic strength on stability of nanocomposites suspension measured as hydrodynamic diameter by dynamic light scattering (DLS). Early stage aggregation kinetics of CZNCs measured for NaCl (500 mM), sulfate (20 mM) and simulated inject sea water. The effect of ionic strength on the stability of synthesized nanoparticles was tested at pH 7. The effect of the salts concentration on the stability of CZNCs nanocomposite was examined by varying the initial sodium chloride concentrations while maintaining the solution pH and CZNCs concentration at 7±02 and 20 mg/L, respectively.

Controlling the aggregation process is very important to minimize losses of the antibacterial activity. Aggregation increase sedimentation rate of nanomaterials in biomass and ultimately compromise their antibacterial activity. Aggregation pattern of CZNCs in seawater was investigated by monitoring the average hydrodynamic diameter in presence of NaCl (500 mM), $Na_2SO_4$ (20 mM) and simulated inject seawater as shown in FIG. 56. Results showed stable dispersion of CZNCs in inject water and independent of salt concentration. This is most likely due to the increase in the electrical double-layer repulsion and reduction in the net energy barrier between ChNPs and ZnONPs in CZNCs.

Figure 57:
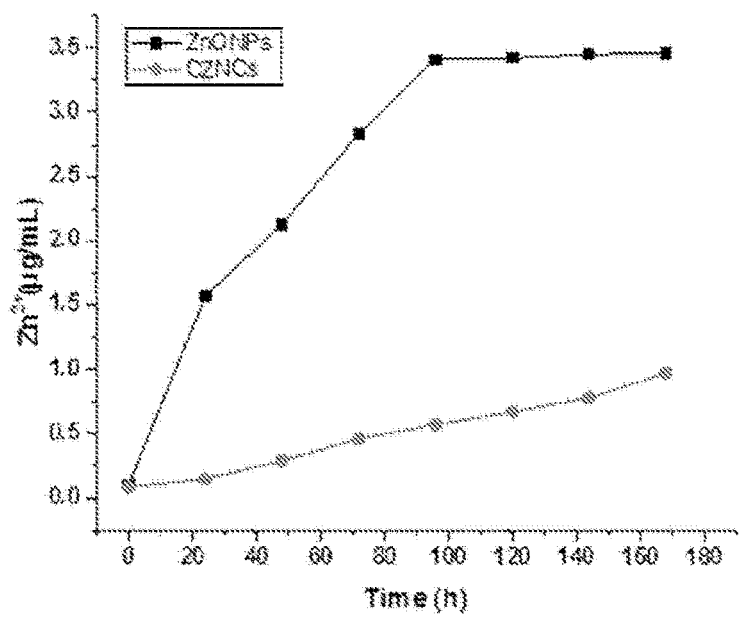
FIG. 57 shows release of $Zn^{2+}$ from ZnONPs and CZNCs in inject sea water.

Batch assays were performed to investigate any possible leaching of $Zn^{2+}$ from ZnONPs and CZNCs dissolution in inject water. The initial concentration of ZnONPs was 25 μg/mL, equal to mass ratio of ZnONPs in 250 μg/mL of CZNCs. FIG. 57 depicts the dissolution of nanomaterials in the suspensions during 168 h. Release of $Zn^{2+}$ from ZnONPs was quick and dissolution has reached equilibrium within 96 h. $Zn^{2+}$ concentration gradually increased with time and stabilized at 3.41 μg/mL. However, dissolution of CZNCs was much slower during the reaction period. The dissolved $Zn^{2+}$ concentrations increased slowly and the maximum concentration of $Zn^{2+}$ released was about 0.97 μg/mL, which was much lower than what released from ZnONPs. These results provide another evidence for ZnONPs stabilization within the ChNPs matrix indicated by a low release of $Zn^{2+}$.

Influence of ChNPs, ZnONPs and CZNCs on SRBs Activity

In order to investigate the effect of the composites on the activity of SRBs, the inhibition effect of ChNPs, ZnONPs, and CZNCs at different ZnONPs loadings were investigated. FIG. 48A depicts the sulfate reduction profiles of batch reactors exposed to the composites during 168 h. Almost all sulfates were reduced in the control reactor after 168 h indicating more than 99% sulfate reduction efficiency. The average sulfate removal efficiencies were 63.0% and 43.0% when exposed to ChNPs and ZnONPs concentration of 100 μg/mL, respectively, after 168 h reaction time. For the batch reactors spiked with CZNCs, the average residual concentrations of sulfate as a direct indication of SRBs inhibition has increased with increasing ZnO stoichiometric ratios from 1 to 20%. Sulfate reduction was 62.0, 55.0, 38.0 and 36.0% for CZNCs (1%), CZNCs (5%), CZNCs (10%), and CZNCs (20%), respectively. Therefore, the effect of CZNCs on SRBs sulfate reduction performance was dependent on ZnO stoichiometric ratios.

Figure 48:
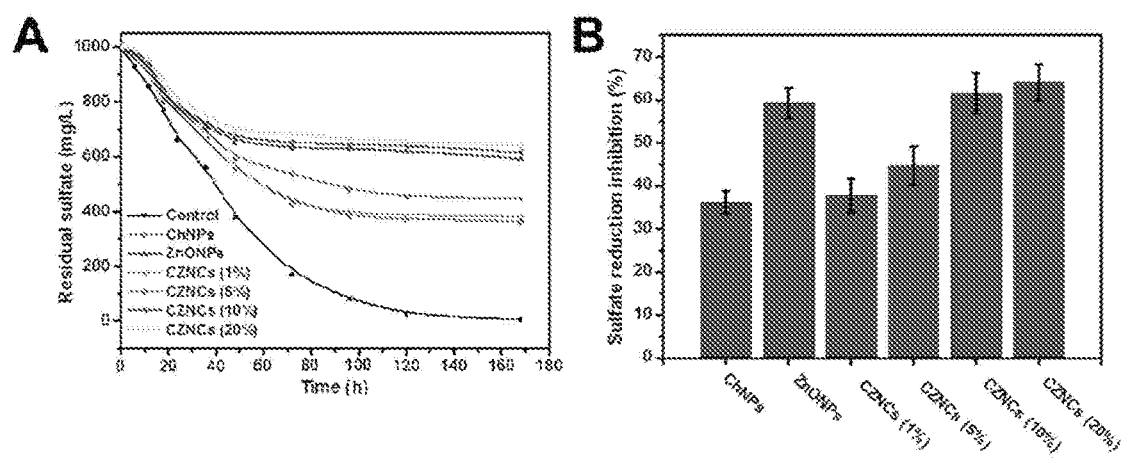
FIG. 48 shows SRBs activity of sludge biomass treated with ChNPs, ZnONPs and CZNCs in inject seawater. SRBs Biofilm (1000 mg·VSS/L) were incubated with 100 μg/mL of each composite at 35° C. at 150 rpm shaking speed.

FIG. 48 shows SRBs activity of sludge biomass treated with ChNPs, ZnONPs and CZNCs in inject seawater. SRBs Biofilm (1000 mg·VSS/L) were incubated with 100 μg/mL of each composite at 35° C. at 150 rpm shaking speed. FIG. 48A shows sulfate reduction profiles during 168 h reaction time. FIG. 48B shows % inhibition of sulfate reduction. Batch reactor without any nanomaterials was used as control. Error bars represent the standard deviation of three independent assays.

As shown in the FIG. 48B, synthesized nanomaterials showed obvious differences in their antibacterial activities against SRBs biofilm. CZNCs (10%) showed the higher SRBs inhibition of 62.0% as compared with 57.0% and 36.0% for ZnONPs and ChNPs, respectively. The batch reactor exposed to CZNCs (20%), showed SRBs sulfate reduction inhibition of 64.0%, a little higher than that of CZNC (10%) which is not significant. So CZNCs (10%) was considered optimum and selected for the further SRBs inhibition studies.

Sulfate Reducing Bacteria (SRBs) Biofilm Inhibition by CZNCs

Influence of CZNCs concentrations on SRBs activity was investigated by exposing enriched biomass to 20, 50, 100, 250 μg/mL CZNCs suspensions. Initial sulfate and TOC concentrations were kept constant at 1000 and 650 mg/L, respectively. FIG. 49A shows the residual sulfate concentration profiles during reaction time for all the batch reactors. In the absence of CZNCs, 80 h were needed to reduce 90% sulfate and more than 95% sulfate removal was achieved within 168 h. In presence of 10 μg/mL CZNCs, sulfate reduction was close to the control assay, indicating insignificant effects of nanocomposite on anaerobic sulfate reduction at this concentration. However, when CZNCs concentration was increased from 10 to 250 μg/mL, sulfate reduction rates were decreased to 80.0, 64.0, 38.0 and 26.0%, respectively, indicating that SRBs inhibition was concentration dependent.

FIG. 49B shows the SRBs inhibition efficiency exposed to CZNCs concentrations in the range of 10-250 μg/mL for 168 h. CZNCs showed excellent SRBs inhibition activity. The sulfate reduction inhibition gradually ascended with the increasing concentration of CZNCs. By increasing the CZNCs concentration from 20 to 50 μg/mL, the inhibition of sulfate reduction was decreased to 20.0% and 36.0%, respectively. More than 61.0% sulfate reduction inhibition was observed for 100 μg/mL CZNCs and inhibition was increased to more than 73.0% at 250 μg/mL of CZNCs (FIG. 49B). Based on the experimental data, zero-, first- and second-order reactions were examined to determine the inhibitory effects of CNZCs on sulfate reduction kinetics. A comparison of regression coefficient ($R^2$) relevant to the rate constants showed that sulfate reduction followed first-order reaction kinetics. The first-order rate constant values of sulfate reduction decreased from 0.029 to 0.0018 $h^{-1}$ with increasing CZNCs concentration from 0 to 250 μg/mL showing strong inhibitory effects of CZNCs on sulfate reduction kinetics.

Similar to sulfate reduction, the dissolved sulfide concentrations also dropped from 180.0 to 105.0 μg/mL when CZNCs was increased from 10 to 250 μg/mL. At higher CZNCs concentrations, sulfate accumulations may have reduced the total sulfide content. Sulfate removal is an oxidation reduction reactions, in which sulfate act as an electron acceptor. Sulfide production in biological process requires theoretically eight reducing equivalents. Thus, the availability of sufficient co-substrate is essential for the efficient sulfate reduction. In this study, lactate was used as co-substrate. The influence of CZNCs on utilization of co-substrate (lactate) was investigated by monitoring the TOC. The initial 650 mg/L TOC was reduced to 124.0 mg/L after 168 h of incubation in the absence of CZNCs (FIG. 49C). The average residual concentrations of TOC increased from 139.0 to 333.0 mg/L with increasing CZNCs concentrations from 10 to 250 μg/mL. Therefore, the effect of CZNCs on TOC removal was dose dependent and TOC removal inhibition increased from 5.4% to 43.1% as compared to that of the control by increasing CZNCs concentration from 10 to 250 µg/mL (FIG. 49D).

It is well known that biological sulfate removal process depends on dissimilating sulfate reduction and assimilating sulfate uptake by microorganisms for their growth.[41] Sulfate reduction process requires the output of carbon sources. The above results showed that the co-substrate oxidation was also affected at higher nanocomposite concentrations showing less utilization of the electron donor during the inhibition of sulfate reduction. Since the biological sulfate reduction was closely linked to the carbon source availability, the decrease in organics oxidation at higher CZNCs was in accordance with the sulfate removal rates. The inhibitory effects of CZNCs to SRBs led to the accumulation of sulfate in the reactors. Therefore, the influences of CZNCs on biological sulfate reduction, sulfide production and organics oxidation of SRBs mainly measured by the decrease of sulfate removal and TOC oxidation rates.

Figure 49:
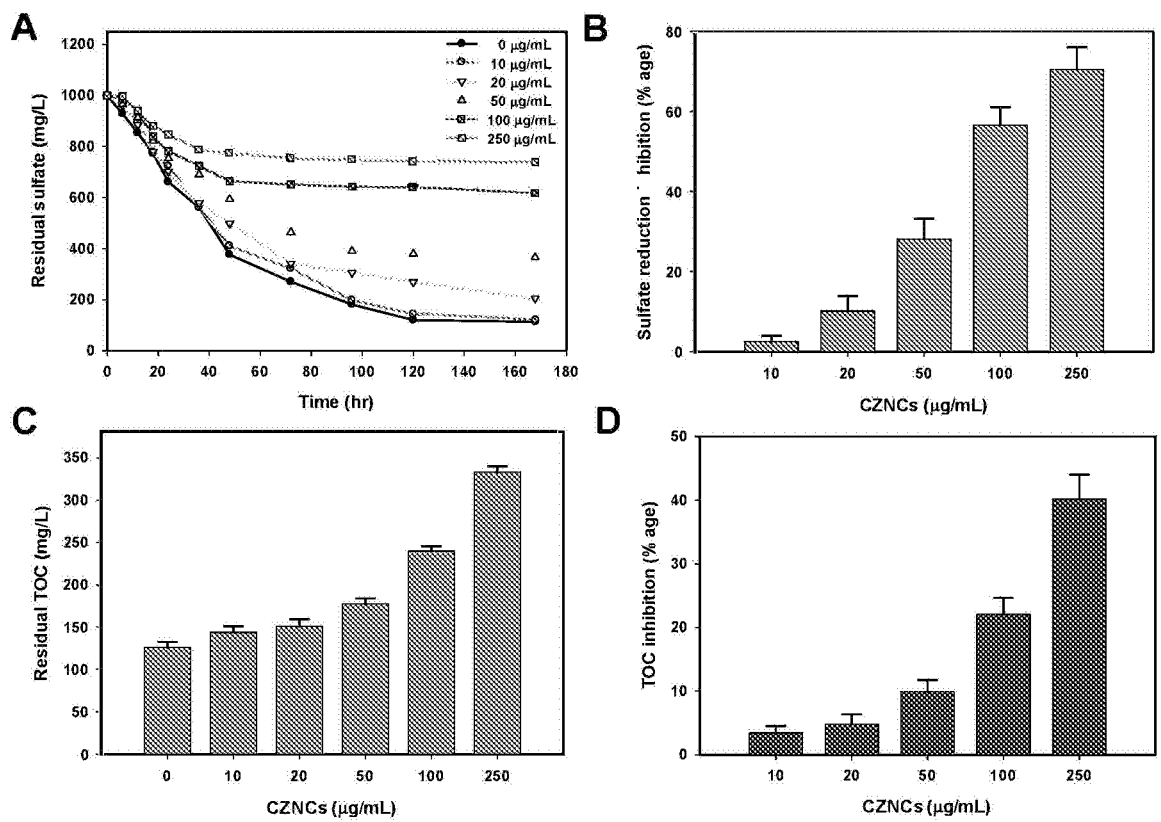
FIG. 49 shows activity of SRBs sludge biomass (1000 mg·VSS/L) treated with different concentrations of CZNCs (0-250 μg/mL) in inject sea water at 35° C.

FIG. 49 shows activity of SRBs sludge biomass (1000 mg·VSS/L) treated with different concentrations of CZNCs (0-250 µg/mL) in inject sea water at 35° C. FIG. 49A shows sulfate reduction profiles during 168 h reaction time. FIG. 49B shows % inhibition of sulfate reduction. FIG. 49C shows residual TOC profiles after 168 h reaction time. FIG. 49D shows % inhibition of organics oxidation at different concentrations of CZNCs. Batch reactor without any nanomaterials was used as control. Error bars represent the standard deviation of three independent experiments.

Figure 58:
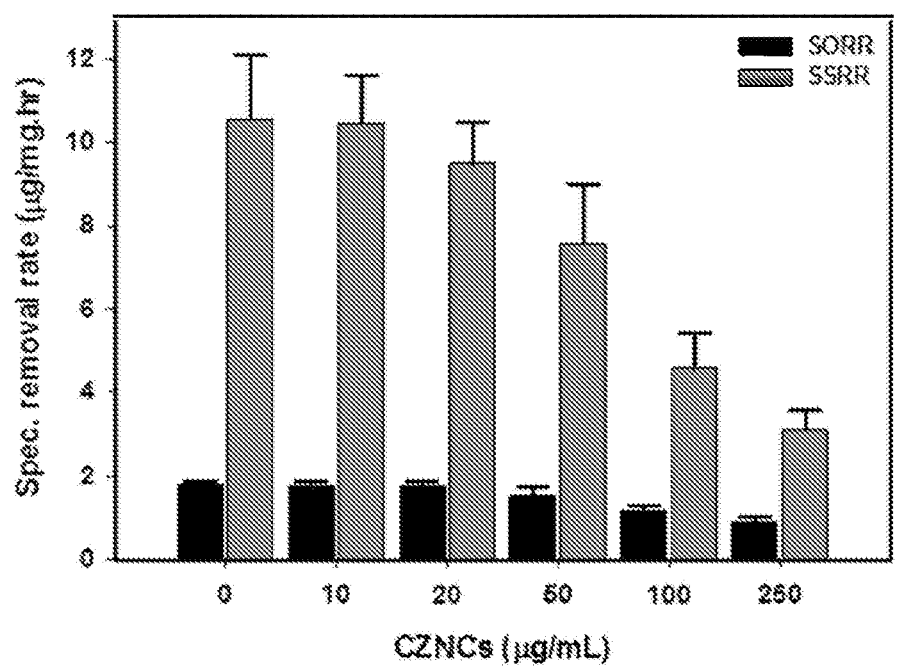
FIG. 58 shows specific sulfate reduction (SSRR and organics oxidation (SORR) at different concentrations of CZNCs (0-250 µg/mL) in inject sea water at 35° C. Batch reactor without any nanomaterials was used as control. Error bars represent the standard deviation of three independent experiments.
Figure 59:
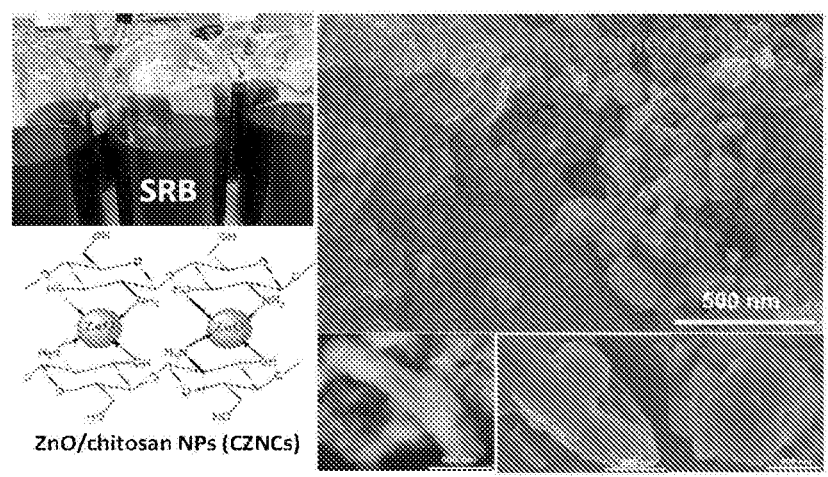
FIG. 59 shows that ZnO-interlinked chitosan nanoparticles were used as green biocides for the inhibition for sulfate reducing bacteria (SRB) in inject seawater and for minimizing the impact of microbiologically induced corrosion (MIC).

The inhibitory effects of CZNCs on SRBs sludge were assessed in terms of the specific sulfate removal rate (SSRR) and specific organic removal rate (SORR) as shown in the FIG. 58. The exposure of SRB to CZNCs largely affected the SSRR, where it was dose dependent and decreased from 10.34 to 2.47 µg-sulfate/mg-VSS.h by increasing CZNCs concentration from 0 to 250 µg/mL. Similarly, SORR decreased from 1.945 to 0.863 µg-lactate/mg-VSS.h in the presence of 250 µg/mL of CZNCs as compared to that of control, showing significant inhibitory effects of CZNCs on sulfate reduction.

Bacterial Cell Membrane Integrity by LDH Release Assay and SEM

Figure 50:
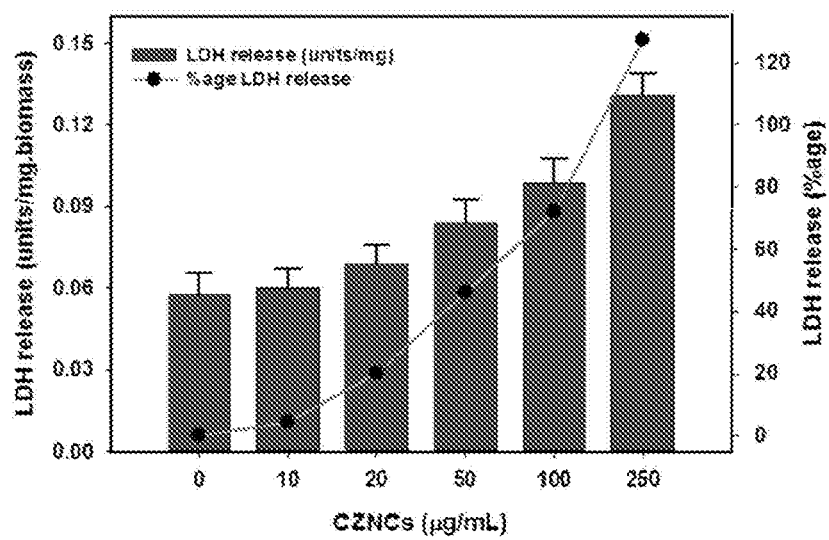
FIG. 50 shows LDH release from SRBs biomass exposed to different concentrations of CZNCs after 168 h of reaction time. Batch reactor without any nanomaterials was used as control. Error bars represent the standard deviation of three independent experiments.

The cell membrane integrity of anaerobic SRBs biomass was assayed by measuring the LDH release into the media as a marker of dead cells or as a marker of remaining live cells. After 168 h, LDH release results when SRBs biomass was exposed to 10 µg/mL CZNCs was similar to the control as shown in FIG. 50. Batch reactions exposed to 20, 50 and 100 µg/mL of CZNCs had LDH release of 22.0%, 37.0% and 72.0% as compared to that of the control, respectively. Much higher LDH release of 126.0% was determined for the batch reactor exposed to higher CZNCs concentrations of 250 µg/mL.

FIG. 50 shows LDH release from SRBs biomass exposed to different concentrations of CZNCs after 168 h of reaction time. Batch reactor without any nanomaterials was used as control. Error bars represent the standard deviation of three independent experiments.

The inhibitory effect of CZNCs on the morphology and membrane integrity of SRBs biomass was further evaluated by SEM in absence and presence of CZNCs. FIG. 51A depicts the SRBs bacteria in the control biomass. Individual bacterium observed in the higher magnification images (FIGS. 51a, 51b and 51c)) seemed to be viable with no obvious cell damage. On the other hand, FIG. 51B shows dense sludge biomass in presence of what seems to be highly packed mixture of CZNCs, bacteria and their induced EPS metabolites. Most bacterial cells treated with CZNCs suffered from a prevalent membrane damage and cytoplasm leakage as observed from high magnification images in FIGS. 51a', 51b' and 51c'.

Figure 51:
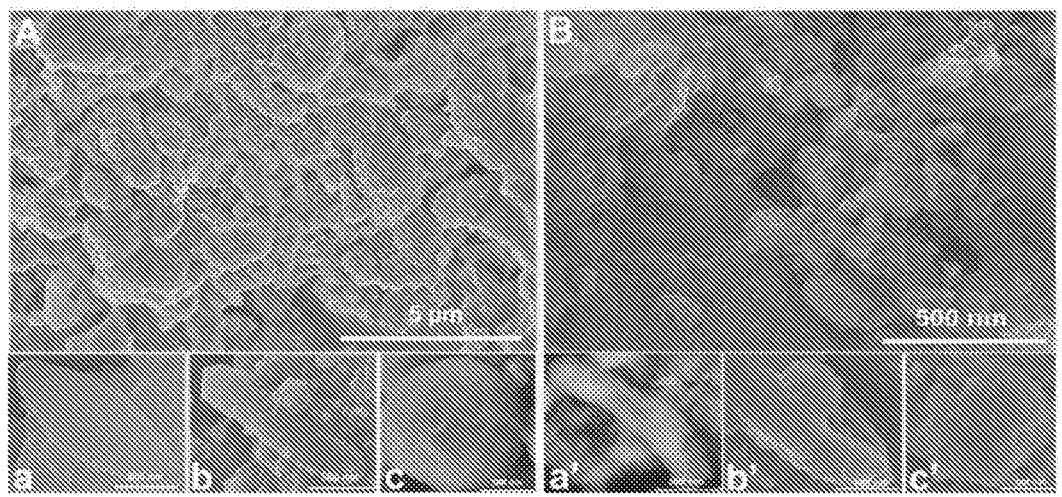
FIG. 51 shows SEM images of the SRBs biofilm treated with control (FIG. 51A), and 250 μg/mL of CZNCs (FIG. 51B), at low and high magnification, respectively.

FIG. 51 shows SEM images of the SRBs biofilm treated with control (FIG. 51A), and 250 µg/mL of CZNCs (FIG. 51B), at low and high magnification, respectively. FIG. 51A shows that Cells in control biofilm were viable with no observed surface damage or cell death protected by intact cytoplasmic membrane. FIG. 51B shows that in presence of 250 µg/mL CZNCs, SRBs sludge biomass suffered from prevalent cell lysis indicated by a severe membrane disruption and cytoplasm leakage.

Extraction and Analysis of Biofilm EPS

Figure 52:
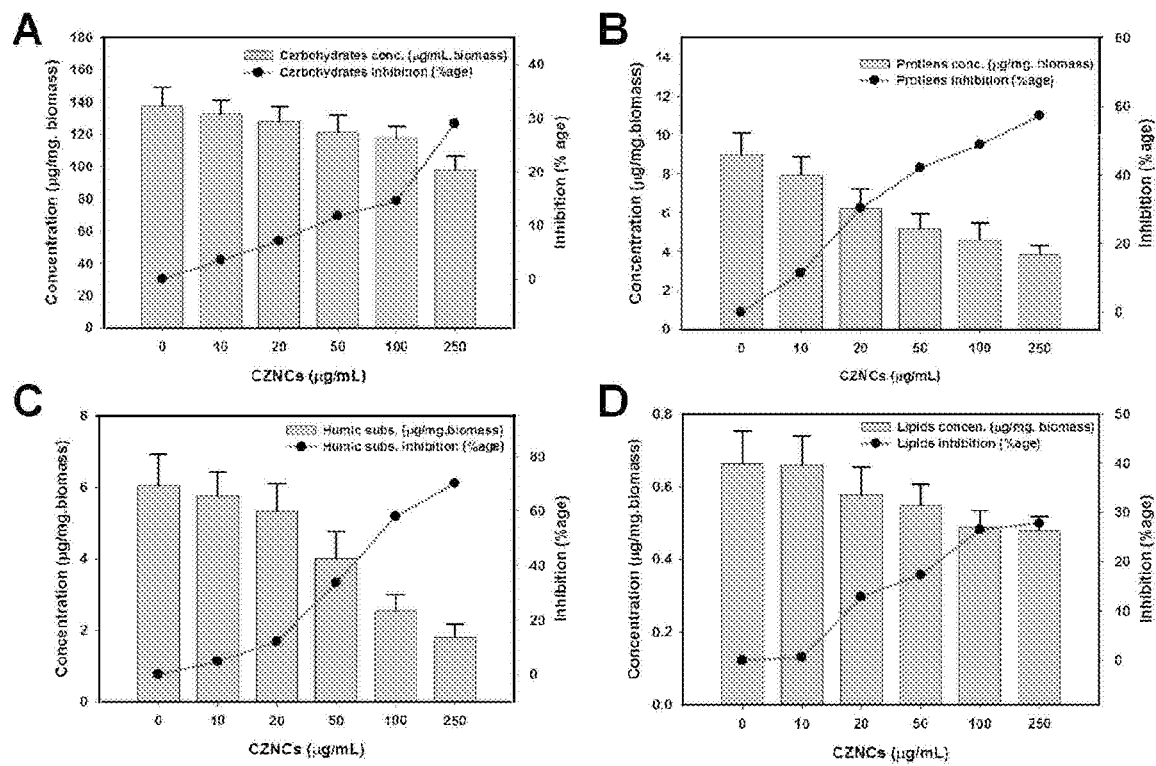
FIG. 52 shows EPS extracted form SRBs biofilm treated with different concentrations of CZNCs (0-250 μg/mL) in inject seawater at 35° C. after 168 h reaction time.

In order to study the effects of CZNCs concentration on SRBs biofilm inhibition, EPS were extracted at the end of each batch experiment. EPS are metabolic products usually accumulate on the bacterial cell surface resulting in the formation of biofilm and are mainly composed of carbohydrate, protein, humic substances, and lipids. FIG. 52 depicts the amounts of EPS constituents extracted from the SRB sludge after exposure to different CZNCs concentrations. EPS in sulfidogenic sludge showed significant composition of carbohydrates, proteins, humic substances, and small amounts of lipids. The amount of these constituents was dependent upon the concentration of CZNCs. A significant reduction in concentration of carbohydrates and humic substances suggested the active role of these two metabolites in inhibition of SRBs biofilm formation (FIG. 52A and FIG. 52D).

FIG. 52 shows EPS extracted form SRBs biofilm treated with different concentrations of CZNCs (0-250 µg/mL) in inject seawater at 35° C. after 168 h reaction time. (FIG. 52A) Carbohydrate, (FIG. 52B) proteins, (FIG. 52C) humic substances, and (FIG. 52D) lipids concentration and inhibition profiles (%) as compared with the control (in the absence of nanomaterials). Error bars represent the standard deviation. Proteins and humic substances production were inhibited to 58.0% and 76.0% when SRB was exposed to 250 µg/mL CZNCs as compared with that of control biomass (FIG. 52B and FIG. 52C). Thus, EPS metabolites inhibition played a key role in SRBs inhibition which is also supported by earlier reports. Mu et al. investigated the response of anaerobic sludge to a shock load of zinc oxide NPs and reported the inhibition of different EPS constituents at higher NPs concentrations of 200 mg/g TSS. Metal ions released from NPs dissolution are considered to have inhibitory effects on EPS production. The main challenges in conventional biocides application are that the localized concentration of biofilm formers are covered by protective polymers and produce EPS. This can hinder biocidal activity, causing the failure of biocides to reach colonies in the deep layers, which are less susceptible due to the diluted doses that reach to them. However, inhibitory effect of CZNCs on EPS contents could result in biofilm growth inhibition.

Acute Toxicity Assessment of CZNCs on Zebrafish Embryos

Figure 53:
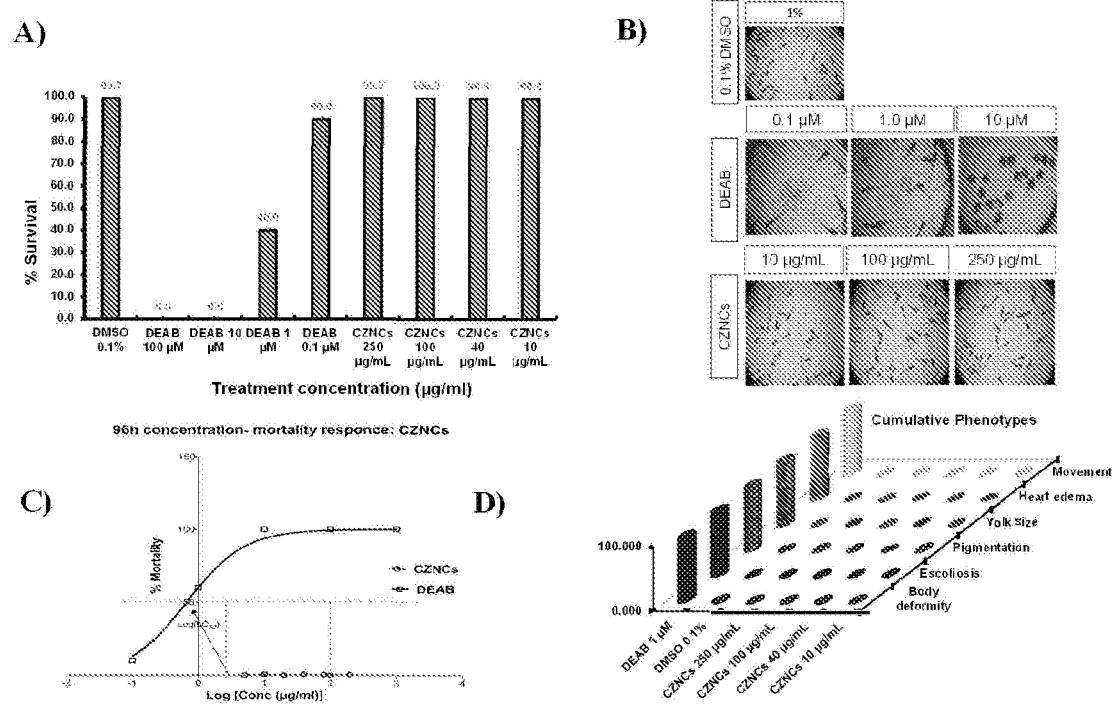
FIG. 53A shows acute toxicity of different concentration of CZNCs compared to the positive and negative control (0.1% DMSO)
FIG. 53B shows acute toxicity representative pictures using a stereomicroscope at magnification X=0.63 for every treatment. The pictures were captured at 96-hpf. Note the deformed embryos in the positive control (10.0 μM DEAB) and the healthy embryos in CZNCs and 0.1% DMSO.
FIG. 53C shows mortality response curve of different concentrations of DEAB and CZNCs.
FIG. 53D shows teratogenic phenotype analysis at different concentrations of CZNCs compared to the positive negative controls.

To further investigate the safe use of CZNCs nanocomposite as potential biocide to disinfect inject seawater, we investigated whether CZNCs has any acute toxicity on zebrafish embryos within concentration range used in the SRBs antibacterial studies. It is well documented that the early developmental stages of the zebrafish embryos are more sensitive to external compounds and chemicals than larval or adult zebrafish. Therefore, the embryonic period (24-96 hpf) was chosen as the administration time to study the possible toxicity of the CZNCs. The percentage of cumulative survival/mortality (FIG. 53A) was measured at 96-hpf, which is the recommended observation time. According to the 96-hpf percentage of survival graph (FIG. 52B), the no observe effect concentration or NOCE (i.e., <20% mortality), and low observed effect concentration or LOEC, (i.e., =>20% mortality) values were calculated for DEAB (positive control). The NOEC for DEAB was at 0.1 M, as this concentration of DEAB showed only a cumulative mortality of 10%(2 out of 20 were dead) and the rest of the embryos (90%) did not show any teratogenic (morphological or physiological abnormalities) effect. On the other hand, the LOEC value for the positive control (DEAB) was at 1.0 µM, showing a cumulative mortality of 60% (12 of 20 were dead) and the rest of the live embryos showed sever teratogenic effect such as deformities in the heart and yolk sac (FIG. 53B). According to the sigmoidal curve (FIG. 52C), The LC50 values of the DEAB at five time-points for mortality with 95% confidence limit was calculated to be 0.94 µM ($R^2$~ 0.999).

FIG. 53A shows acute toxicity of different concentration of CZNCs compared to the positive and negative control (0.1% DMSO); FIG. 53B shows acute toxicity representative pictures using a stereomicroscope at magnification X=0.63 for every treatment. The pictures were captured at 96-hpf. Note the deformed embryos in the positive control (10.0 µM DEAB) and the healthy embryos in CZNCs and 0.1% DMSO; FIG. 53C shows mortality response curve of different concentrations of DEAB and CZNCs; FIG. 53D shows teratogenic phenotype analysis at different concentrations of CZNCs compared to the positive negative controls.

For CZNCs treatment, negligible mortality, morphological or physiological abnormalities were observed at any used concentration; thus, NOEC, LOEC and LC50 couldn't be calculated. Therefore, the hypothetical LC50 for CZNCs would be much higher than 250 µg/mL (FIG. 53C). This is similar to what was observed in 0.1% DMSO negative control treatment, as there was no significant morphological or teratogenic (body deformity, scoliosis, pigmentation, yolk size, heart edema, heartbeat, movement) defect detected after 96-hpf of treatment (FIG. 53D). These results demonstrated that 250 µg/mL of CZNCs has no acute teratogenic toxic effect on zebrafish embryos.

Antibacterial Mechanism and Non-Toxicity of CZNCs: Synergic Effect

Our study showed strong inhibitory effects of CZNCs on sulfate reduction, TOC removal and components of extracellular polymeric substances of SRBs sludge biomass. Antibacterial activities of most of the nanomaterials have been assigned to oxidative stress, metal ions release, and membrane perturbation. Nevertheless, 02 is required for induction of free radical-mediated oxidation, suggesting oxidative stress might not be significant under anaerobic sulfate reducing environment. CZNCs could attach to the bacterial cell membrane through —$NH_2$ group of Ch and enhanced the cell membrane permeability leading to cell destruction as confirmed by the LDH release. There was a slow release of $Zn^{2+}$ from the CZNCs in the reaction media which may have enhanced the inhibitory effect of the CZNCs. Similar results were reported in an earlier study, where carboxymethyl Ch/ZnO nanocomposite showed enhanced bactericidal properties against E. coli.

In recent years, several studies suggested physical interaction between nanoparticles and bacterial cells as a primary mechanism for inactivation of bacterial cells. However, the direct interaction of nanoparticles usually depends upon their physicochemical properties and stability in suspension media. CZNCs were very stable in high salt concentrations and inject water media and their direct contact with bacteria cells may have resulted in cell damage. The EPS excreted by the SRBs sludge after exposure to CZNCs for 168 h showed significant reduction in its important constituents metabolites. Additionally, LDH release assay and SEM observations show that most bacterial cell suffered from prevalent membrane damage after reacting with CZNCs.

Additionally, the optimal CZNCs composition containing 10% ZnO did not show significant ecotoxicity in zebrafish embryos even at 250 µg/mL, the highest concentration tested in our study. This suggests that CZNCs did not pose a significant threat to aquatic marine environment As suggested by SEM, TEM, and DLS studies, CZNCs showed a stable and well distributed 30-40 nm ZnONPs in ChNPs matrix of average particle size of 100-150 nm. The toxicity effect of ZnONPs on zebrafish model showed that 10-20 µg/mL were toxic to the zebrafish embryos, causing pericardial edema and reduction is the hatching rates. In our study, we used Ch interlinked with only 10% ZnONPs. Thus, this low concentration of ZnO when it was interlinked with ChNPs did not pose significant mortality. A previous study indicated that ChNPs with average particle size 85 nm showed dose-dependent mortality and reduced hatching rates of zebrafish embryo. However, the groups exposed to ChNPs showed relative safety compared with those treated with normal Ch particles. In another study, 200 nm ChNPs were toxic to zebrafish embryos and causes high mortality at concentration as low as 40 µg/mL. This is an obvious indication that the nanoparticles toxicity might be controlled by the corresponding particles size, valid dose, chemical composition, and/or ambient conditions. Cytotoxicity investigation of ChNPs showed relatively low, concentration-dependent, towards mouse hematopoietic stem cells and influenced by particle size and ZP of CSNPs. In the present study, we used 100-150 nm Ch nanoparticles interlinked with only 10% ZnO. Thus, this synergic effect of low concentration ZnO when it was impeded within the ChNPs did not produce significant mortality while posing efficient antibacterial properties. Owing to its efficient inhibition of SRBs sludge biomass and non-toxicity to zebrafish embryos, CZNCs is expected to be green, environment friendly at 10% loading of ZnONPs and beneficial for industry in preserving formation water against biofouling and reducing the risks of MIC.

Conclusion

A stable and highly efficient ZnO interlinked chitosan nanocomposite (CZNCs) was synthesized and characterized by Zetasizer, XRD, UV-Vis, SEM, and TEM analysis and its inhibitory effects were investigated on enriched SRBs sludge biomass in inject seawater. The nanocomposites showed stable behavior when exposed to high salt concentrations of seawater. CZNCs showed substantial inhibitory effects to sulfate reduction and organics oxidation of SRBs biomass at different concentrations (10-250 µg/mL) of CZNCs in seawater. Much higher LDH release of 126% was determined for the batch reactor exposed to 250 µg/mL CZNCs as compared with the control. SEM analysis suggested cell membrane disruption. Analysis of extracellular polymeric substances (EPS) from SRBs biofilm showed a decrease in concentrations of carbohydrates, proteins, humic substances, and lipids in the presence of CZNCs. Moreover, CZNCs did not show any significant specific acute toxicity or teratogenic phenotype at any of the concentrations tested. On the basis of obtained results we present CZNCs (10%) as a "green" alternative biocide which is expected to be beneficial for industry in preserving inject water against biofouling and reducing the risks of piping corrosion, reservoir souring, and improve surface facilities lifetime, with minimal impact on the environment and marine life.

Materials and Methods

EPS Analysis

Contents of proteins, humic substances, carbohydrates, and lipids in the extracted EPS were analyzed. The carbohydrate content in EPS was measured with the anthrone method using glucose as the standard 1. Briefly, 1 mL of sample was mixed with 2 mL of anthrone reagent diluted in sulfuric acid and then placed in a bath at 100° C. during 14 min until the reaction was completed. When the solution was cooled, the absorbance was measured at 625 nm. Proteins and humic substances were measured using the modified Lowry method with bovine serum albumin (BSA) and humic acid as the respective standards[2]. BSA from Sigma was used as standard. 200 μL of sample was added to 1 mL of alkaline copper reagent, after 10 min of incubation at room temperature, 100 μL of 50% Folin-Ciocalteu reagent 2 N was added. The tubes were incubated at room temperature for 30 min and the absorbance of all the samples was measured at 750 nm. The humic acids were analyzed by a UV/vis spectrophotometer following the modified Lowry method using humic acids as the standard. The lipids content was analyzed with commercial olive oil as the standard.

The invention claimed is:

1. A composition comprising chitosan and lignosulfonic acid, wherein the chitosan and lignosulfonic acid are covalently crosslinked, and wherein the composition comprises nanospheres.

2. The composition of claim 1, wherein the chemical crosslinking is mediated by formaldehyde, sulfuric acid, and sodium sulfate.

3. The composition of claim 1, wherein the nanospheres have average diameters of about 150 nm to about 200 nm.

4. The composition of claim 1, wherein the nanospheres have average diameters of about 40 nm.

5. The composition of claim 1, wherein the mass ratio of chitosan: lignosulfonic acid ranges from about 1:2 to about 2:1.

6. The composition of claim 1, wherein the mass ratio of chitosan: lignosulfonic acid is about 1:1.

7. The composition of claim 1, wherein the chitosan has about 85% degree of deacetylation.

8. The composition of claim 1, wherein the chitosan has a molecular weight ranging from about 50000 Da to about 375000 Da.

9. The composition of claim 1, wherein the composition is an antimicrobial composition.

10. The composition of claim 1, wherein the nanospheres have a zeta potential of about +34.25 mV.

* * * * *